US011075825B2

(12) United States Patent
Zhong et al.

(10) Patent No.: US 11,075,825 B2
(45) Date of Patent: *Jul. 27, 2021

(54) GENERATING AND DISPLAYING TOPOLOGY MAP TIME-LAPSES OF CLOUD COMPUTING RESOURCES

(71) Applicant: Splunk Inc., San Francisco, CA (US)

(72) Inventors: Qianjie Zhong, Shanghai (CN); Geng Qin, Shanghai (CN); Min Zhang, Chengdu (CN); D. Randall Young, San Francisco, CA (US); Feng Shao, Suzhou (CN)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,647

(22) Filed: Jan. 13, 2020

(65) Prior Publication Data
US 2020/0287807 A1   Sep. 10, 2020

Related U.S. Application Data

(63) Continuation of application No. 14/995,177, filed on Jan. 13, 2016, now Pat. No. 10,536,356, which is a
(Continued)

(51) Int. Cl.
*H04L 12/24* (2006.01)
*H04L 12/26* (2006.01)

(52) U.S. Cl.
CPC ............ *H04L 43/045* (2013.01); *H04L 41/12* (2013.01); *H04L 41/22* (2013.01); *H04L 43/0817* (2013.01)

(58) Field of Classification Search
CPC ......... H04L 12/24; H04L 12/26; H04L 29/08; H04L 41/5096; H04L 43/0817;
(Continued)

(56) References Cited

U.S. PATENT DOCUMENTS

| 7,937,344 B2 | 5/2011 | Baum et al. |
| 8,004,674 B2 | 8/2011 | Ball et al. |

(Continued)

FOREIGN PATENT DOCUMENTS

| CN | 104040529 A | 9/2014 |
| JP | 2015-511345 A | 4/2015 |

(Continued)

OTHER PUBLICATIONS

International Search Report re PCT Application No. PCT/CN2015/090177, dated Jun. 17, 2016.
(Continued)

*Primary Examiner* — Benjamin M Thieu
(74) *Attorney, Agent, or Firm* — Knobbe, Martens, Olson & Bear, LLP

(57) ABSTRACT

Techniques and mechanisms are disclosed that enable collection of various types of data from cloud computing services and the generation of various dashboards and visualizations to view information about collections of cloud computing resources. A user can configure collection of data from one or more cloud computing services and view visualizations using an application platform referred to herein as a cloud computing management application. A cloud computing management application further may be configured to generate and cause display of interactive topology map representations of cloud computing resources based on the collected data, where an interactive topology map enables users to view an intuitive visualization of a collection of computing resources, efficiently cause performance of actions with respect to various resources displayed in the topology map, and analyze the collection of resources in ways that are not possible using conventional cloud computing service management consoles.

30 Claims, 41 Drawing Sheets

Related U.S. Application Data continuation of application No. 14/902,848, filed as application No. PCT/CN2015/090177 on Sep. 21, 2015, now Pat. No. 10,693,743.

(58) Field of Classification Search
CPC ....... H04L 41/12; H04L 43/045; H04L 67/10; H04L 41/22; G06F 3/0486; G06F 3/0482; G06F 17/30; G06F 17/30061
See application file for complete search history.

(56) References Cited

U.S. PATENT DOCUMENTS

| | | | |
|---|---|---|---|
| 8,060,533 B1 | 11/2011 | Wheeler et al. | |
| 8,112,425 B2 | 2/2012 | Baum et al. | |
| 8,751,529 B2 | 6/2014 | Zhang et al. | |
| 8,751,624 B1 * | 6/2014 | Jacobson | H04L 41/0622 709/224 |
| 8,788,525 B2 | 7/2014 | Neels et al. | |
| 8,910,188 B1 | 12/2014 | Wang et al. | |
| 9,026,674 B1 | 5/2015 | Kanna et al. | |
| 9,134,992 B2 | 9/2015 | Wong et al. | |
| 9,215,085 B2 | 12/2015 | Kruglick | |
| 9,215,240 B2 | 12/2015 | Merza et al. | |
| 9,246,773 B2 | 1/2016 | Degioanni | |
| 9,286,413 B1 | 3/2016 | Coates et al. | |
| 9,338,223 B2 | 5/2016 | Threefoot et al. | |
| 10,007,710 B2 | 6/2018 | Chen et al. | |
| 10,127,258 B2 | 11/2018 | Lamas et al. | |
| 10,459,819 B2 | 10/2019 | Chen et al. | |
| 10,536,356 B2 | 1/2020 | Zhong et al. | |
| 2002/0087743 A1 | 7/2002 | Givoly | |
| 2003/0009552 A1 * | 1/2003 | Benfield | H04L 41/22 709/224 |
| 2003/0046390 A1 | 3/2003 | Ball et al. | |
| 2005/0108375 A1 | 5/2005 | Hallak-Stamler | |
| 2005/0119996 A1 | 6/2005 | Ohata et al. | |
| 2006/0245431 A1 * | 11/2006 | Morris | H04L 12/2854 370/395.4 |
| 2007/0060205 A1 | 3/2007 | Kim | |
| 2007/0150871 A1 | 6/2007 | Barsness et al. | |
| 2008/0209546 A1 | 8/2008 | Kim | |
| 2008/0316213 A1 * | 12/2008 | Eagen | H04L 41/12 345/474 |
| 2009/0049152 A1 | 2/2009 | Rimhagen et al. | |
| 2011/0078108 A1 | 3/2011 | Kumar | |
| 2011/0252057 A1 | 10/2011 | Huang et al. | |
| 2011/0316864 A1 | 12/2011 | Mejdrich et al. | |
| 2013/0055155 A1 * | 2/2013 | Wong | G06F 8/65 715/810 |
| 2013/0191531 A1 | 7/2013 | Kruglick | |
| 2014/0032768 A1 | 1/2014 | Ding et al. | |
| 2014/0047106 A1 | 2/2014 | Leung et al. | |
| 2014/0047342 A1 | 2/2014 | Breternitz et al. | |
| 2014/0201642 A1 | 7/2014 | Vicat-Blanc | |
| 2014/0215058 A1 | 7/2014 | Vicat-Blanc et al. | |
| 2014/0215077 A1 | 7/2014 | Soudan et al. | |
| 2014/0304407 A1 | 10/2014 | Moon | |
| 2015/0033086 A1 | 1/2015 | Sasturkar et al. | |
| 2015/0052247 A1 | 2/2015 | Threefoot et al. | |
| 2015/0052441 A1 | 2/2015 | Degioanni | |
| 2015/0067171 A1 | 3/2015 | Yum et al. | |
| 2015/0149611 A1 | 5/2015 | Lissack | |
| 2015/0288569 A1 | 10/2015 | Agarwal et al. | |
| 2015/0350018 A1 | 12/2015 | Hui et al. | |
| 2015/0358391 A1 | 12/2015 | Moon et al. | |
| 2016/0239185 A1 | 8/2016 | Balimidi et al. | |
| 2016/0294603 A1 | 10/2016 | Whitner | |
| 2016/0380913 A1 | 12/2016 | Morgan et al. | |
| 2017/0013572 A1 | 1/2017 | Jayaraman et al. | |
| 2017/0083585 A1 | 3/2017 | Chen et al. | |
| 2017/0085446 A1 | 3/2017 | Zhong et al. | |
| 2017/0085447 A1 | 3/2017 | Chen et al. | |
| 2017/0093645 A1 | 3/2017 | Zhong et al. | |
| 2017/0286099 A1 | 10/2017 | Wilkinson | |
| 2018/0246942 A1 | 8/2018 | Chen et al. | |
| 2019/0098106 A1 | 3/2019 | Mungel et al. | |
| 2020/0026634 A1 | 1/2020 | Chen et al. | |

FOREIGN PATENT DOCUMENTS

| | | |
|---|---|---|
| KR | 2014-0112555 A | 9/2014 |
| KR | 10-1558909 B1 | 10/2015 |
| WO | WO 2013/109274 | 7/2013 |
| WO | WO 2016/018440 | 2/2016 |
| WO | WO 2017/049439 | 3/2017 |

OTHER PUBLICATIONS

Pending Claims re PCT Application No. PCT/CN2015/090177, dated Jun. 17, 2016.

Written Opinion re PCT Application No. PCT/CN2015/090177, dated Jun. 17, 2016.

Vaid, Workshop on Managing Systems via log Analysis and Machine Learning Techniques (SLAML '10), ;login: vol. 36, No. 1, Oct. 3, 2010, Vancouver, BC, Canada.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

SLAML 10 Reports, Workshop on Managing Systems via Log Analysis and Machine Learning Techniques, ;login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

* cited by examiner

FIG. 6A

| Data Summary | | | |
|---|---|---|---|
| Hosts (5) | Sources (8) | Sourcetypes (3) | |
| filter | | | |
| Host ◊ | | Count ◊ | Last Update ◊ |
| mailsv | ıl ∨ | 9,829 | 4/29/14 1:32:47.000 PM |
| vendor_sales | ıl ∨ | 30,244 | 4/29/14 1:32:46.000 PM |
| www1 | ıl ∨ | 24,221 | 4/29/14 1:32:44.000 PM |
| www2 | ıl ∨ | 22,595 | 4/29/14 1:32:47.000 PM |
| www3 | ıl ∨ | 22,975 | 4/29/14 1:32:45.000 PM |

FIG. 6B

Original Search:
Search "error" | stats count BY host ← 802

Sent to peers:
Search "error" | prestats count BY host ← 804

Executed by search head:
Aggregate the prestats results received from peers ← 806

3102 Receive performance data related to performance of a plurality of computing resources managed by one or more cloud computing services, and relationship data related to relationships among the plurality of computing resources managed by the one or more cloud computing services

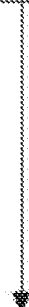

3104 Cause display of a graphical user interface including a topology map generated based on the performance data and the relationship data, the topology map including a plurality of nodes representing the plurality of computing resources, and one or more edges representing the relationships among the plurality of computing resources

FIG. 31

GENERATING AND DISPLAYING TOPOLOGY MAP TIME-LAPSES OF CLOUD COMPUTING RESOURCES

CROSS-REFERENCE TO RELATED APPLICATIONS; PRIORITY CLAIM

This application claims the benefit under 35 U.S.C. § 120 as a Continuation of U.S. application Ser. No. 14/995,177, filed Jan. 13, 2016, which is a Continuation of U.S. application Ser. No. 14/902,848, filed Jan. 4, 2016, which is a U.S. National Stage Patent Application filed under 35 U.S.C. § 371 of International Application No. PCT/CN15/90177, filed Sep. 21, 2015, the entire contents of all of which are hereby incorporated by reference as if fully set forth herein.

TECHNICAL FIELD

Embodiments relate generally to techniques for displaying information related to a collection of cloud computing resources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An increasingly large number of organizations rely on various types of computing resources provided by cloud computing service providers as part of their computing infrastructure. A cloud computing service generally comprises a collection of remote computing services (e.g., servers, storage, networking, backup, etc.) made available to users based on various payment models. Examples of popular cloud computing services include Amazon Web Services (AWS) offered by Amazon.com, Azure offered by Microsoft, and Google Cloud Platform offered by Google.

Cloud computing services typically provide a web-based management console or other interface that enables users to manage their cloud computing resources. For example, a typical management console may provide one interface that displays a list of a user's active cloud server instances, another interface that displays a list of storage volumes associated with the server instances, yet another interface that displays a list of a user's configured virtual private clouds, and so forth. While such interfaces may be useful for viewing information related to some aspects of an organization's cloud computing resources, the disconnected nature of such interfaces presents challenges to readily obtaining a broader picture of the cloud computing resources and relationships among those resources.

BRIEF DESCRIPTION OF THE DRAWINGS

In the drawings:

FIG. 6A illustrates a search screen in accordance with the disclosed embodiments;

FIG. 6B illustrates a data summary dialog that enables a user to select various data sources in accordance with the disclosed embodiments;

FIG. 9B illustrates an incident review dashboard in accordance with the disclosed embodiments;

FIGS. 15-17 illustrate example visualizations generated by a reporting application in accordance with the disclosed embodiments;

FIG. 31 is a flow diagram that illustrates generation of a graphical user interface displaying a topology map in accordance with the disclosed embodiments.

DETAILED DESCRIPTION

Figure 1:
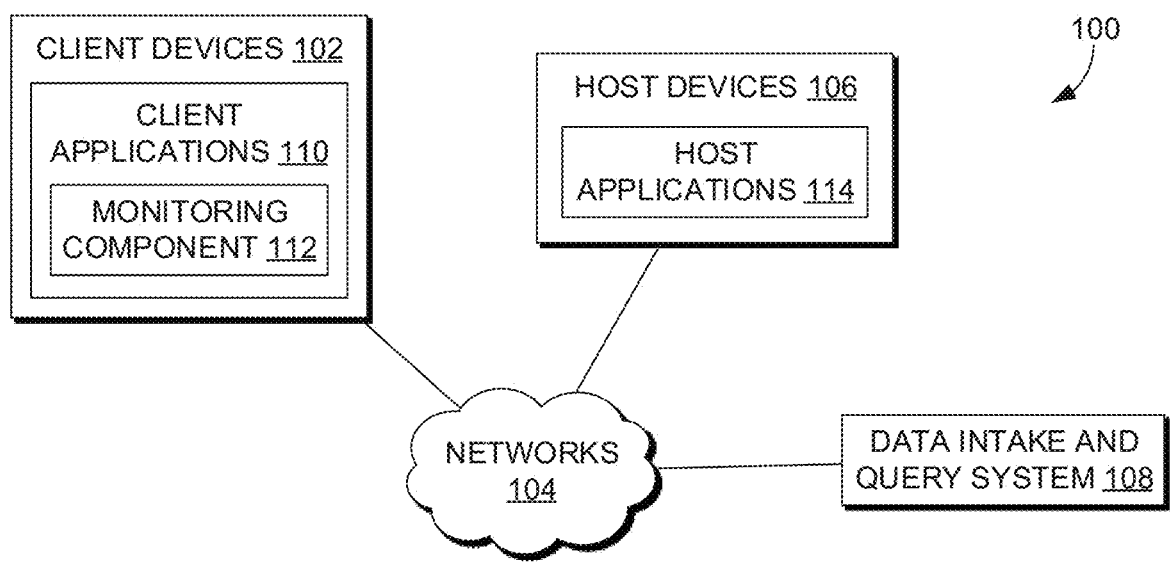
FIG. 1 illustrates a networked computer environment in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Operating Environment
2.1. Host Devices
2.2. Client Devices
2.3. Client Device Applications
2.4. Data Server System
2.5. Data Ingestion
2.5.1. Input
2.5.2. Parsing
2.5.3. Indexing
2.6. Query Processing
2.7. Field Extraction
2.8. Example Search Screen
2.9. Data Modelling
2.10. Acceleration Techniques
2.10.1. Aggregation Technique
2.10.2. Keyword Index
2.10.3. High Performance Analytics Store
2.10.4. Accelerating Report Generation
2.11. Security Features
2.12. Data Center Monitoring
2.13. Cloud-Based System Overview
2.14. Searching Externally Archived Data
2.14.1. ERP Process Features
3.0. Functional Overview
3.1. Cloud Computing Management Application Overview
3.2 Cloud Computing Resource Data Collection
3.2.1. Configuring Resource Data Collection
3.2.2. Data Collection Process
3.3. Cloud Computing Resource Topology Maps
3.3.1. Generating Topology Map Displays
3.3.2. Interacting With Topology Map Displays
3.3.3. Analyzing Displayed Topology Maps
3.3.4. Displaying Time-Based Topology Maps
4.0. Implementation Examples
4.1. Generating Cloud Computing Resource Topology Map Displays
4.2. Generating Topology Map Time-lapse Displays
5.0. Example Embodiments
6.0. Implementation Mechanism—Hardware Overview
7.0. Extensions and Alternatives 1.0. GENERAL OVERVIEW Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. OPERATING ENVIRONMENT

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
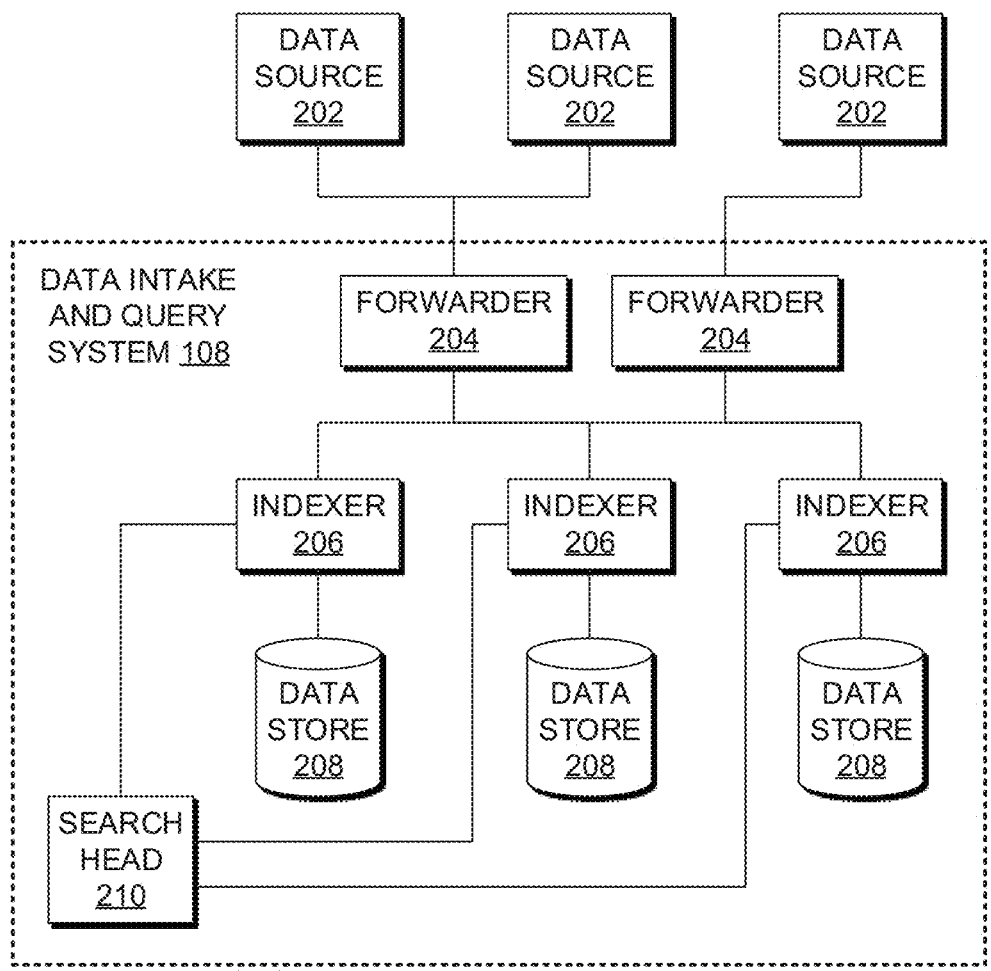
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
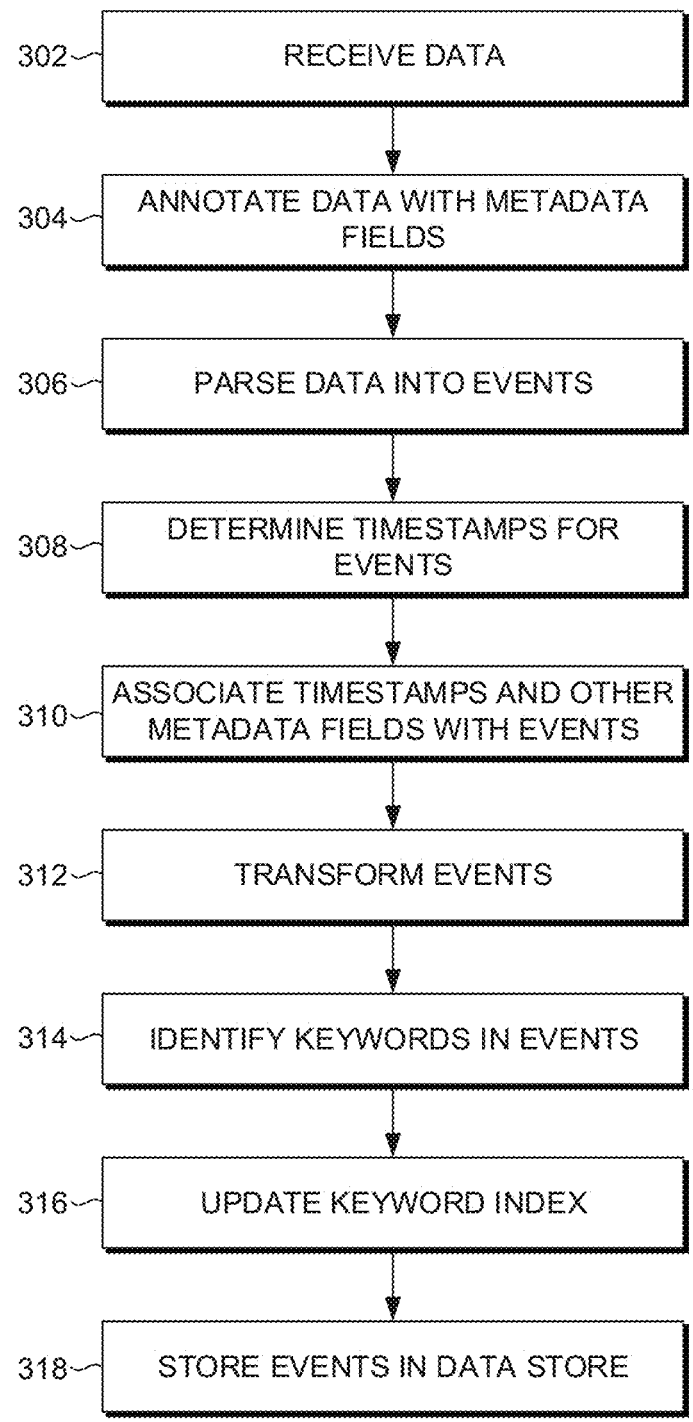
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
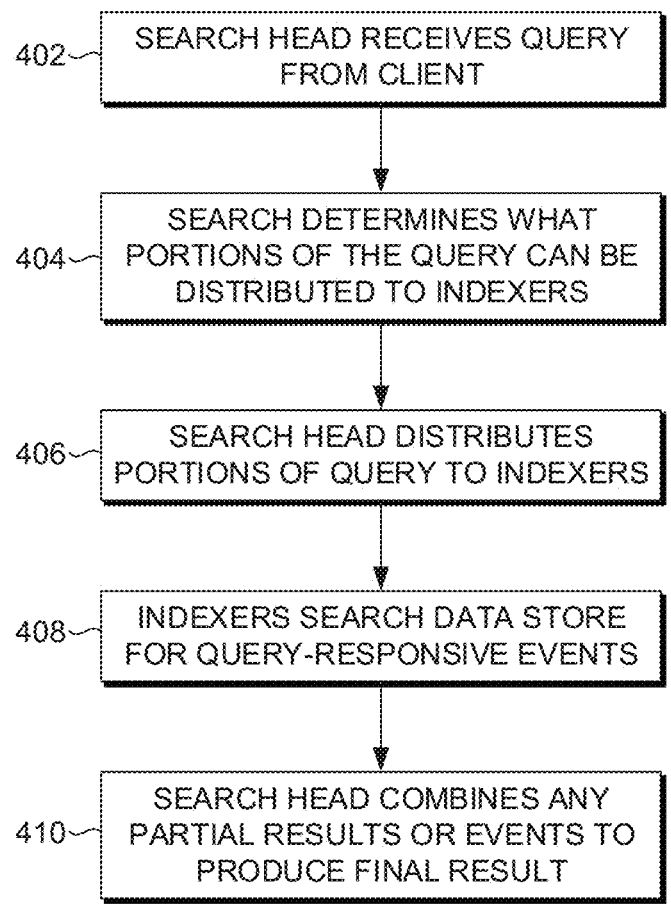
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
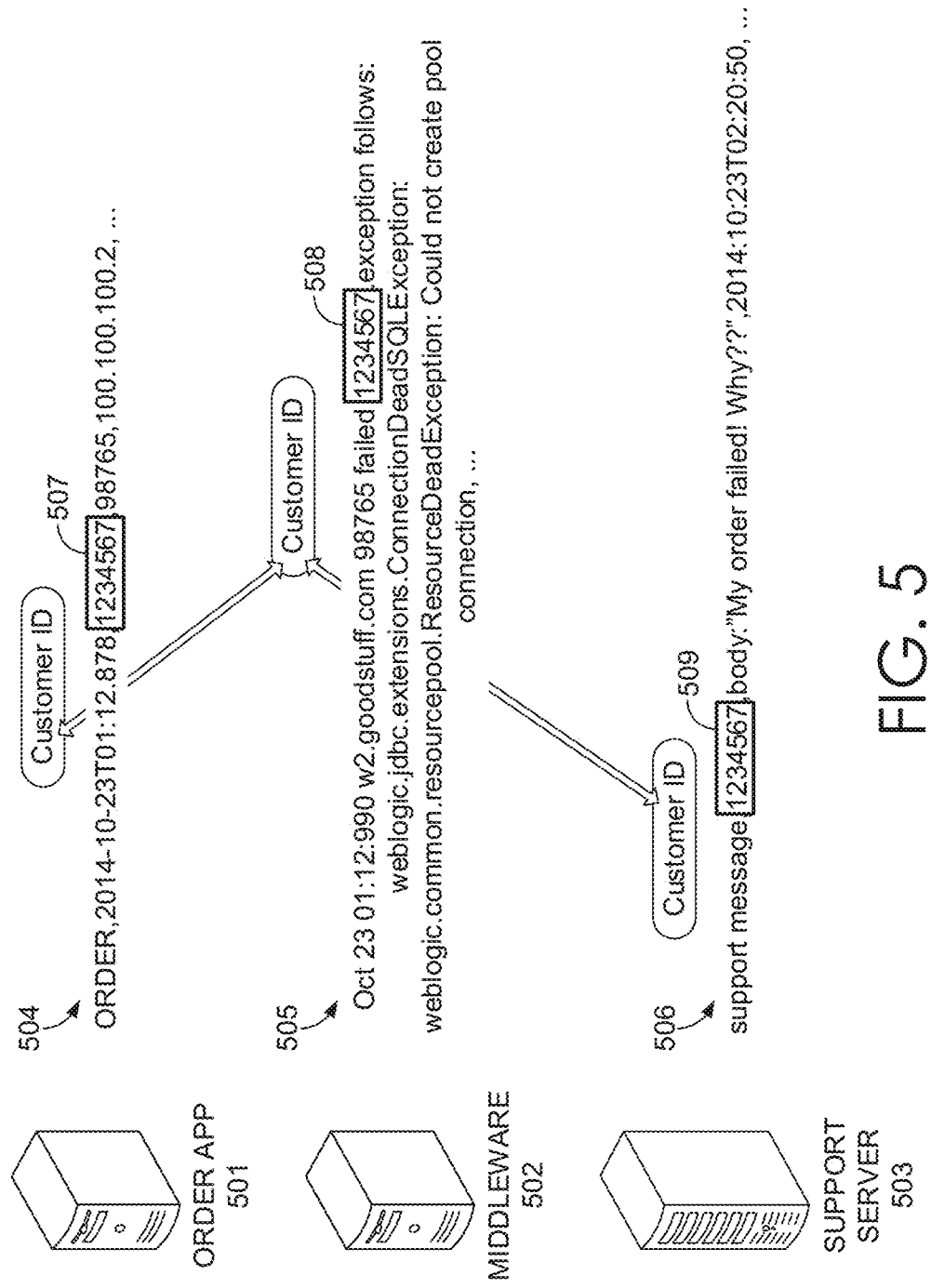
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
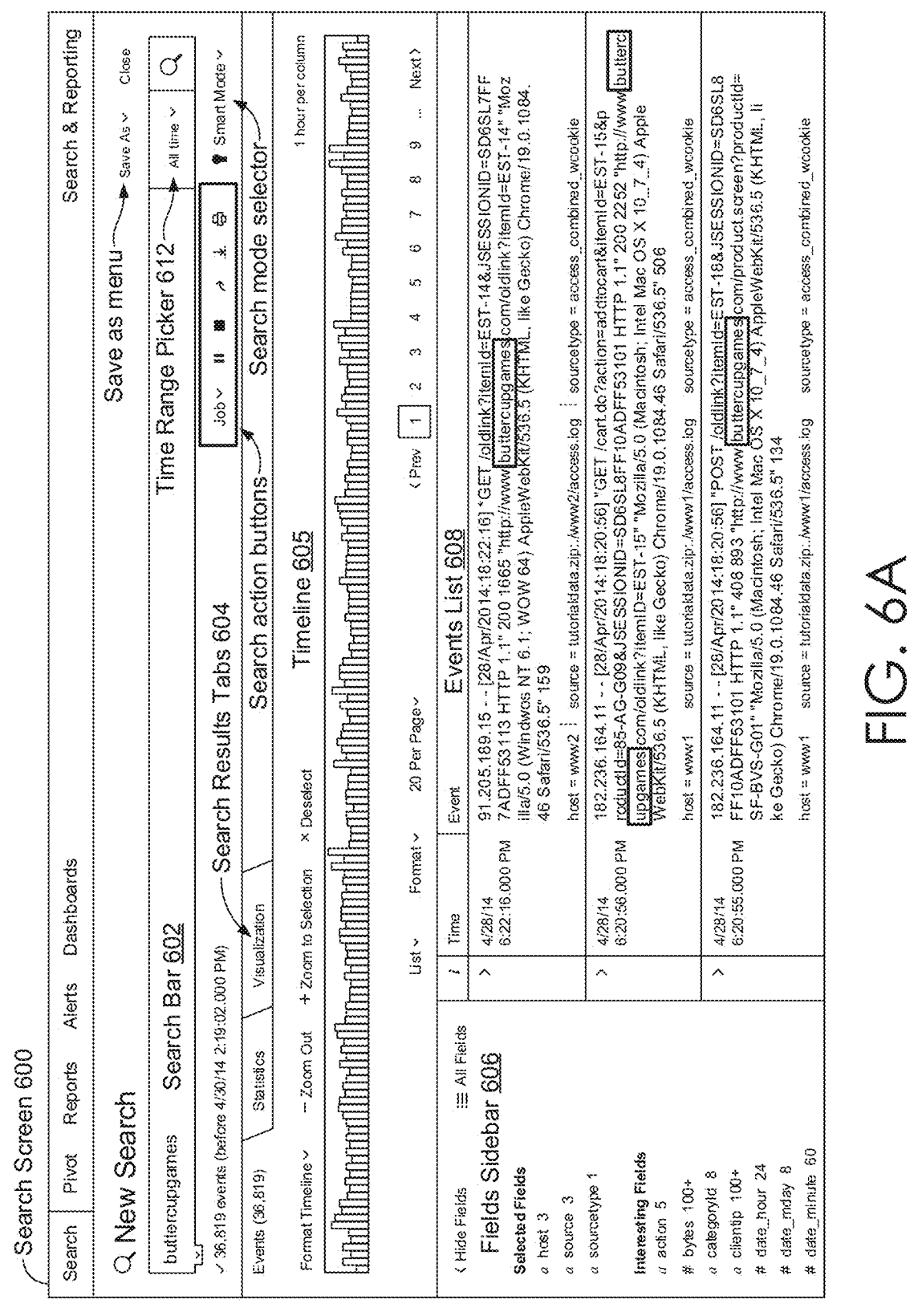

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets.

It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
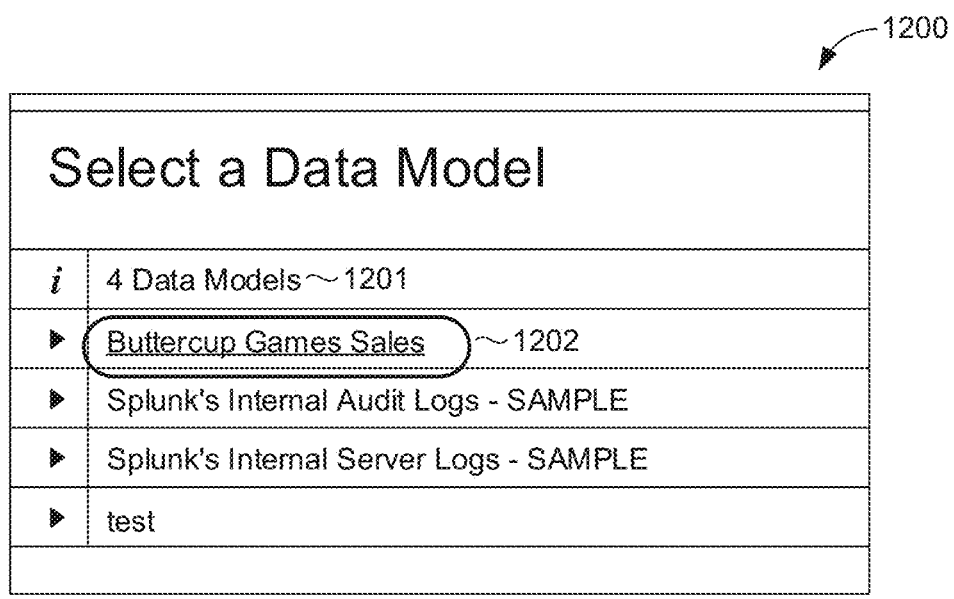
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
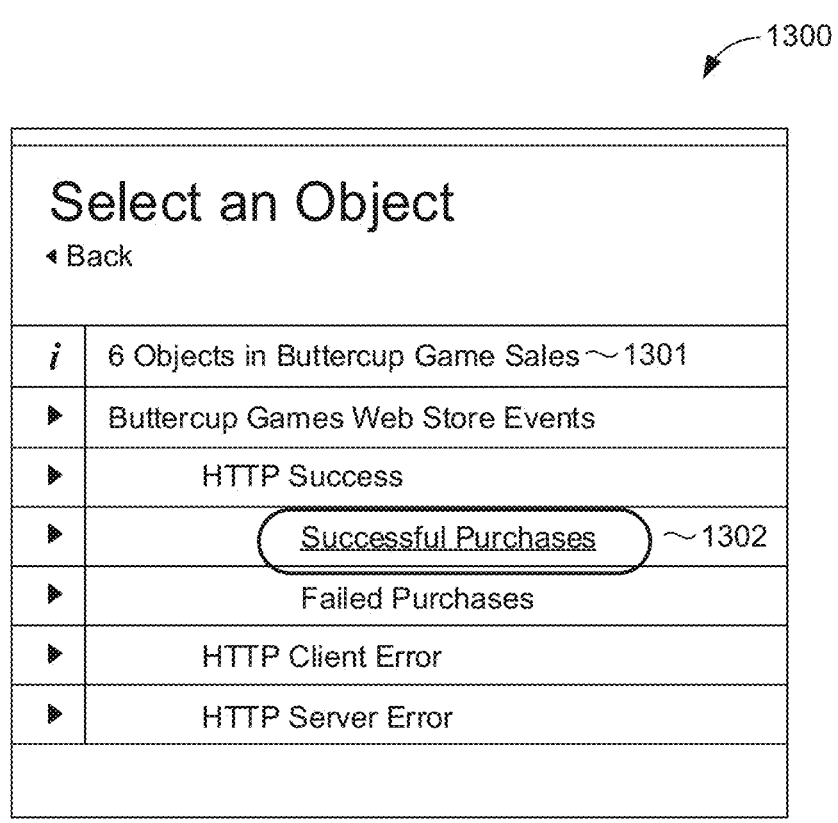

FIG. 13 illustrates an example data model object selection graphical user interface 1300 that displays available data objects 1301 for the selected data object model 1202. The user may select one of the displayed data model objects 1302 for use in driving the report generation process.

Figure 7A:
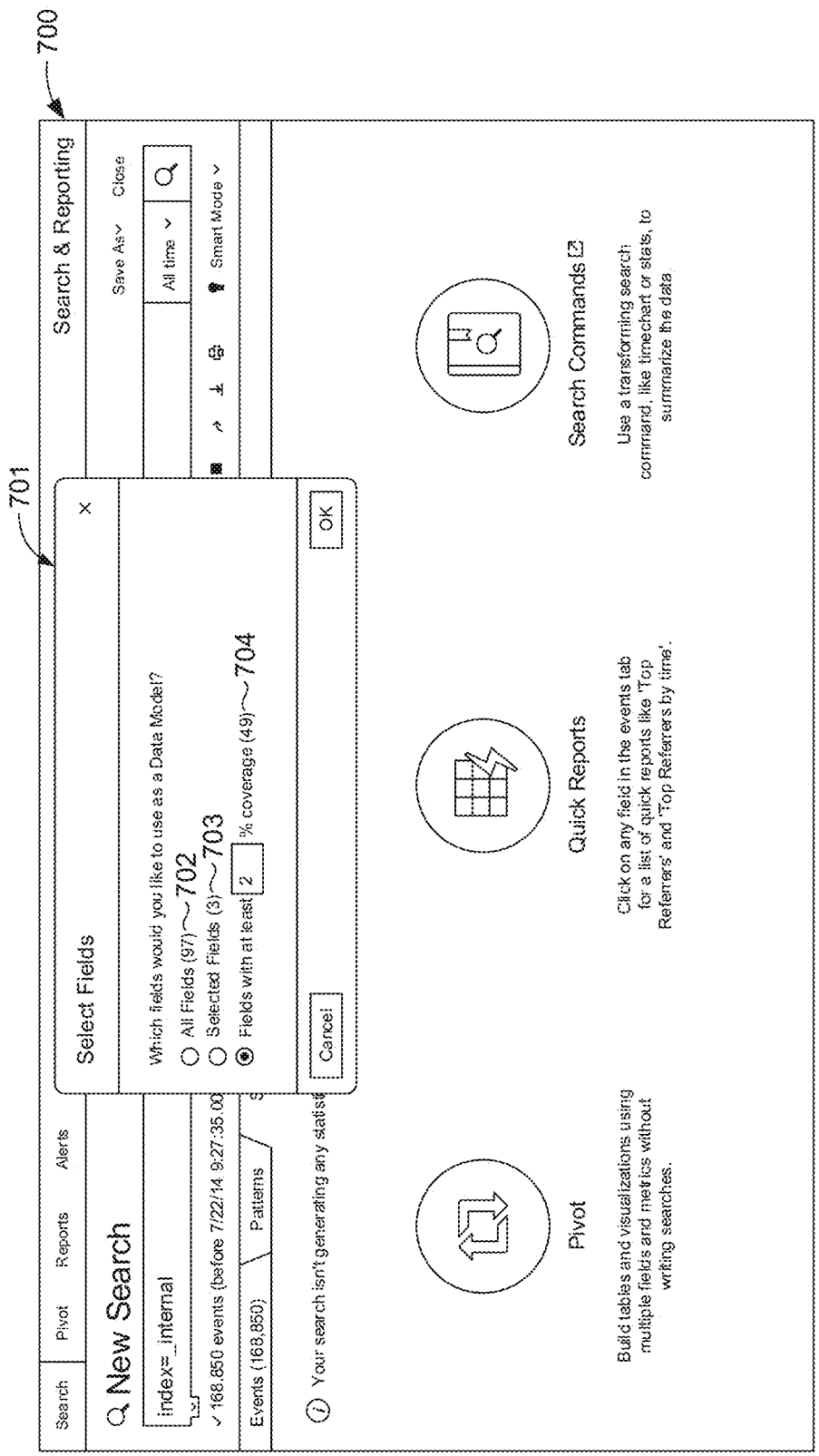
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
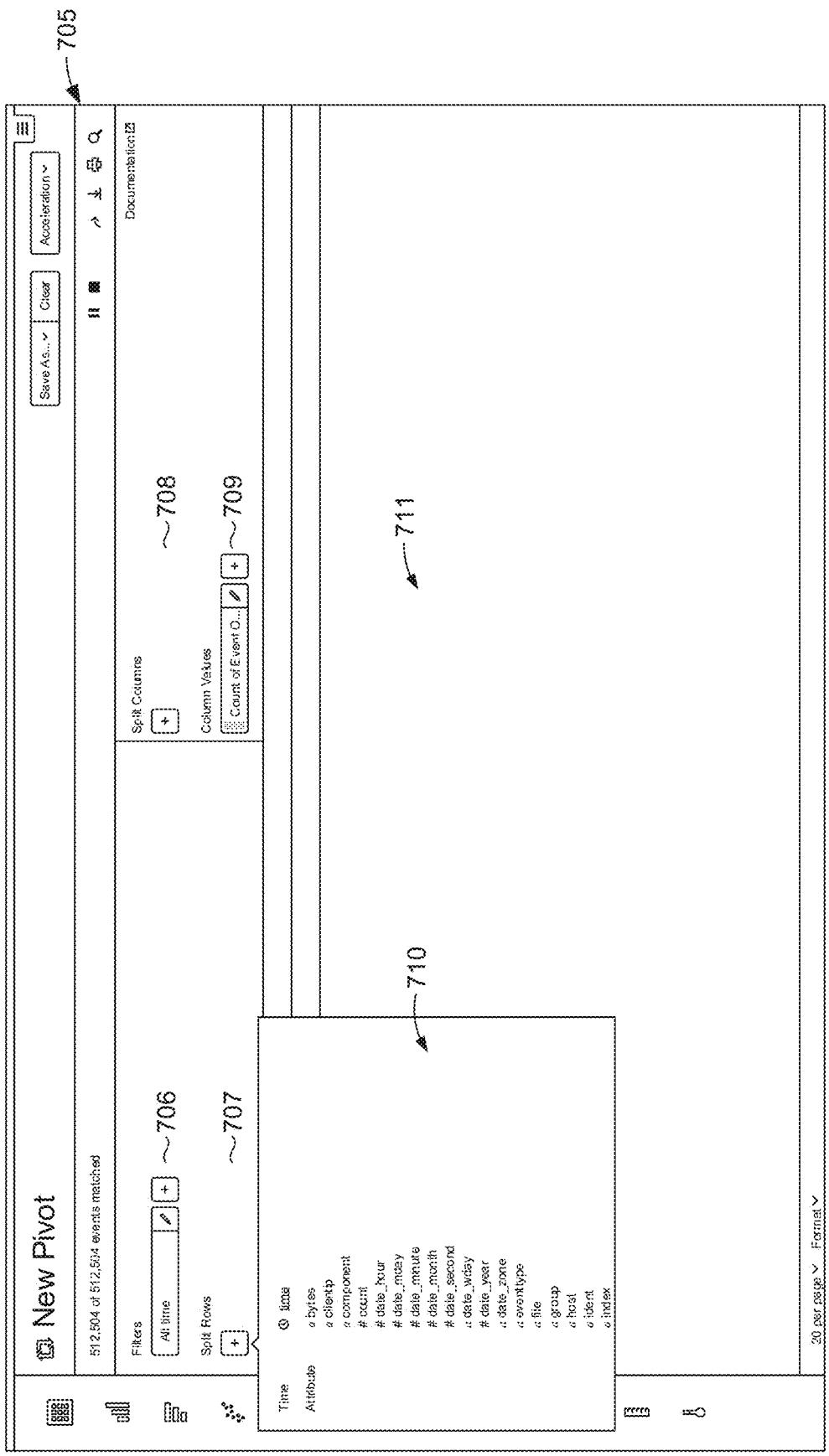
Figure 7C:
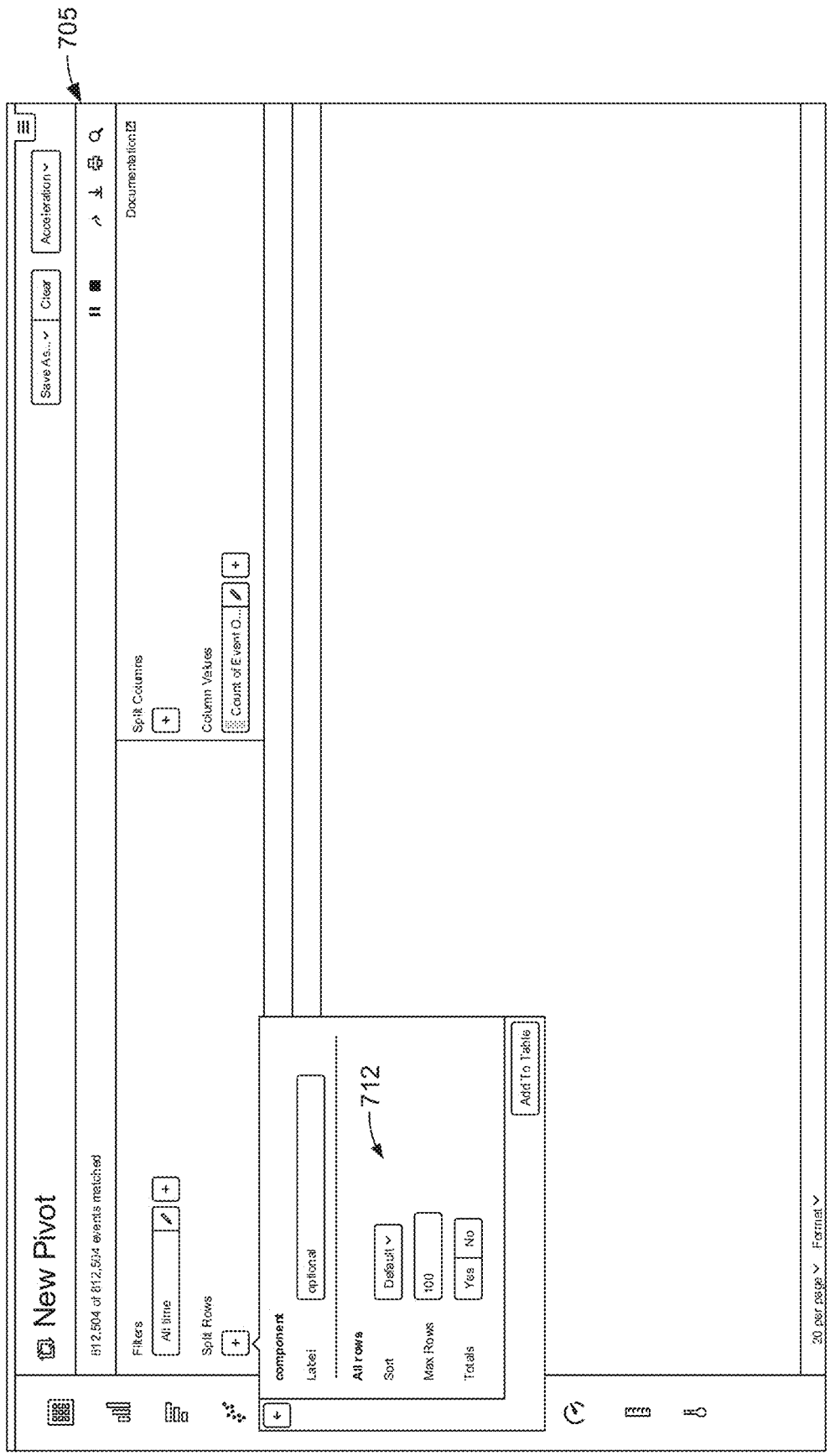

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
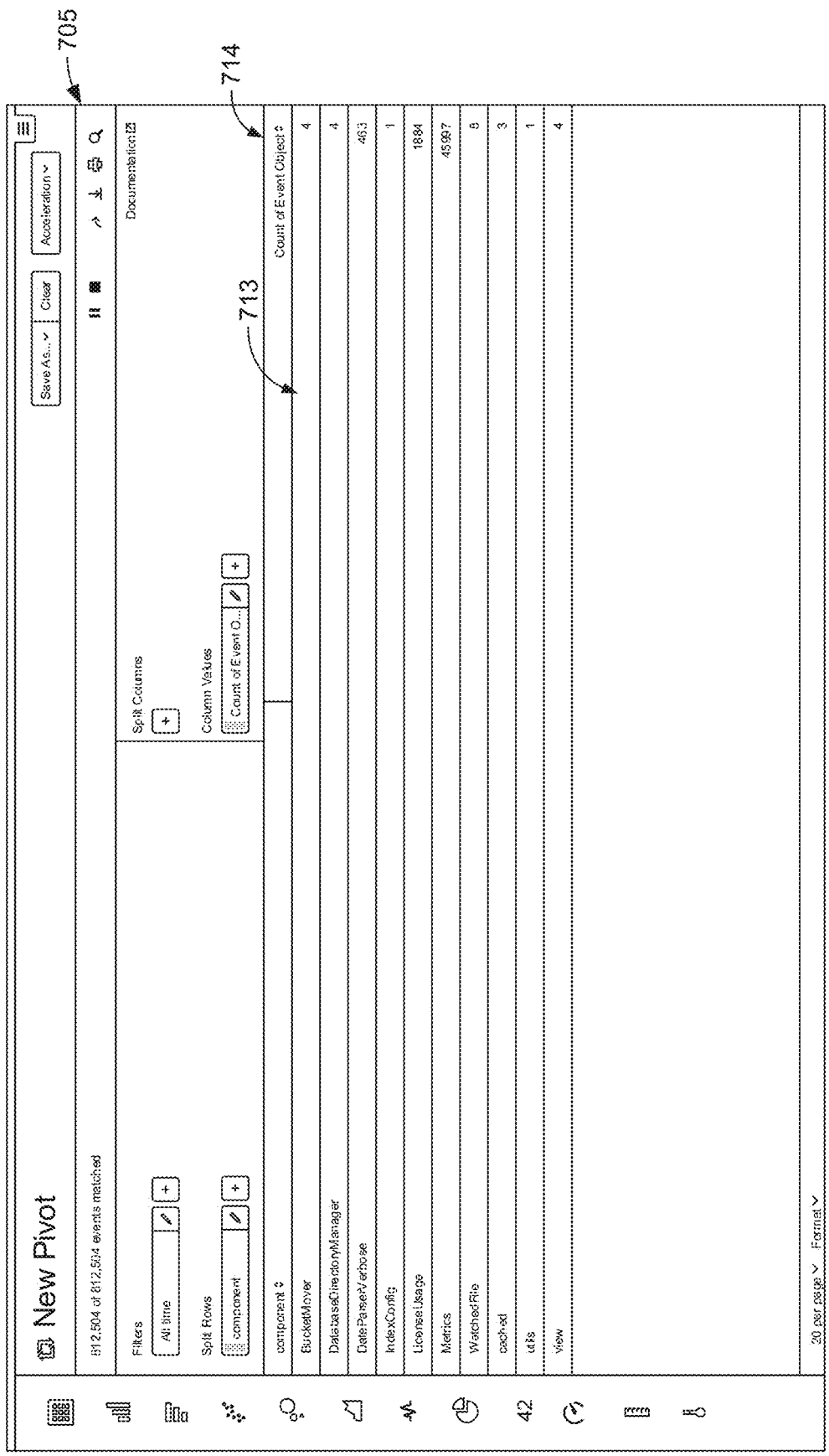

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:
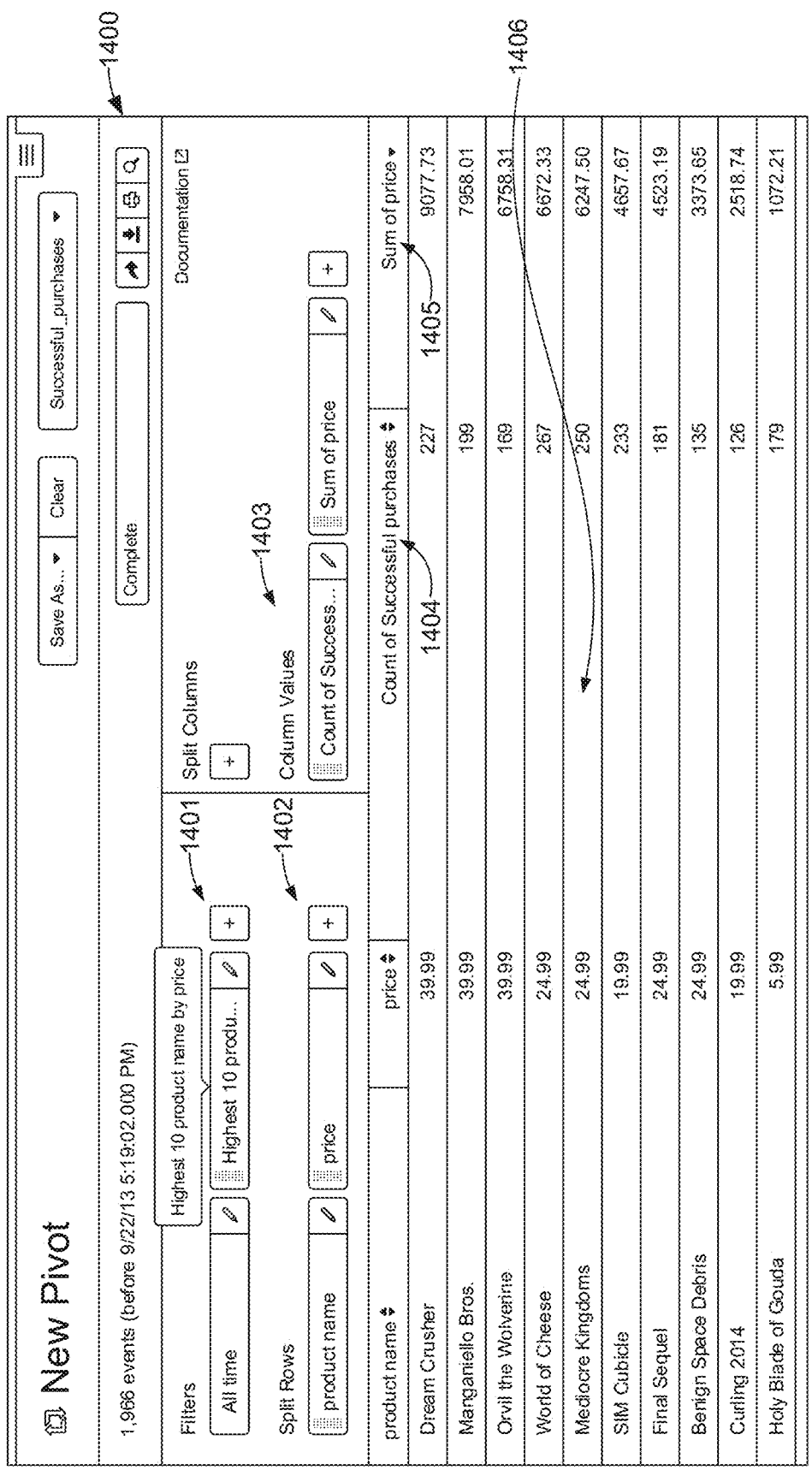

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 15:
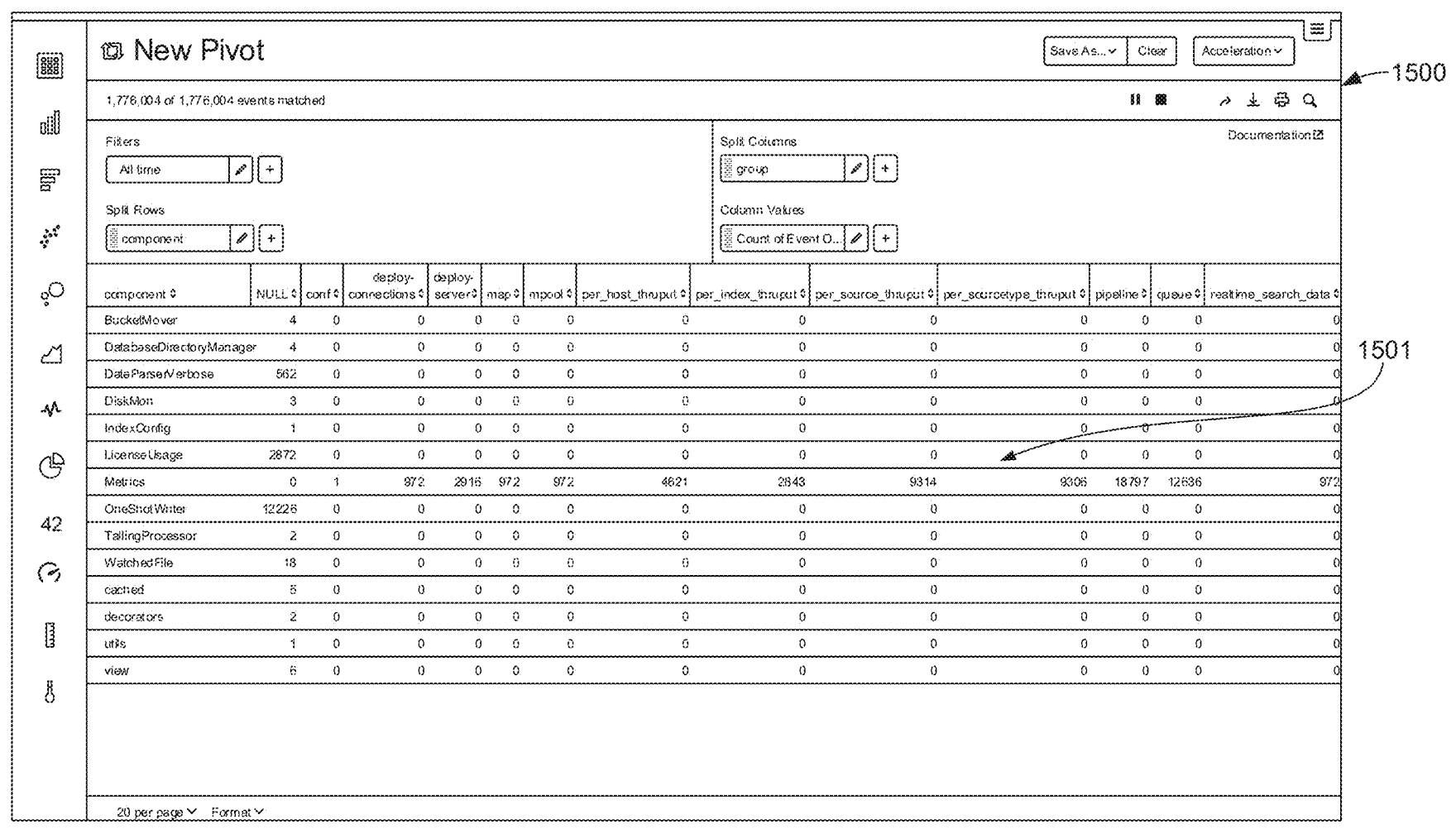
Figure 16:
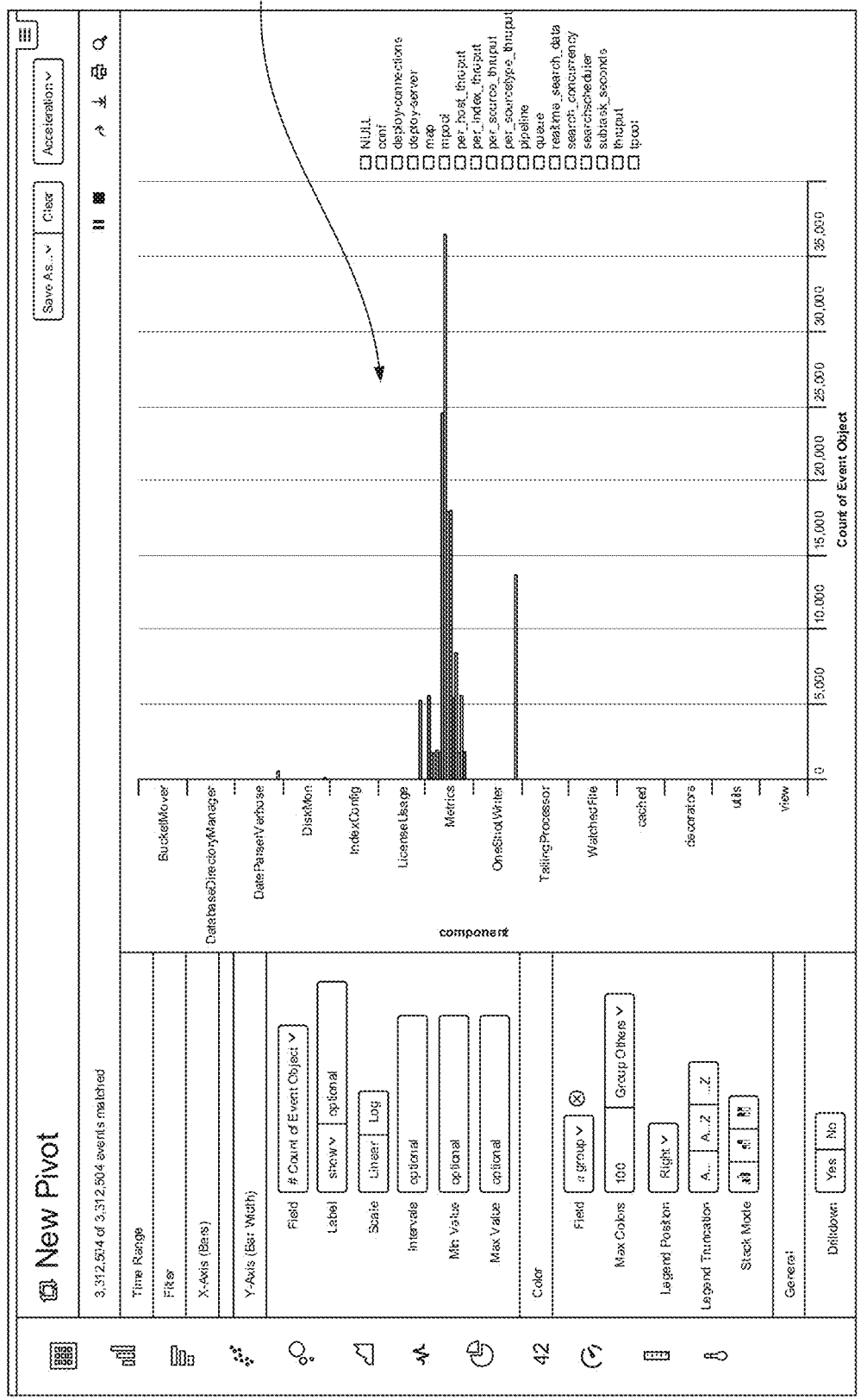
Figure 17:
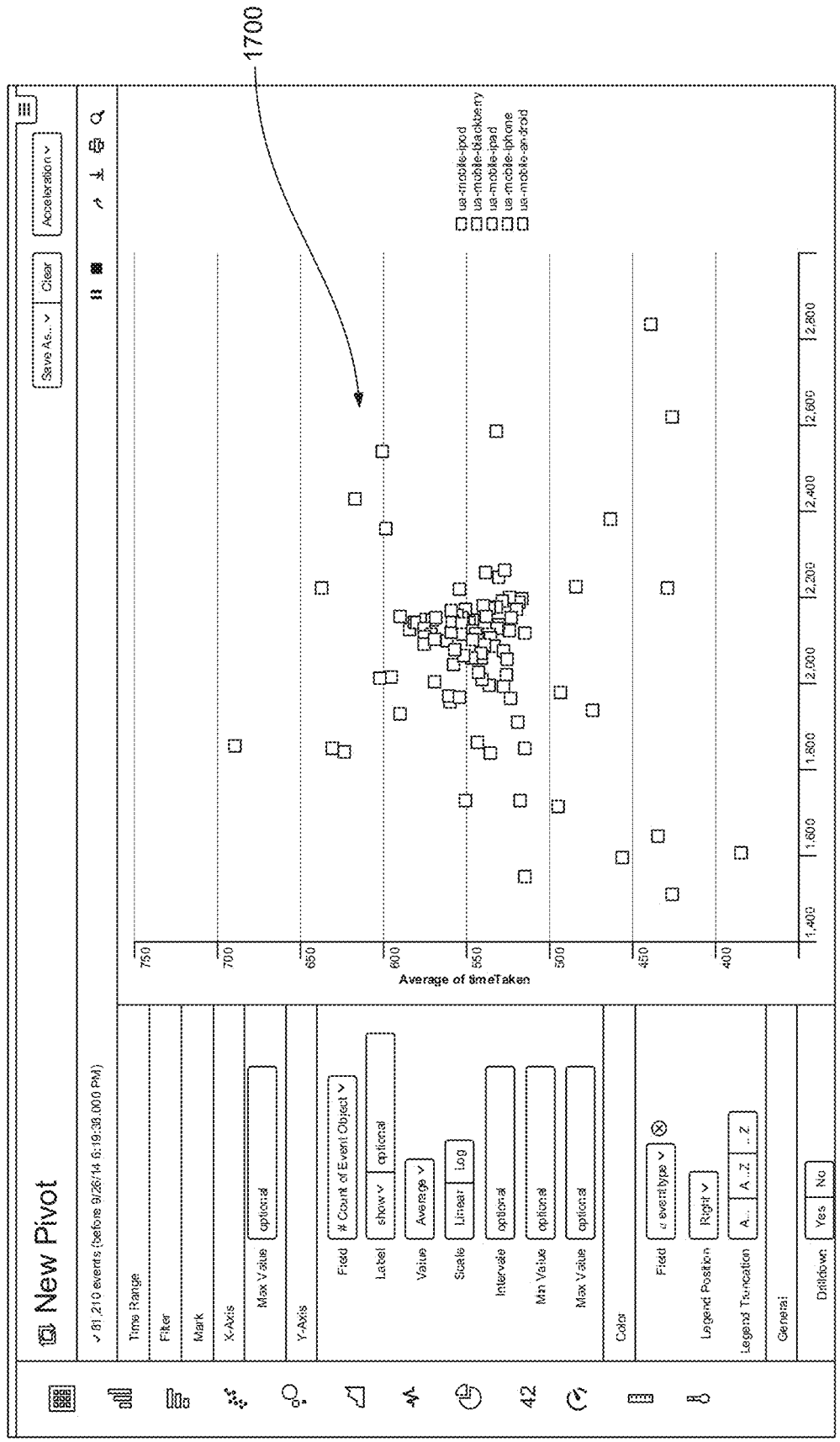

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
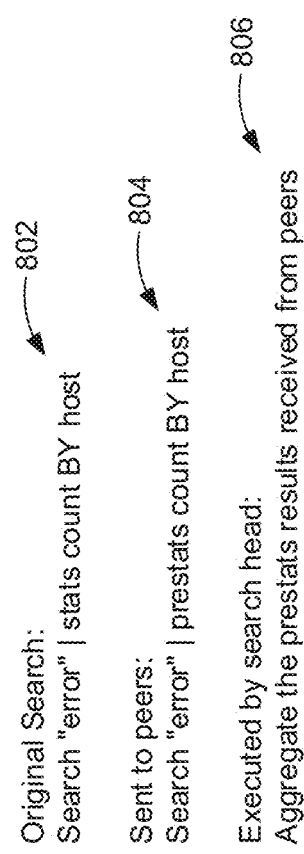
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
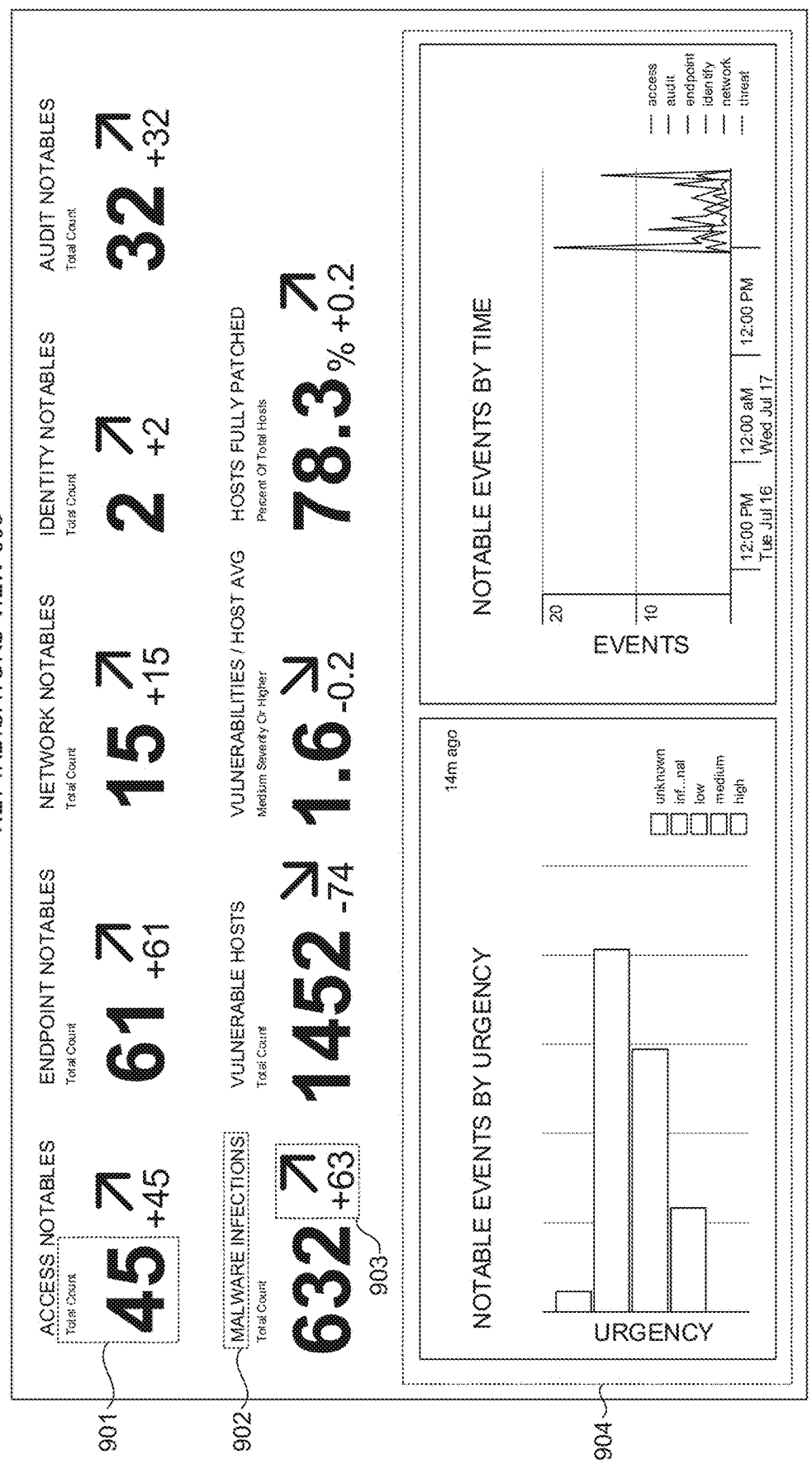
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
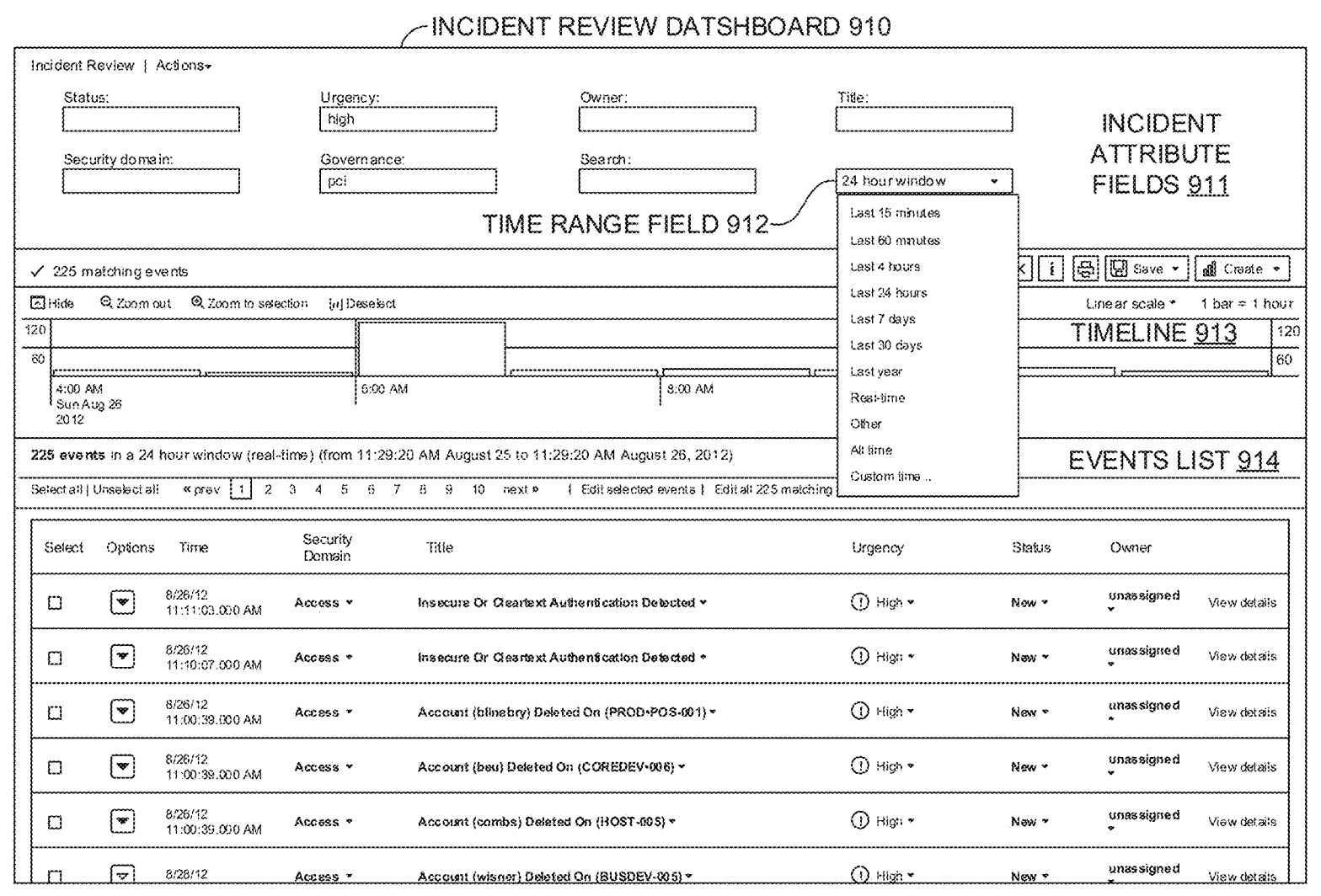

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
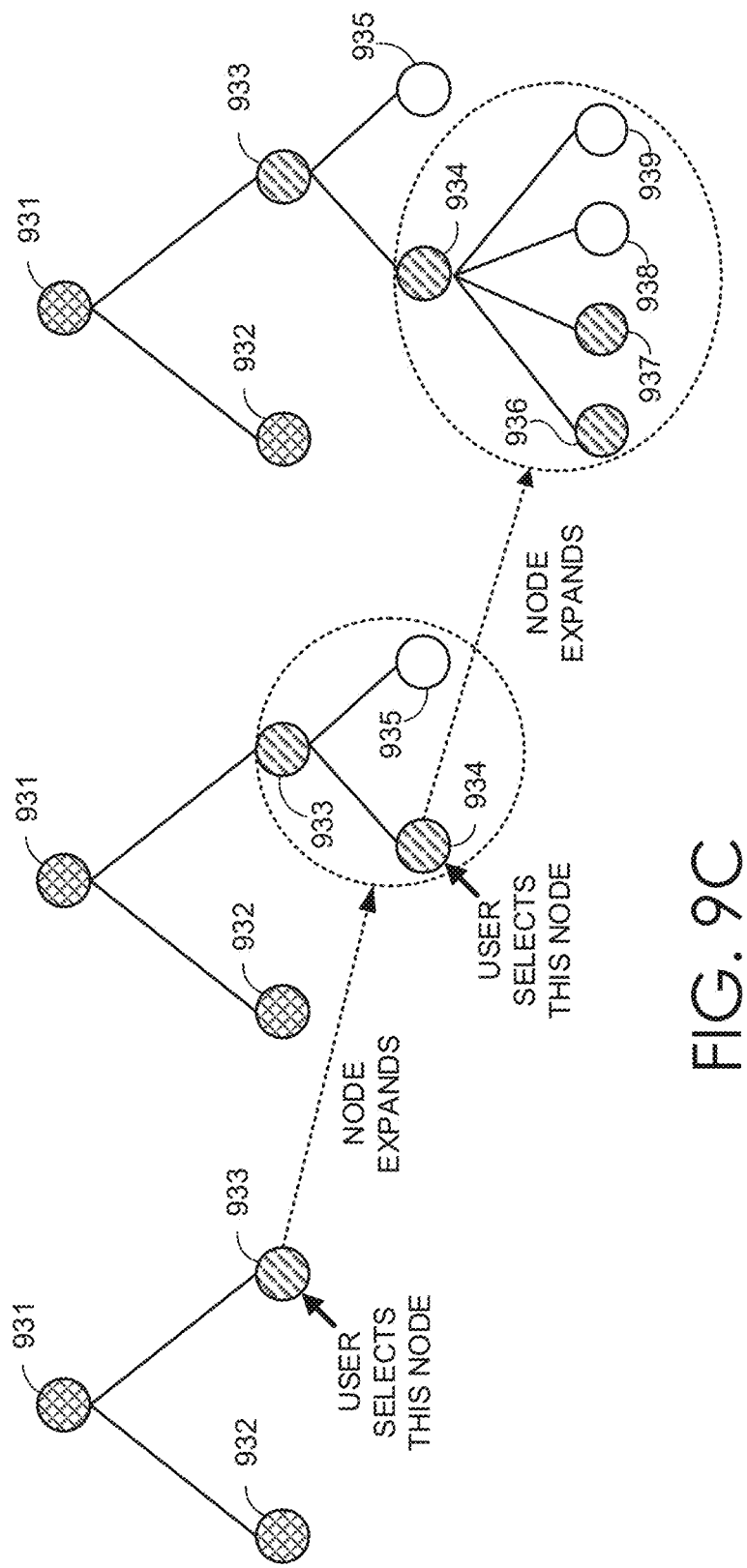
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
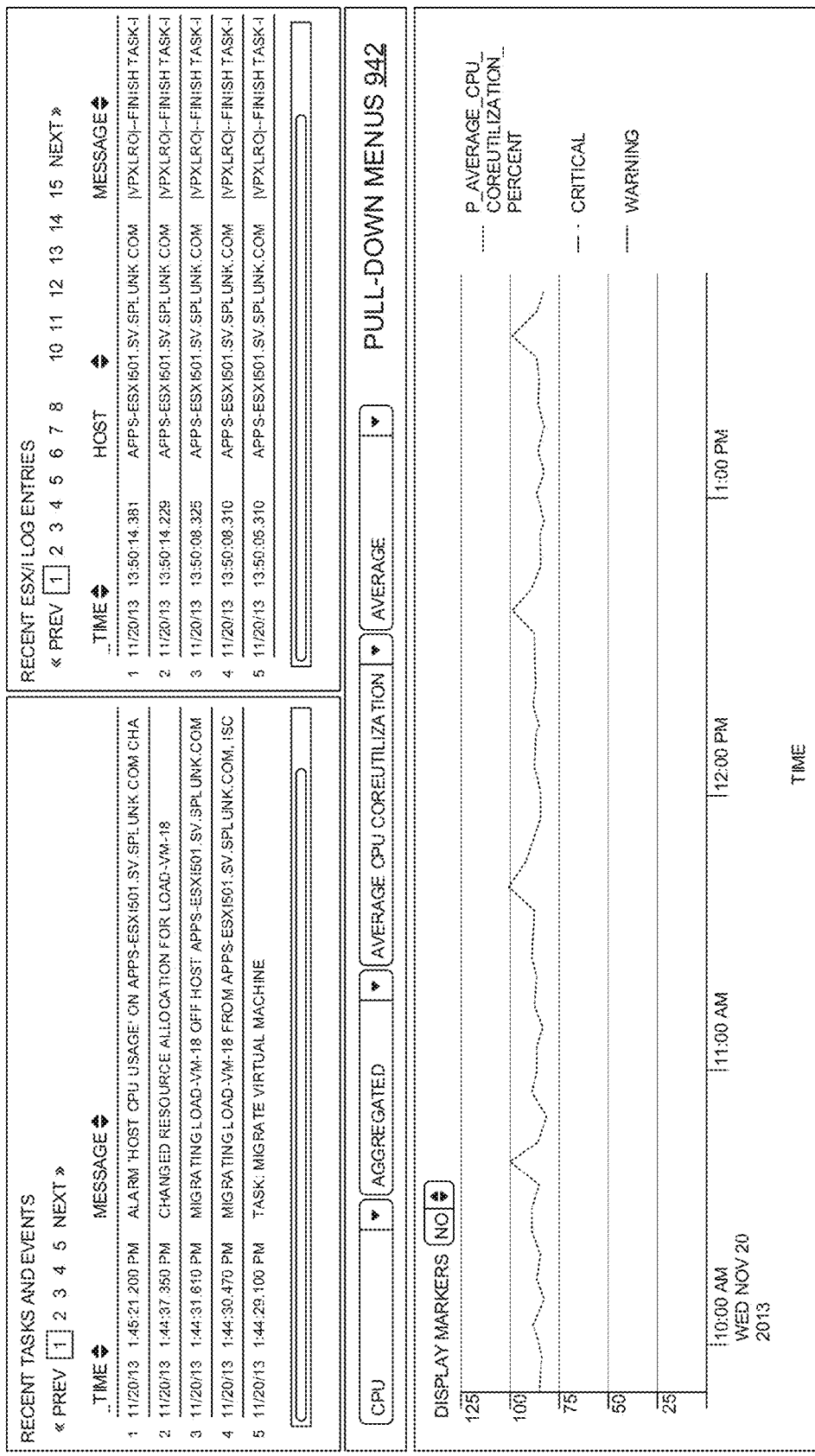
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
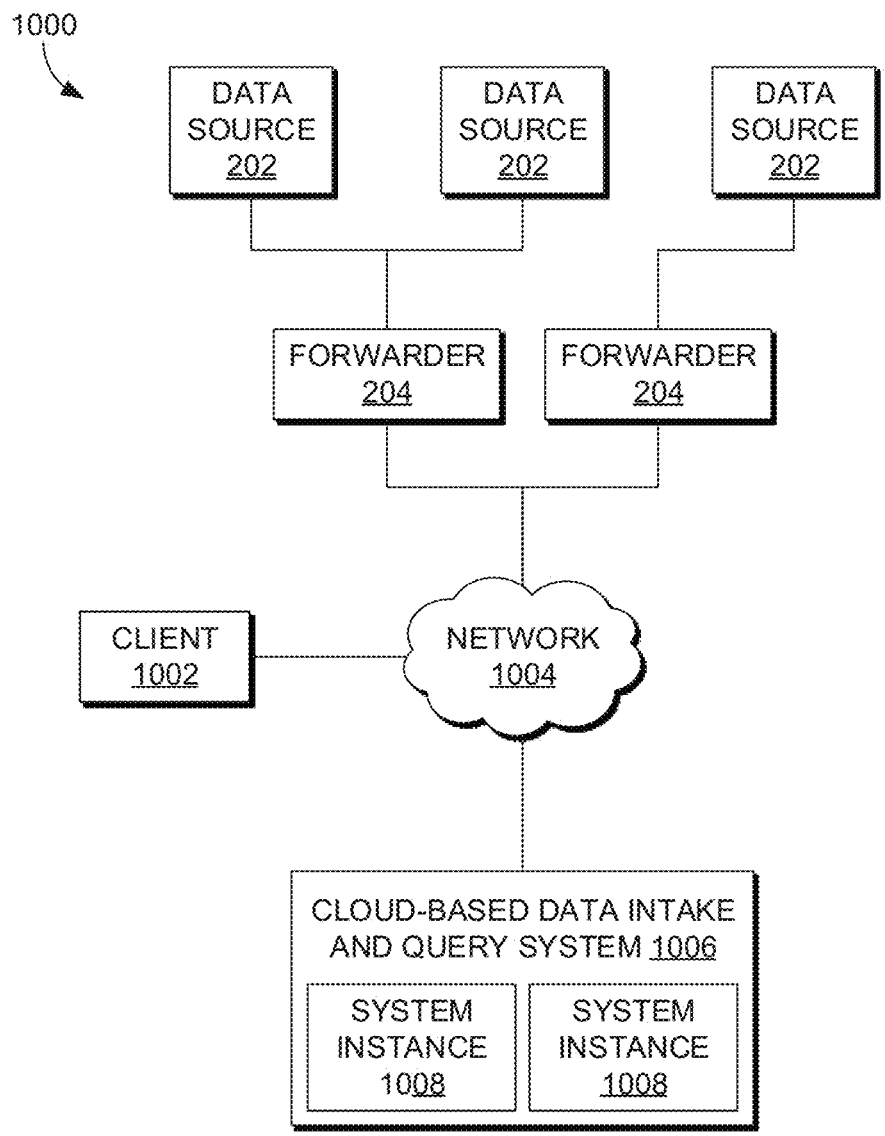
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
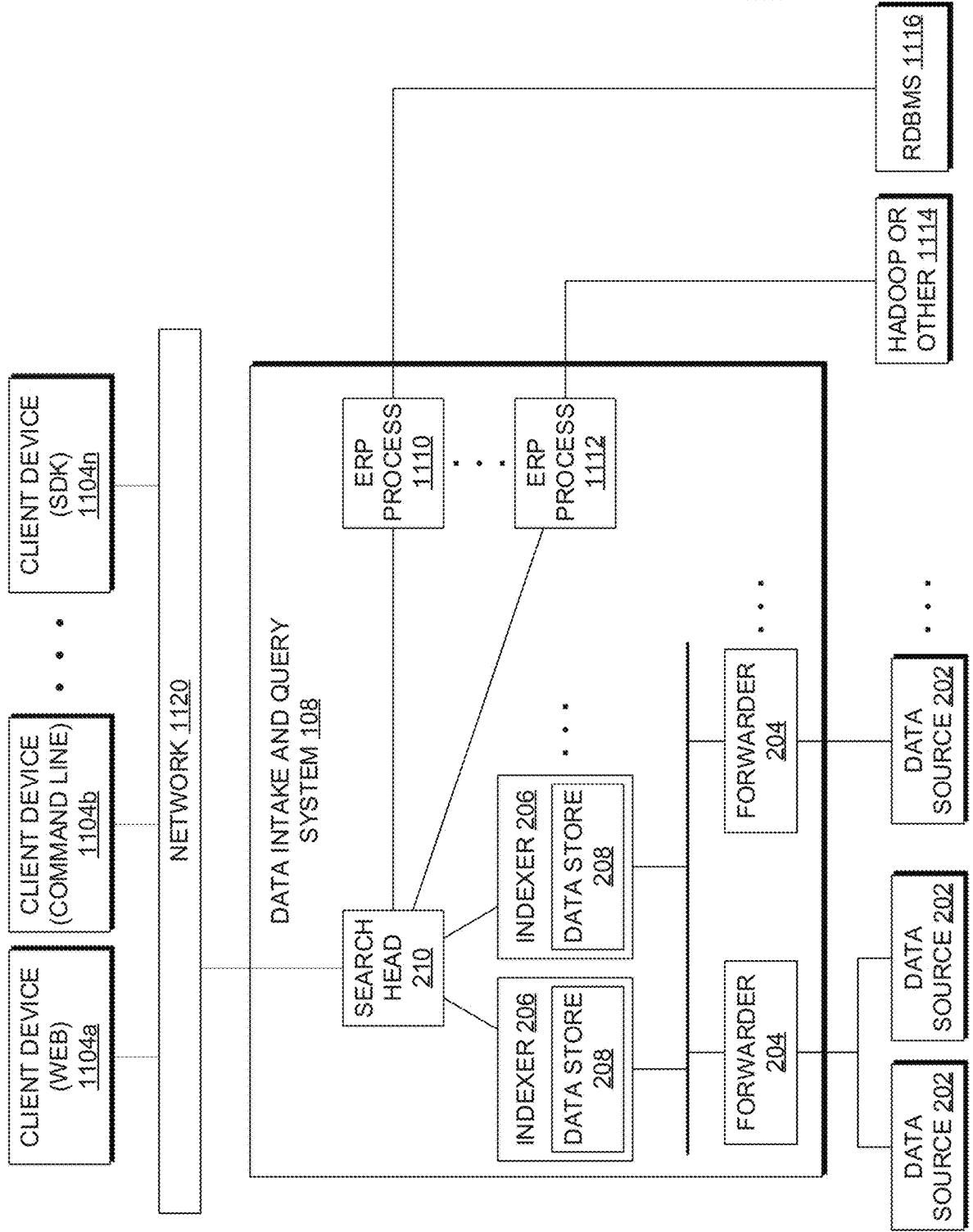
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the data streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE can include informational fields that can serve as metadata, implied data fields, or attributed data fields for the events identified by other aspects of the entity definition. Entity definitions in SPLUNK® IT SERVICE INTELLIGENCE can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE provides various visualizations built on its service-centric organization of event data and the KPI values generated and collected. Visualizations can be particularly useful for monitoring or investigating service performance. SPLUNK® IT SERVICE INTELLIGENCE provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE provides pre-specified schemas for extracting relevant values from the different types of service-related event data. It also enables a user to define such schemas.

3.0. FUNCTIONAL OVERVIEW

Approaches, techniques, and mechanisms are disclosed that enable collection of various types of data from cloud computing services and the generation of various dashboards and visualizations to view information about collections of cloud computing resources. In one embodiment, a user can configure collection of data from one or more cloud computing services and view visualizations using an application platform referred to herein as a cloud computing management application. For example, a cloud computing management application may be implemented as an "app" or "add-on" of a data intake and query system, such as the SPLUNK® ENTERPRISE platform. In other implementations, a cloud computing management application may be part of another type of application or implemented as a stand-alone application.

As used herein, a cloud computing service generally refers to any collection of remote computing services offered by a cloud computing service provider. Non-limiting examples of cloud computing services include Amazon Web Services (AWS®) offered by Amazon.com, Inc. of Seattle, Wash., Microsoft AZURE™ offered by Microsoft Corporation of Redmond, Wash., and Google Cloud Platform™ offered by Google, Inc. of Mountain View, Calif. In the context of such cloud computing services, cloud computing resources generally refer to any instances and/or associated components of the services offered by a cloud computing service provider. Examples of cloud computing resources include, but are not limited to, server instances, storage volumes, virtual private clouds, subnets, access control lists, etc.

A user or organization may purchase cloud computing resources from one or more cloud computing services for any of a vast number of purposes, including to host and execute web-based applications developed by the organization, to provide data storage for the organization's data, to provide computing resources to perform data analysis, etc. For example, an organization developing a web-based mobile application may pay to use a number of cloud-based server instances to host and execute application code, purchase storage volumes and database servers to store and process application data, and so forth, typically on a "pay as you go" or similar payment model. By using computing resources provided by a cloud computing service provider, an organization can avoid some of the upfront investments in hardware and maintenance costs that may otherwise be incurred if the organization purchased computing hardware for itself. Furthermore, scaling an organization's computing resource needs often may be more easily accomplished using a cloud-based computing service as an organization's compute and/or storage needs increase or decrease.

Cloud computing service providers typically provide web-based management consoles that enable users of the services to create, modify, delete, and view cloud computing resources provisioned by the users. For example, a cloud computing service may provide one interface that displays a list of a user's currently deployed server instances and further enables the user to create new server instances, modify various aspects of specific server instances, and delete server instances. Many cloud computing service providers further may group resources into various geographic regions (e.g., to reduce network latency and improve fault-tolerance), and a user may also be able to use the management console interfaces to select particular regions and view server instances associated with each region. Another example interface may be provided that displays a list of storage volumes currently in use, including references to one or more server instances associated with each of the storage volumes. Yet another separate interface may be provided that displays a list of configured virtual private clouds, and so forth.

While conventional cloud computing service management consoles enable users to view some information related to the user's cloud computing resources, the disconnected nature of such interfaces may present challenges when attempting to obtain broader information about an entire collection of resources. For example, if a user is investigating the operation of a particular server instance, the user may view one management console interface for information about the server instance itself, then navigate to a separate interface to view information about one or more storage volumes connected to the server instance, and then navigate to yet another interface to view information about a virtual private cloud with which the server instance is associated, etc. The navigation across such interfaces may involve manual cross-correlation of resource identifiers or other information to locate the appropriate resources. Furthermore, if the server instances of interest are spread across different service regions, across separate user accounts, or even across different cloud service providers, the investigation and analysis process becomes increasingly cumbersome.

In one embodiment, a cloud computing management application is configured to collect data related to a collection of cloud computing resources and to store the data in a format that enables more efficient analysis, for example, as event data stored by a data intake and query system. The collected data generally may comprise any available information related to the computing resources, including performance data, relationship data, state data, log data, etc., and may originate from cloud computing service providers or any other source. In an embodiment, a cloud computing management application is further configured to generate and cause display of interactive topology map representations of cloud computing resources based on the collected data. As described hereinafter, an interactive topology map enables users to view an intuitive visualization of a collection of computing resources, efficiently cause performance of actions with respect to various resources displayed in the topology map, and analyze the collection of resources in ways that are not possible using conventional cloud computing service management consoles.

In other aspects, the invention encompasses a computer apparatus and a computer-readable medium configured to carry out the foregoing steps.

3.1. Cloud Computing Management Application Overview

Figure 18:
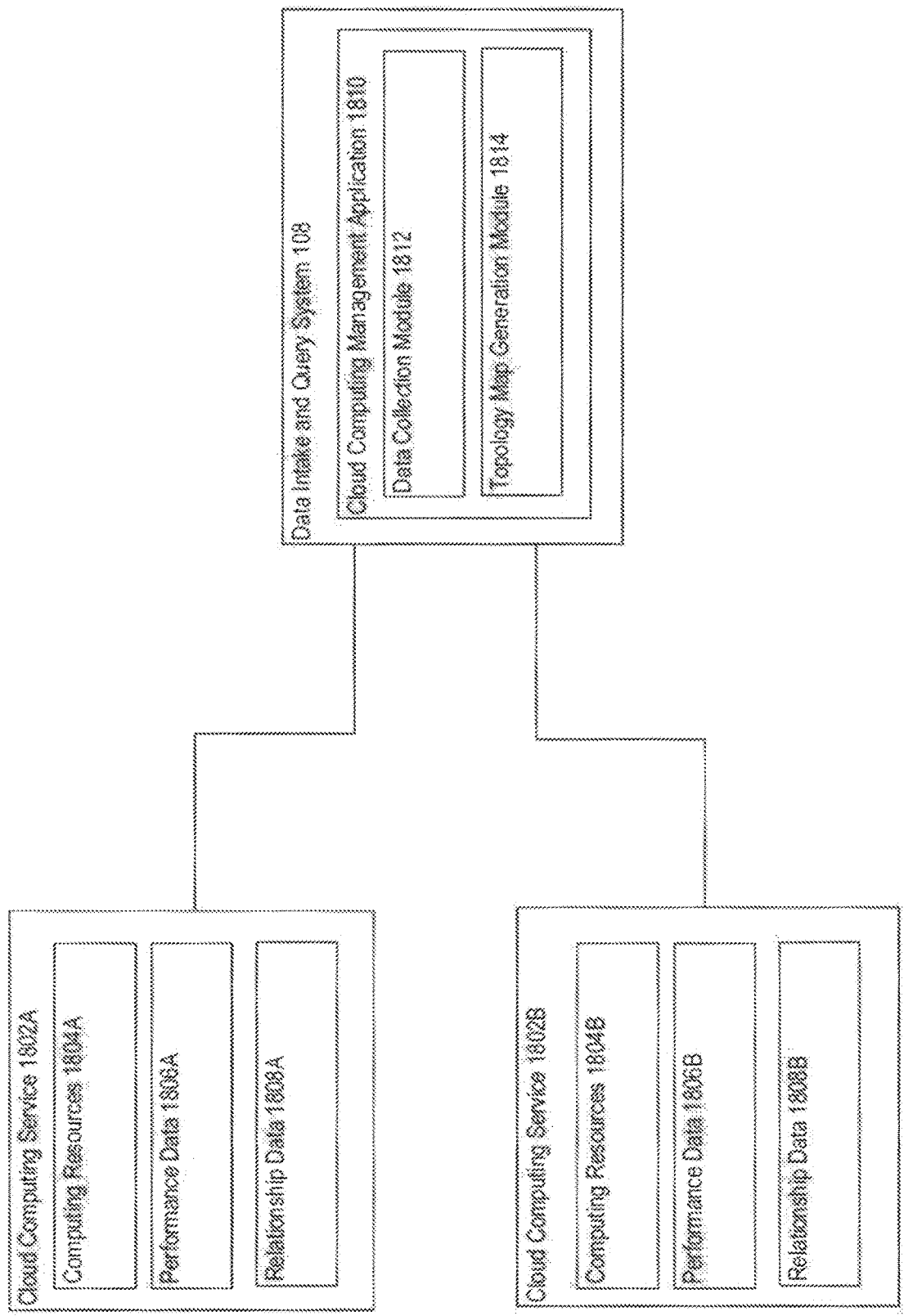
FIG. 18 illustrates an overview of a networked computer environment that enables a cloud computing management application to collect data related to a collection of cloud computing resources and to display various visualizations related to the cloud computing resources in accordance with the disclosed embodiments.

FIG. 18 illustrates an overview of a networked computer environment that enables a cloud computing management application to collect data related to a collection of cloud computing resources and to display various visualizations related to the cloud computing resources. The networked computer environment of FIG. 18 includes cloud computing services 1802A and 1802B and data intake and query system 108.

In an embodiment, each of cloud computing services 1802A and 1802B generally represents any collection of remote computing services offered by a cloud computing service provider. As described above, non-limiting examples of cloud computing services include Amazon Web Services (AWS®) offered by Amazon.com, Inc. of Seattle, Wash., Microsoft AZURE offered by Microsoft Corporation of Redmond, Wash., and Google Cloud Platform™ offered by Google, Inc. of Mountain View, Calif. For illustrative purposes, two separate cloud computing services are depicted in FIG. 18, however, a cloud computing management application as described herein may collect data from any number of separate cloud computing services.

In an embodiment, each of cloud computing services 1802A, 1802B includes a collection of computing resources 1804A, 1804B, performance data 1806A, 1806B, and relationship data 1808A, 1808B, respectively. The computing resources 1804A, 1804B generally represent any instances and/or associated components of one or more types of computing resources offered by the respective cloud computing services. For example, users generally can create user accounts with one or more cloud computing services and create server instances, storage volumes, virtual private clouds, etc.

In an embodiment, performance data 1806A, 1806B and relationship data 1808A, 1808B generally represent various types of data generated by the respective cloud computing services related to computing resources managed by each service. Performance data may include, for example, activity log files, configuration data, operating status information, performance metrics, or any other data that is generated by the cloud computing services related to computing services under management. Relationship data generally may include any data that relates to relationships among the computing resources (e.g., relationship data may indicate that a particular storage volume is attached to a particular server instance, that a particular server instance is a member of a particular subnet, etc.). Relationship data may be generated explicitly by a cloud computing service or may be derived from other data generated by the service.

In an embodiment, a cloud computing management application 1810 may be configured as "add-on" or "app" of a data intake and query system 108. In other examples, a cloud computing management application 1810 may be part of another type of application, or may be implemented as a standalone application. In general, a cloud computing management application 1810 enables users to configure collection of data from any number of cloud computing services and further includes various interfaces for displaying information related to a user's cloud computing resources.

In an embodiment, a cloud computing management application 1810 includes a data collection module 1812 and a topology map generation module 1814. A data collection module 1812 may include program logic that enables configuration of one or more data sources from which data may be collected, and further enables collection of data from the configured data sources and storage of the data for subsequent retrieval and analysis. More detailed information about the configuration and collection of data from cloud computing data sources is provided hereinafter in Section 3.2.

Figure 19:
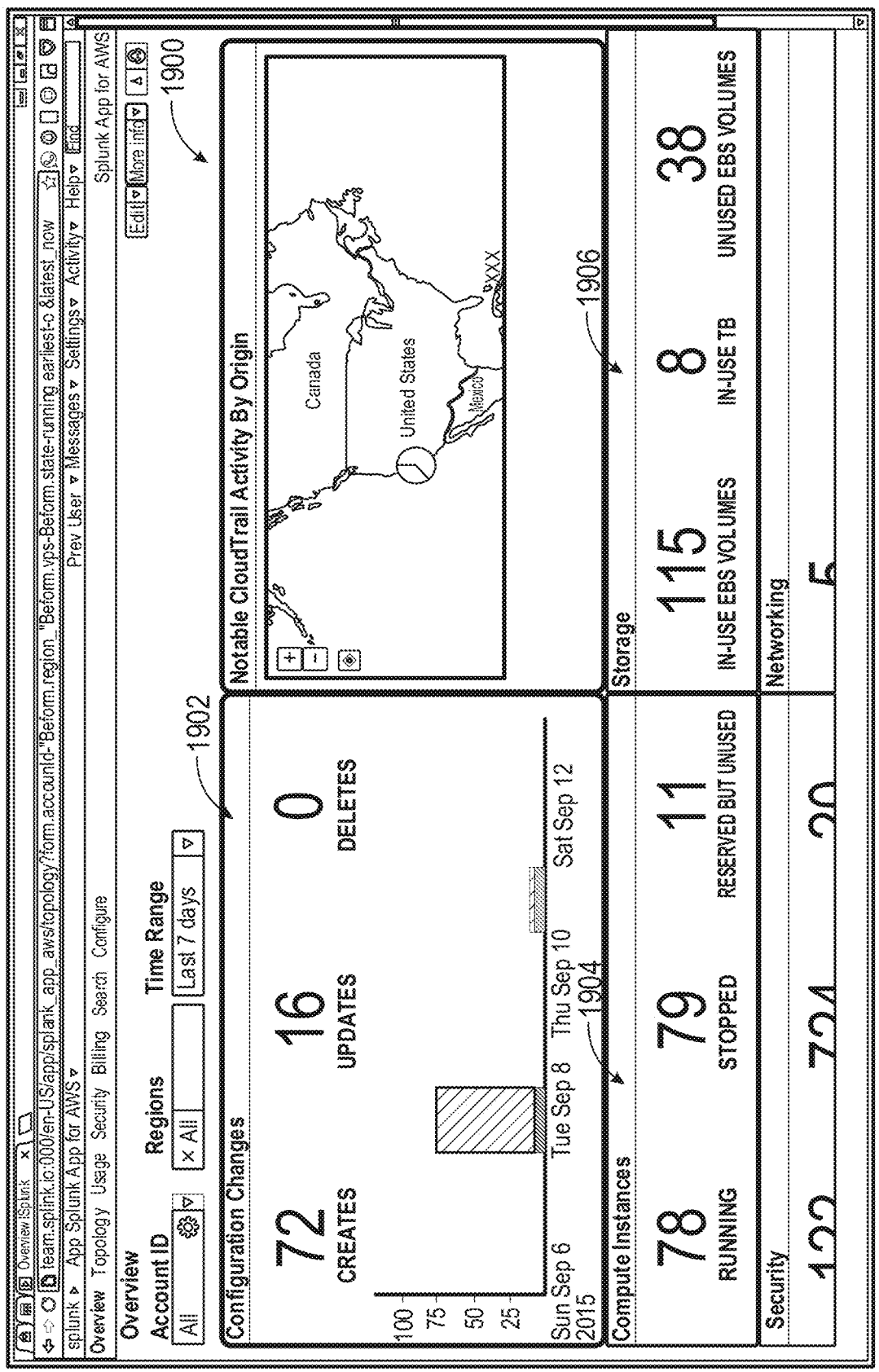
FIG. 19 illustrates a cloud computing key indicators view providing information related to a collection of cloud computing resources in accordance with the disclosed embodiments.

As indicated above, a cloud computing management application 1810 may provide various interfaces that display information about a collection of cloud computing resources. For example, FIG. 19 illustrates an example cloud computing key indicators interface 1900 that enables users to view performance, security, and other metrics related to a collection of cloud computing resources for which data collection has been configured. The interface 1900, for example, comprises a dashboard which displays configuration metrics 1902 (e.g., providing information about a number of configuration changes over time), server instance metrics 1904 (e.g., providing information about a total number of running, stopped, and/or reserved server instances), storage metrics 1906 (e.g., providing information about a total number of volumes in use, a total amount of storage space used, etc.), among other indicators. In general, metrics displayed on a cloud computing key indicators interface 1900 may be generated based on performance data, relationship data, cost data, or any other data collected from one or more cloud computing services and/or other sources.

In an embodiment, a cloud computing management application 1810 further includes a topology map generation module 1814 which enables the generation and display of interfaces which include an interactive topology map configured to visualize a collection of cloud computing resources and relationships among the cloud computing resources. For example, an interactive topology map generated by a topology map generation module 1814 generally may comprise a collection of nodes and edges, where each node in the map represents one or more resources of the collection, while each edge connecting two nodes represents a relationship between resources corresponding to the two nodes. Furthermore, in contrast to a static topology map, interactive topology maps as described herein provide the ability for users to interact directly with the displayed resources (e.g., by specifying actions to perform on the resources, selecting map elements to view performance metrics related to the corresponding resources, etc.)

Figure 20:
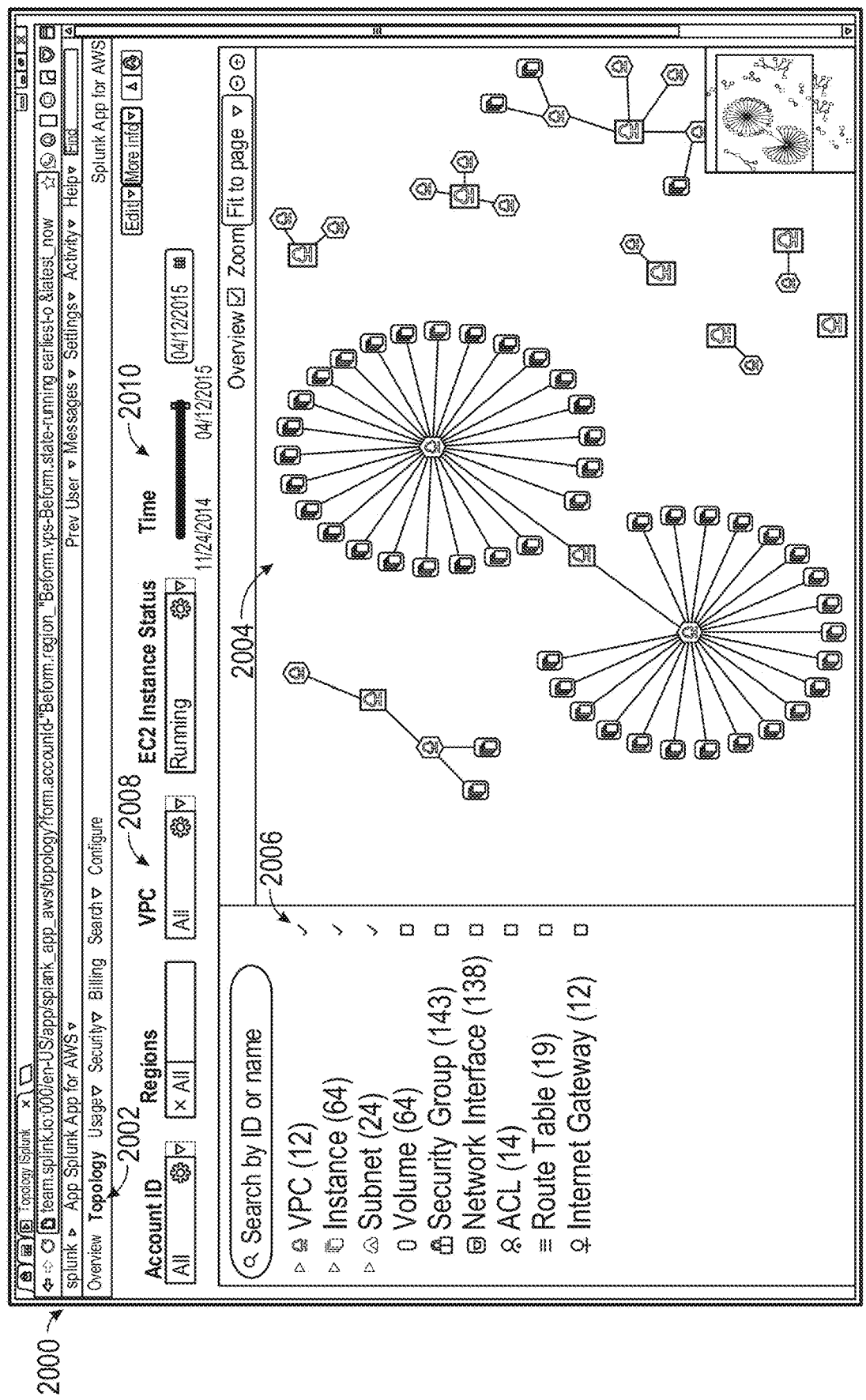
FIG. 20 illustrates a interface including a topology map representing a collection of cloud computing resources and generated based on data collected from one or more cloud computing services and/or other data sources in accordance with the disclosed embodiments.

FIG. 20 illustrates an interface including a topology map representing a collection of cloud computing resources and generated based on data collected from one or more cloud computing services and/or other data sources. FIG. 20 is provided as a high-level overview of an interface displaying a topology map; additional details related to the generation and interactive capabilities of such topology maps are provided in separate sections hereinafter.

In an embodiment, a topology map interface 2000 may be included as an available interface of a cloud computing application 1810. The topology map interface 2000 may be displayed, for example, in response to a user selecting menu option 2002. In an embodiment, an interface 2000 includes a topology map 2004 representing a visualization of a collection of cloud computing resources, including a number of graphically displayed nodes and edges representing individual cloud computing resources and relationship among the resources.

In an embodiment, a topology map interface 200 includes a search panel 2006, which enables users to search for particular resources and to select particular types of resources for display in the topology map 2004. For example, a search bar of the search panel 2006 may enable users to search for nodes that match a specified label, identifier, or other search input string. Search panel 2006 may further include a selectable list of resource types that enables a user to select particular types of resources for display on the topology map 2004 (e.g., a user may provide input selecting only virtual private clouds, server instances, and subnets for display in the topology map 2004). A search panel 2006 may further provide counts for each type of resource available for display in the topology map 2004 (e.g., a search panel 2006 may indicate that 12 different virtual private clouds, 60 server instances, 24 subnets, etc., are available for display in the map).

In an embodiment, a topology map interface 2002 may further include display filters 2008, which enable users to filter the types of resources displayed in the topology map 2006. For example, a user may use display filters 2008 to filter the displayed resources in the topology map 2004 based on resources associated with selected user accounts, resources associated with selected regions, resources associated with selected virtual private clouds, or any other filter criteria.

3.2. Cloud Computing Resource Data Collection

In one embodiment, a cloud computing management application 1810 includes the ability to collect data related to a collection of cloud computing resources from one or more cloud computing services and/or other sources. The collected data generally may include any data that provides information about the operating status, performance characteristics, relationships with other resources, cost data, or any other attributes of the resources. The data related to the cloud computing resources may originate from one or more cloud computing service providers (e.g., including various types of log data generated by the services) or may originate from other sources (e.g., from external monitoring tools or other applications).

In one embodiment, one type of data related to a collection of cloud computing resources is referred to herein as performance data. Performance data generally refers to data that provides information about the status and/or performance of particular resources. For example, performance data may include state data which indicates information about the state of one or more resources at particular points in time, including whether the one or more resources are active, shutdown, in a failure state, etc. For example, many cloud computing service providers generate activity logs and other data that record each time resources are created, modified, or deleted, and further may include information about a user associated with each action, information about when each action occurred, information about resource failures, etc. Performance data may further include log data indicating performance characteristics of one or more resources, including CPU utilization for server instances, volume IO counts for storage volumes, etc. In an embodiment, performance data may further include cost information that may indicate, for example, financial costs related the use of one or more resources over one or more periods of time.

In one embodiment, another type of data related to a collection of cloud computing resources is referred to herein as relationship data. Relationship data generally refers to data that provides information about relationships among one or more cloud computing resources of a collection of resources for which data has been collected. For example, relationship data may indicate that one or more server instances are a member of a particular subnet, that one or more subnets are a member of a particular virtual private cloud, that an access control list is applicable to one or more databases, etc. Relationship data may indicate such relationships among resources explicitly (e.g., the data may indicate that a particular server instance is a member of particular subnet) or the relationships among resources may be inferred from the data (e.g., based on correlating resource identifiers, IP addresses, etc.).

3.2.1. Configuring Resource Data Collection

In an embodiment, a cloud computing resource management application provides one or more interfaces for configuring data sources from which performance and/or relationship data may be collected. Each data source may be a source defined by a particular cloud computing service (e.g., a log file or other data made available to users of the service) or may be a source external to any cloud computing service (e.g., based on an external monitoring tool). For example, a particular cloud computing service may provide one or more APIs or other services that enable users to retrieve various types of data generated by the service. A particular cloud computing service, for example, may generate a log file that records each time a resource is created, modified, deleted, etc. In the same log file or in a different file, the cloud computing service may record information about the performance of various resources, including CPU utilization for server instances, reads and writes for storage volumes, etc. As indicated above, such data generally may comprise performance data, which may indicate state and/or performance information about resources, and relationship data, which may indicate information about relationships among various resources.

Figure 21:
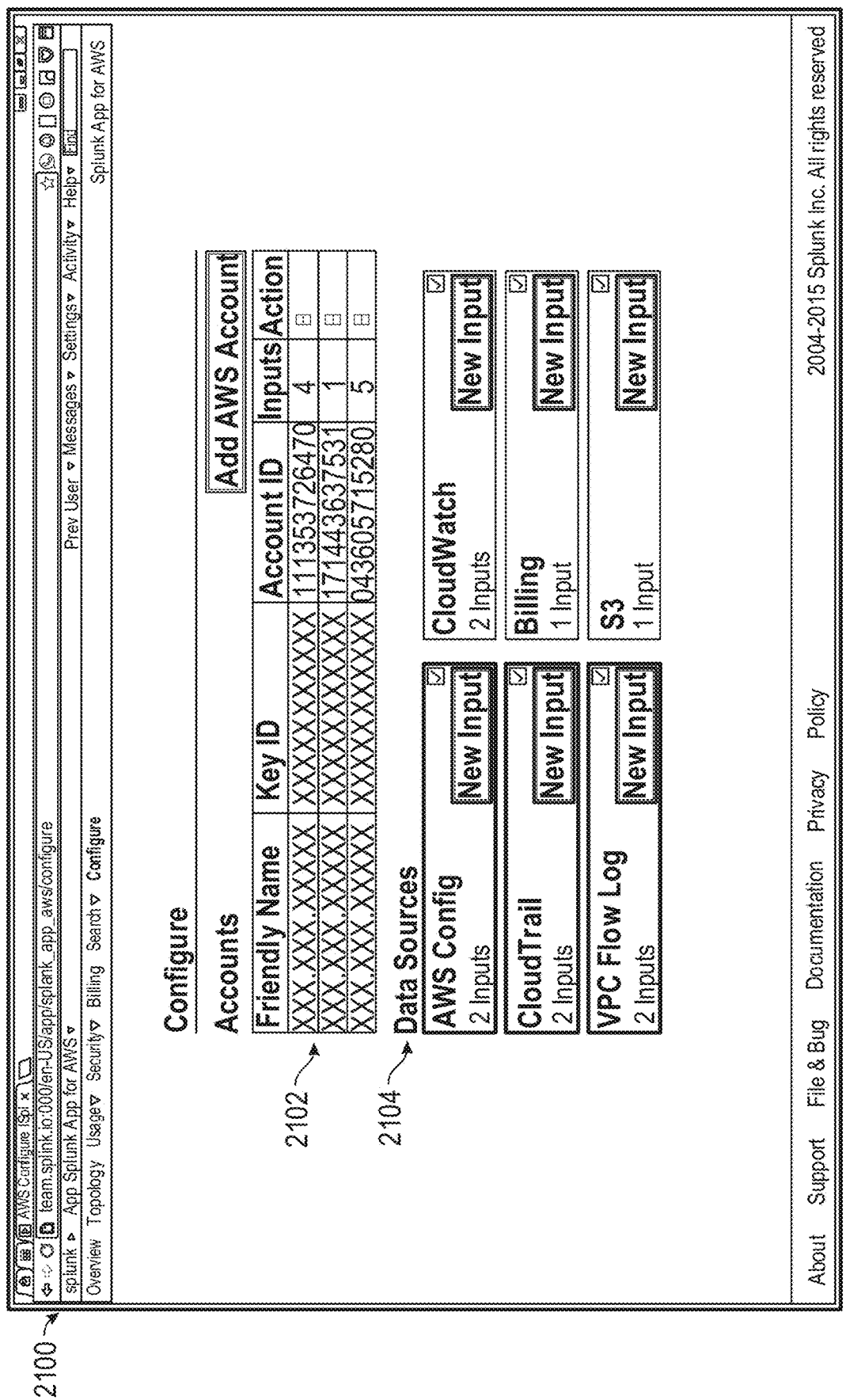
FIG. 21 illustrates a user interface screen that enables a user to configure one or more data sources for collection of data related to one or more cloud computing resources in accordance with the disclosed embodiments.

FIG. 21 illustrates an example interface screen 2100 that enables a user to configure one or more data sources for collection of data related to one or more cloud computing resources. The configuration interface 2100 of FIG. 21, for example, includes an account configuration panel 2102 and data source configuration panel 2104.

In an embodiment, an account configuration panel 2102 enables a user to specify account information for one or more cloud computing services. A cloud computing service typically may restrict access to performance and relationship data for a particular set of cloud computing resources based on account credentials for an account that has permission to manage those resources. In an embodiment, an account configuration panel 2102 may enable users to configure any number of separate user accounts for any number of separate cloud computing services. The configuration of multiple user accounts may be desirable, for example, if an organization has computing resources associated with multiple different accounts (e.g., for different development teams) but desires to accumulate the data for the separate user accounts into a single platform for analysis.

In an embodiment, a data source configuration panel 2106 enables a user to set configuration parameters that enables a cloud computing management application 1810 to access one or more data sources. As one example, one data source may comprise a web service provided by a cloud computing service that includes an API for retrieving log files and/or other data related to a user's cloud computing resources managed by the service. Other example data sources may include, but are not limited to, databases, data feeds, one or more files (e.g., referenced by a direct link or other reference), or any other type of accessible data. In the example of data source configuration panel 2106, several separate configuration panels are provided, each corresponding to a different data source type (e.g., one configuration panel may correspond to a data source providing resource configuration log files, while another panel corresponds to a data source providing log data for network traffic flows associated with the resources, and another panel corresponds to a data source providing billing data, etc.) Separate configuration panels may be provided, for example, to assist with configuring the particular inputs to connect to each of the separate data sources.

In one embodiment, a cloud computing management application 1810 may enable users to configure data sources for the collection data from multiple different cloud computing services and/or other sources. For example, an organization may use two or more separate cloud computing services, and separate data sources may be configured for each of the two or more separate cloud computing services. In this manner, performance data and relationship data from multiple different cloud computing services may be collected in a centralized platform for analysis and for display in a single, integrated topology map display.

In an embodiment, a cloud computing management application 1810 may further enable configuration of data sources to collect data related to cloud computing resources associated with multiple different regions defined by one or more cloud computing services. As described above, a cloud computing service may enable users to create and manage resources that are grouped into two or more separate geographic regions (e.g., US East and US West) to reduce data latency and improve data redundancy, among other benefits, but users may desire to collect information for multiple different regions for display in a topology map and other visualizations.

3.2.2. Data Collection Process

In an embodiment, based on one or more configured data sources, a data collection module 1812 of a cloud computing management application 1810 collects and stores data retrieved from the configured data sources for subsequent analysis, generation of data visualizations, and other operations. For example, a data collection module 1812 may be configured to monitor a configured data source and collect new data as the data is generated. As another example, one or more configured data sources may push generated data to the data collection module 1812 on a periodic basis, or in response to the occurrence of particular events (e.g., creation, deletion, and/or modification of one or more computing resources).

In an embodiment, a data collection module 1812 may collect data from one or more configured data sources and store the collected data as events stored by a data intake and query system 108. In an embodiment, to organize the collected data into events, a data intake and query system may refer to one or more source type definitions to determine boundaries of events within the data, among other properties. Furthermore, a data collection module 1812 may perform various manipulations to collected data before storage. For example, one or more data fields from separate data sources may be mapped to a same field for storage by the data intake and query system 108, or new fields may be created based on conversions or combinations of other data fields.

3.3. Cloud Computing Resource Topology Maps

As indicated above, in one embodiment, a cloud computing management application 1810 may be configured to generate topology map visualizations of cloud computing resources based on data collected and stored by a data collection module 1812. At a high level, a topology map visualization includes a graphical display of a set of nodes, each representing one or more cloud computing resources, and edges, each representing a relationship between two or more cloud computing resources.

3.3.1. Generating Topology Map Displays

In one embodiment, a topology map generation module 1814 may be configured to generate data providing instructions for displaying a collection of cloud computing resources as a topology map and to cause display of the topology map based on the generated data. As illustrated in reference to FIG. 20, for example, a topology map generation module 1814 may generate and cause display of a topology map in response to a user requesting display of a topology map interface provided by a cloud computing management application 1810. In an embodiment, generating data providing instructions for displaying a topology map generally may include retrieving collected performance and relationship data and processing the data for use by a topology map display engine.

In one embodiment, processing collected performance and relationship data generally may involve converting the collected data to a format that suitable for use by one or more data visualization libraries. For example, a topology map generation module 1814 may include one or more data visualization libraries that are configured to receive input data describing a collection of cloud computing resources and relationships among the resources and to generate a graphical display of a topology map based on the input data. Thus, a topology map generation module 1814 may convert collected performance and relationship data into a table or other data format, for example, that specifies relationships among the collection of cloud computing resources, along with any other information that may be used in the display. In one embodiment, if cloud computing management application 1810 includes a web-based interface, a data visualization library may provide resources for displaying the processed set of data as a topology map using HTML, SVG, and/or other standards for displaying visualizations in a web browser.

In an embodiment, a topology map generation module 1814 may retrieve performance data and relationship data to generate a topology map on-demand (e.g., in response to receiving a user request to display a topology map interface) and/or the module may be configured to periodically retrieve and pre-process the data for display. For example, topology map generation module 1814 may be configured to run a search periodically (e.g., every 2 hours) to retrieve the most recently collected performance and relationship data, and to use the retrieved data to precompute the display information for the topology map. By precomputing the display information, a topology map interface may be generated more quickly when requested.

As illustrated in FIG. 20, for example, the topology map display includes a set of interconnected nodes and edges representing a collection of cloud computing resources. Each of the individual nodes and edges of a topology map generally may be placed at any location on the canvas; however, random placement of the nodes may result in a complex visualization that makes it difficult to understand the underlying relationships among the nodes. In one embodiment, a topology map generation module 1814 may be configured to display nodes on the map in a more intuitive manner, for example, so that similar resources are displayed near one another and generally arranged in a manner that provides for a more aesthetically pleasing display. For example, a topology map generation module 1814 may be configured to place nodes representing a set of server instances that are a member of the same subnet in close proximity to one another and without overlapping edges so that the group of instances may be readily located. As another example, each cluster of connected resources (e.g., each separate virtual private cloud and associated resources) may be displayed in a non-overlapping fashion to facilitate identification of each separate of cluster.

In one embodiment, a topology map generation module 1814 may be further configured to display various elements of a topology map, including some or all of the nodes and edges, using particular graphical elements that correspond to various attributes related to the represented computing resources. As one example, each node in the topology map may be displayed using a particular graphical element depending on a type of resource represented by the node. For example, a node that represents a virtual private cloud may be displayed using a cloud icon, while another node on the same display representing a storage volume may be displayed using a disk symbol, etc. As another example, each different type of resource may be displayed using a different color or icon size to represent each different type of resource.

In an embodiment, various elements of a displayed topology map may be displayed using particular graphical elements based on data related to the performance, operating state, cost utilization, or other metrics related to each resource. As one example, a topology map generation module 1814 may be configured to display a topology map where nodes representing server instances that are currently above a particular CPU utilization level are displayed using one type of graphical element (e.g., a flashing red icon), whereas other nodes representing server instances that are currently below the particular CPU utilization level are displayed using a different graphical element (e.g., a static gray icon). As another example, nodes representing server instances that are currently active and running may be displayed using one color, while server instances that are currently shutdown and/or currently not in use may be displayed using another color. In an embodiment, a default set of topology map element graphics and display criteria may be provided by a cloud computing management application 1810 and/or may be customized by a user as desired.

3.3.2. Interacting with Topology Map Displays

In one embodiment, in addition to the display of topology map elements representing a collection of cloud computing resources, a graphical user interface displaying a topology map may be configured to enable user interaction with the resources represented in the topology map. Many different types of interactions may be possible, including visually navigating the topology map (e.g., zooming, panning, and otherwise alerting the display of the topology map), selecting map elements to display status, performance, and/or relationship information related to the corresponding resources, selecting map elements to specify actions to perform relative to the corresponding resources, etc. In one embodiment, interactions with elements of the topology map may be linked to the corresponding cloud computing services such that actions specified using a displayed topology map may result in performance of those actions at the respective cloud computing service(s). In general, an interactive topology map as described herein provides the ability to not only view visualizations cloud computing resources, but to also analyze and manage operation of the resources in a highly efficient manner.

In one embodiment, an interface displaying a topology map is configured to receive input selecting one or more map elements and to display information about the resources represented by the selected elements. As one example, the interface may be configured such that if input is received indicating that the user is hovering a mouse pointer over a particular map element, information about the corresponding cloud computing resource may be displayed near the selected element. Examples of information that may be displayed include, but are not limited to, a resource identifier (e.g., a unique identifier generated by a cloud computing service for the resource), a resource type (e.g., whether the resource is a server instance, virtual private cloud, storage volume, etc.), a name of the resource (e.g., a user assigned label for the resource), a region associated with the resource, a status of the device (e.g., whether the resource is running, shutdown, in a failure state, etc.), key performance indicator (KPI) values associated with the resource, etc. If a device is in a particular operating state (e.g., if a server instance is currently shutdown), additional information may be displayed such as how long the instance has been shut down, the user that caused the shutdown, cost information associated with the instance, etc.

In one embodiment, similar to displaying information in response to the selection of a topology map node, a topology map interface may be configured to receive input selecting one or more edges in the map and to display information about the selected edge(s). For example, if a particular edge connects a first node representing a first server instance to another node representing a subnet, information about network traffic transferred to and from the server instance may be displayed. Other examples of information that may be displayed about a particular edge include, but are not limited to, information about the origin and/or destination of network traffic, network traffic statistics (ratio of accept, deny, etc.), or any other information related to the relationship between the connected nodes.

Figure 22:
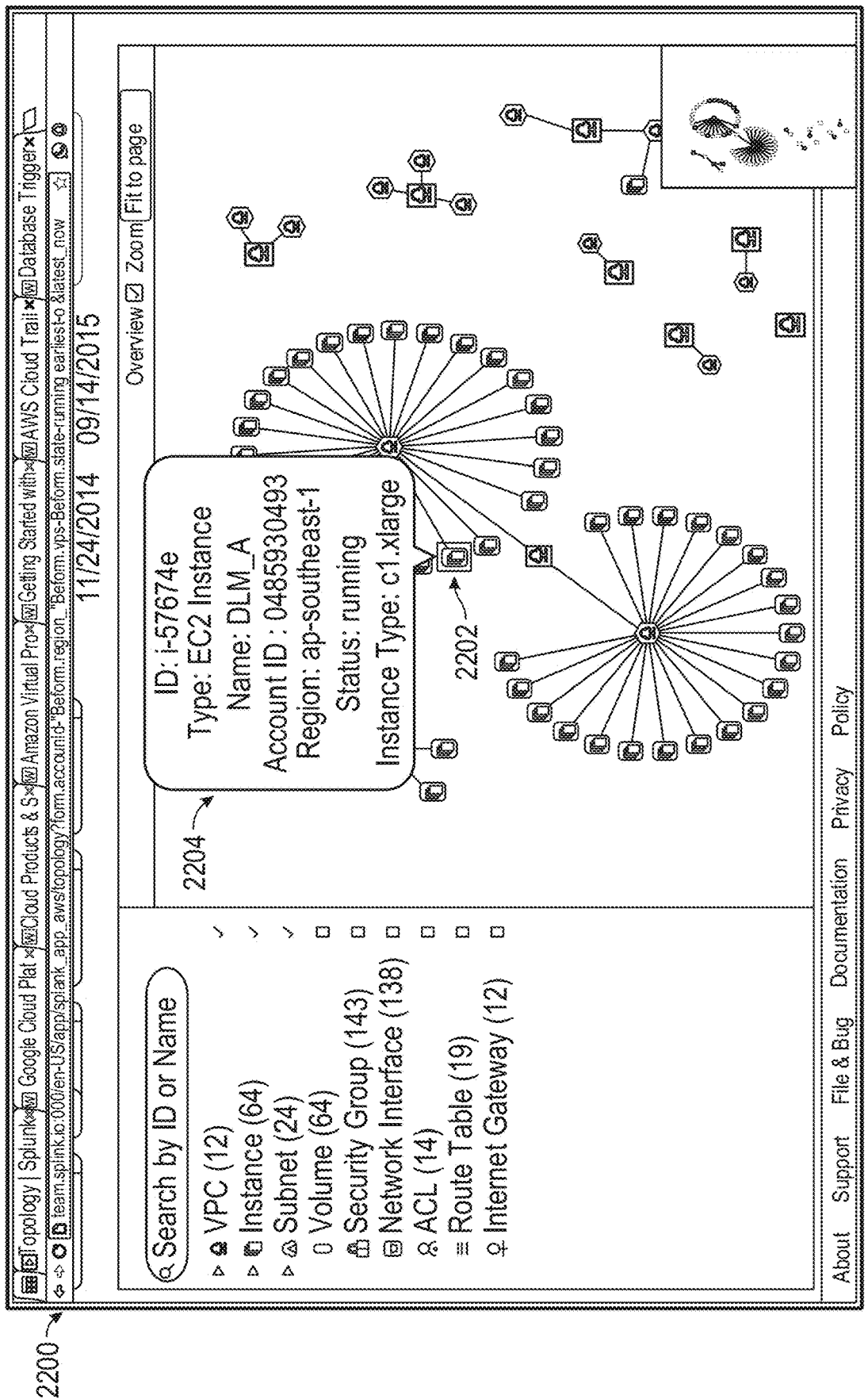
FIG. 22 illustrates a interface including display of information related to a selected node of a displayed topology map in accordance with the disclosed embodiments.

FIG. 22 illustrates an interface including a topology map, where input is received indicating a desire to display information about a particular map element. In the interface 2200 of FIG. 22, for example, a particular node 2202 has been selected (e.g., by hovering over the node, clicking on the node, etc.) and, in response, an information panel 2204 is displayed. The information panel 2204 may include various information about the server instance represented by the selected node including, but not limited to, an identifier of the server instance, a type of the resource, a name or label for the server instance, an account ID associated with the server instance, a region associated with the server instance, a status of the server instance, and a type of server instance. A user may subsequently select another node in the graph to change the display of the information panel 2204 to information about the newly selected node.

In an embodiment, an interface displaying a topology map may be further configured to receive input selecting a particular map element for display of more detailed information related to the selected element. For example, in response to a selection of a particular node, a more detailed information panel may be displayed, or a separate side panel may be displayed. The more detailed information may include, for example, information indicating relationships between the corresponding resource and other resources, performance metrics related to the selected resource, and activity log information (e.g., information indicating when a server instance was created, last restarted, etc.). The performance metrics may correspond to a particular time period (e.g., for the past week or past month) or display information for the entire lifespan of the resource.

Figure 23:
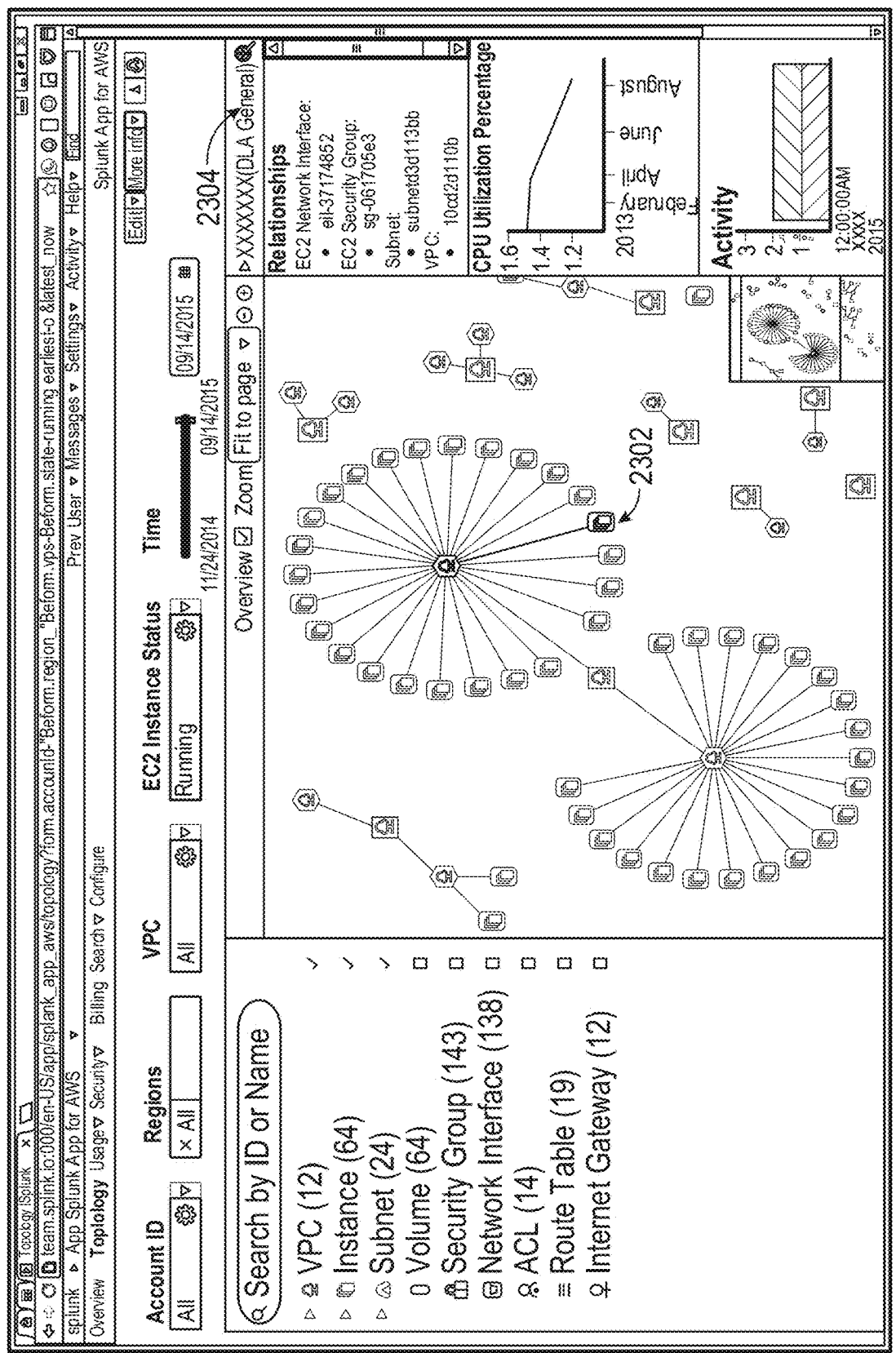
FIG. 23 illustrates a interface screen displaying a panel providing detailed information related to a selected map element in accordance with the disclosed embodiments.

FIG. 23 illustrates an example interface 2300 displaying a panel 2304 providing detailed information about a selected map element 2302. Relative to the information panel 2204 depicted in FIG. 22, for example, a side panel display 2304 includes a more detailed set of information for a selected resource, including information about relationships to other resources, a line chart indicating a CPU utilization percentage over time, and an activity count for a particular time period. In general, a more detailed information panel may display any performance metrics and other information derived from performance data and/or relationship data collected for the particular resource. In one embodiment, one or more items of information displayed in a side panel display 2304 may be selected by a user to cause display of other related interfaces, e.g., other dashboards displaying related metrics, interfaces displaying events and associated raw data, and/or other interfaces external to the cloud computing application.

In one embodiment, a topology map interface may be configured to display cost information associated with one or more selected topology map elements. For example, a user may select a node representing a server instance and, in response, a topology map interface may display cost information for the server instance such as, for example, a total cost incurred by the server instance, an estimated current bill amount, an average cost for the server instance per month, etc.

In an embodiment, a topology map interface may also be configured to display cost efficiency information for selected map elements For example, many cloud computing services offer various types of the same computing resource based on different payment models. For example, a cloud service provider may offer three or more different types of server instances such as "on-demand" instances, "reserved" instances, and "spot" instances, the cost benefits of which depend on how the server instances are used. In an embodiment, based on a determined type of server instance and performance information associated with the instance, a topology map interface may display information indicating whether the type of server instance being used is the most cost effective of the available types of server instances. Although the examples above illustrate display of cost information for server instances, similar information may be displayed for selected storage volumes, network interfaces, or any other cloud computing resources.

In one embodiment, in response to a selection of multiple topology map elements, an interface may be configured to display aggregate information related to the resources represented by the selected map elements. As one example, the displayed aggregate information for a set of selected nodes may indicate information common to the resources (e.g., that the corresponding resources were created by the same user account, that the resources were created at or around the same date, etc.). As another example, aggregate information may include information specific to each of the selected resources displayed together (e.g., a list of other resources related to any of the selected resources, a list of IP addresses associated with the resources, etc.). As yet another example, aggregate information may include one or more metrics derived from information associated with the selected resources (e.g., an average response time for a set of selected server instances, a total cost incurred by a set of selected resources, a total number of configuration changes made with respect to the selected resources, etc.).

In one embodiment, in response to a selection of one or more elements of a displayed topology map, a cloud computing management application 1810 may be configured to cause display, on the same interface or in a separate interface, of one or more events related to the computing resources represented by the one or more nodes. For example, a user may select a node representing a particular server instance and further select a menu option or provide other input indicating a desire to view stored events associated with the server instance. In response to receiving the input, application 1810 may be configured to display an events list (e.g., similar to events list 608 of FIG. 6) or other interface that enables the user to view the raw data and other information of associated events. Similarly, an application 1810 may be configured to enable users to select indications of particular resources (e.g., a name of a particular server instance, storage volume, etc.) from an events list or other display (e.g., by clicking on a label or other indicator of a particular resource included in the displayed event data) and, in response cause display of a topology map view that includes a node representing the selected resource.

In an embodiment, a cloud computing management application 1810 may be configured to enable users to specify actions to perform relative to one or more resources represented in a displayed topology map. In one embodiment, some or all of the actions may result in the application 1810 causing a cloud computing service to perform the specified actions relative to one or more selected resources. As one particular example, a user may select a node representing a server instance and provide input requesting to shut down the server instance. In response to the input, a cloud computing management application 1810 may send a request (e.g., issue an API call, executable command, upload a script file, a trigger callback, etc.) to the corresponding cloud computing service to cause the selected server instance to be shutdown. The requested action may then be reflected both in the topology map (e.g., by changing the color of the corresponding node or removing the node from the map) and at the cloud computing service where the server instance is actually shut down.

In one embodiment, an interface displaying a topology map may be configured to enable users to provide input specifying notes and/or tags to associate with one or more elements of the topology map. A note, for example, may include text, images, links, or other user-generated content that a user desires to associated with map elements. A tag may represent a keyword or term assigned to one or more map elements, which may be used to group certain elements and enable groups of items to be more easily searched. In one embodiment, if a cloud computing service associated with the respective topology map elements supports the addition of notes and/or tags to resources within its platform, the addition of a note and/or tag on the topology map further may cause the application 1810 to generate a request to the cloud computing service to add the specified note and/or tag in association with the selected resources. In one embodiment, to indicate a desire to associate notes and/or tags with one or more resources, a user may select one or more nodes and/or edges of the topology map representing the resources of interest.

Figure 24:
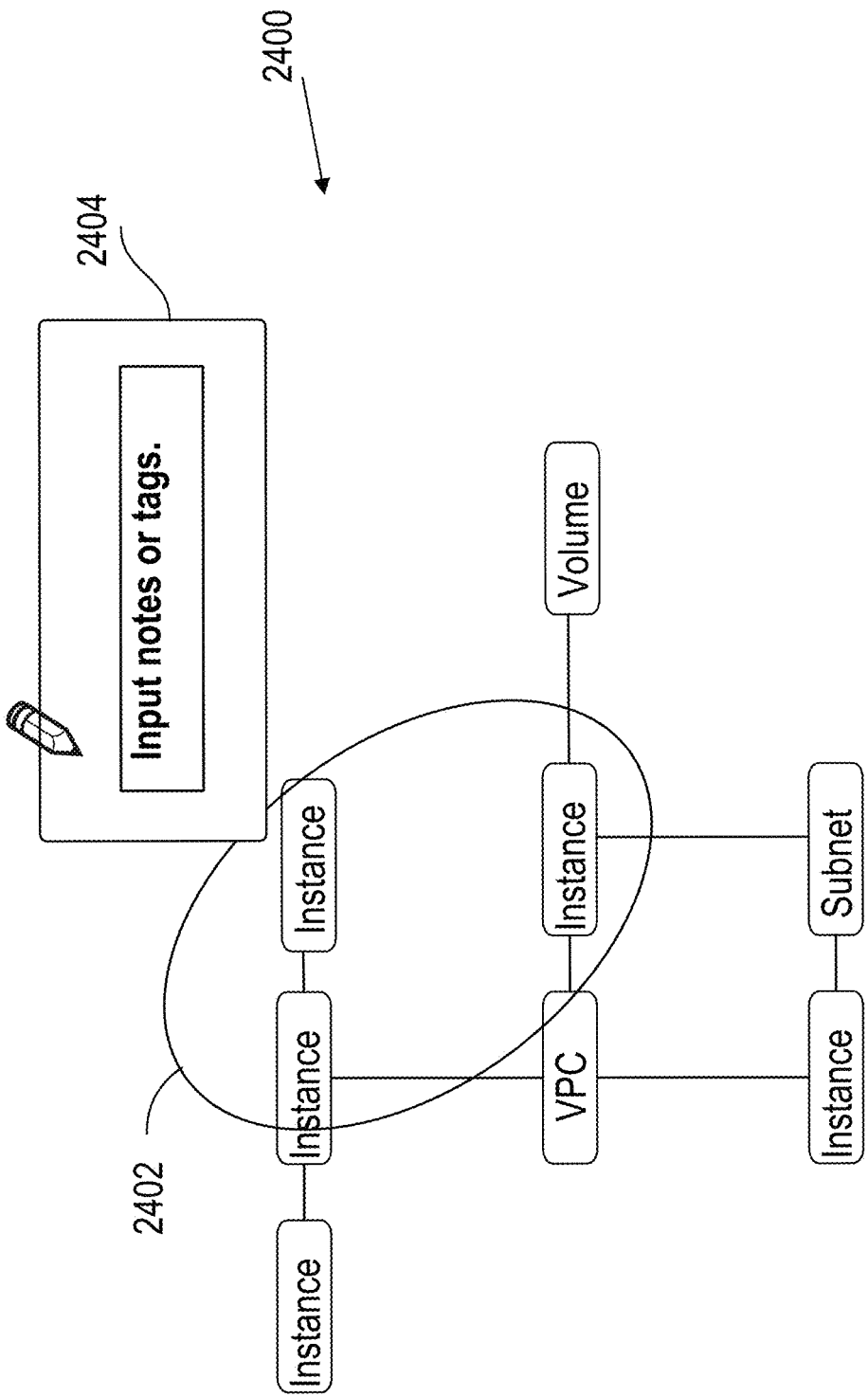
FIG. 24 illustrates a portion of an example interface which enables users to associate notes and/or tags with one or more elements of a topology map in accordance with the disclosed embodiments.

FIG. 24 illustrates a portion of an example interface which enables users to associate notes and/or tags with one or more elements of a topology map. FIG. 24 includes several topology map elements, including selected nodes and edges 2402. Each of selected nodes and edges 2402 in FIG. 24, for example, may represent a separate server instance and associated relationships. As depicted in FIG. 24, input may be provided to the interface selecting a subset of the map elements (e.g., by clicking on one or more nodes, drawing a design around the desired nodes, etc.) and a menu option may be selected or other input provided indicating a desire to add a note and/or tag to the selected nodes. A note panel 2404, for example, illustrates an example interface element that may be displayed enabling users to enter freeform text, images, tag labels, links, or any other information that a user desires to associate with a set of nodes. In an embodiment, if any associated cloud computing services supports the association of notes and/or tags with the selected computing resources, a request may be send the cloud computing services to cause the service to store any note and/or tag information provided to a note panel 2404.

In an embodiment, an interface displaying a topology map may be configured to enable users specify one or more triggers to associate with selected map elements. In this context, a trigger generally refers to one or more programmed actions that may be executed in response to an occurrence of one or more specified conditions. In the context of a server instance, example triggers that may be configured include causing the server instance to startup at a particular time each day, to shut down in response to detecting that the CPU utilization drops below a certain level, etc. A trigger may be specified for a particular resource (e.g., for a single server instance, storage volume, etc.) or for a group of resources.

Figure 25:
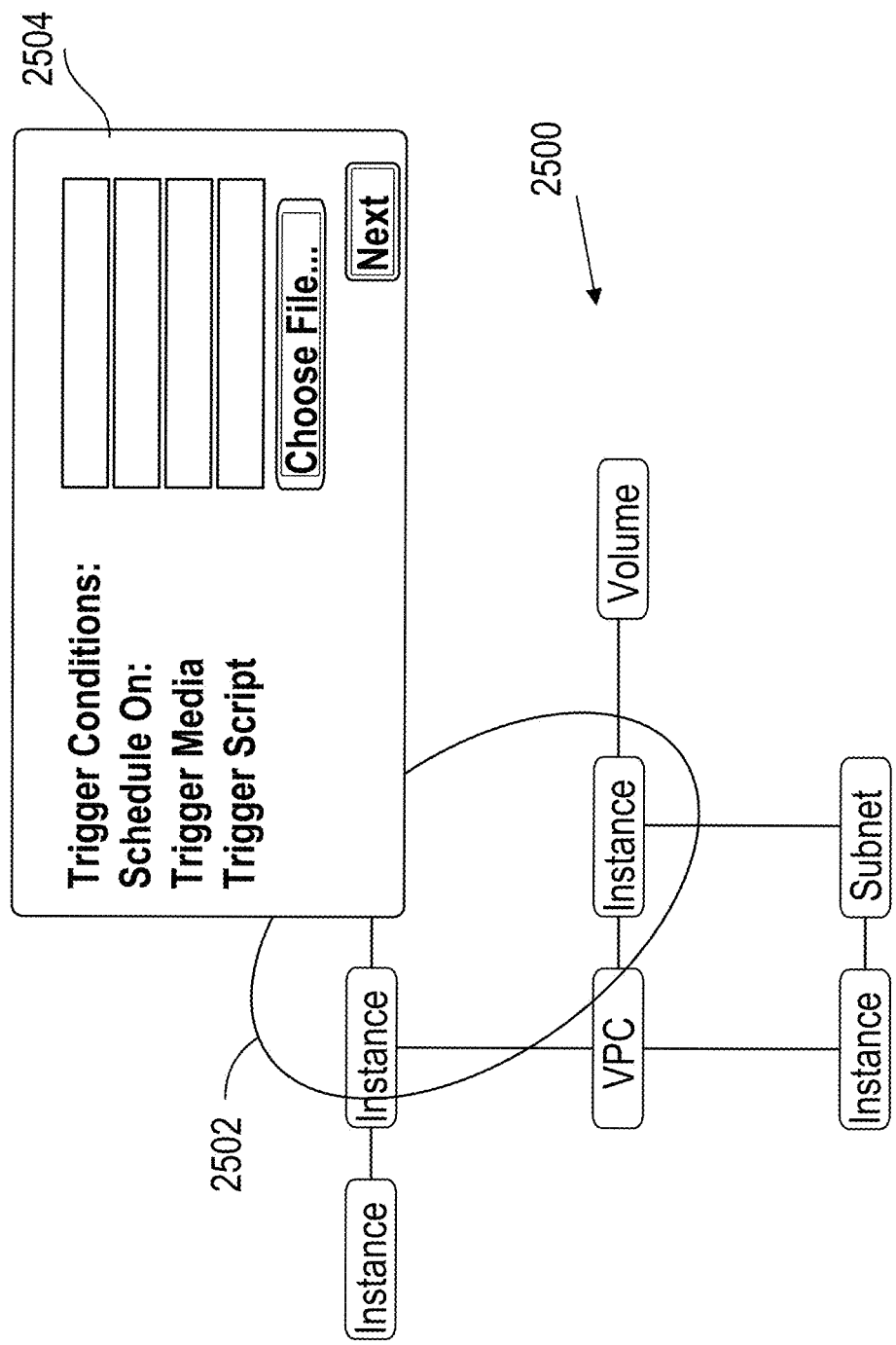
FIG. 25 illustrates a portion of an example interface for specifying one or more triggers to associate with one or more selected elements of a topology map in accordance with the disclosed embodiments.

FIG. 25 illustrates a portion of an example interface 2500 for specifying one or more triggers to associate with one or more selected elements of a topology map. For example, in response to an interface 2500 receiving input indicating a desire to create a trigger for one or more selected map elements 2502, a trigger configuration panel 2504 may be displayed enabling a user to specify a trigger condition, a time for activation of the trigger, a trigger operation, etc. In one embodiment, a trigger operation may be specified using one or more commands input using the panel 2504, or as part of a script or other file that specifies the trigger actions to execute in response to detecting the trigger conditions.

In one embodiment, an interface displaying a topology map may be configured to receive input specifying one or more control operations to perform relative to one or more selected resources. Examples of control operations that may be specified for one or more resources include, but are not limited to, scheduled jobs, instant commands, etc. For example, a user may directly control one or more resources displayed a topology map display by indicating actions such as shutdown, restart, disconnect, etc.

In one embodiment, an interface displaying a topology map may be configured to receive input specifying one or more actions to apply to multiple selected topology map elements. For example, a user may select a set of nodes corresponding to a set of server instances and select an option to shut down all of the selected instances. In one embodiment, in response to receiving a selection of one or more topology map elements, an interface displaying a topology map may be configured to present one or more selectable options which are relevant to the resources corresponding to the select map elements. For example, if a user selects a plurality of nodes corresponding to server instances, a full set of options may be presented related to actions that can be taken with respect to the server instances (e.g., shutdown, restart, etc.). However, if a user selects a heterogeneous set of nodes (e.g., one node representing a server instance and another node representing a storage volume), a set of options relevant to all of the nodes may be presented (e.g., a backup option may be applicable to both server instances and storage volumes).

In one embodiment, input received specifying any of notes, tags, triggers, actions, etc., to associate with one or more resources may involve resources that are associated with two or more different cloud computing services. For example, input may be received selecting a first node representing a first server instance managed by a first cloud computing service and a second node representing a second server instances managed by a second cloud computing service. The input may further include specification of a note, tag, trigger, etc., to apply to both of the first server instance and second server instance. In response to receiving the input, the cloud computing management application 1810 may send requests to both the first cloud computing service and the second cloud computing service to perform the specified action(s) at the respective services.

In one embodiment, an interface displaying a topology map may be configured to receive input selecting one or more nodes and moving the one or more nodes from one location on the topology map to another location on the topology map and, in response, causing one or more relationships between the nodes to change. For example, a user may select a particular node representing a server instance associated a first subnet and drag and drop the particular node at a location near a second subnet. In response, a request may be sent to an associated cloud computing service to move the server instance from the first subnet to the second subnet.

In an embodiment, a topology map interface may enable users to select one or more edges displayed in a topology map and to specify an action to be applied to all of the nodes connected by the selected edges. For example, a user may select an edge connecting a first node representing a server instance and a second node representing a storage volume attached to the server instance, and further select an option to backup the connected resources. In response, the cloud computing application may send a command to a cloud computing service to backup both the server instance and the storage volume. As another example, an interface may enable users to select a particular node and apply an action to any other node connected to the particular node by an edge. For example, a user may select a particular node of a topology map representing a subnet, where the particular node is connected to a plurality of server instances by a plurality of edges. The user may further specify an action (e.g., startup, shutdown, backup, etc.) that may then be applied to all of the resources connected to the selected node.

In one embodiment, a cloud computing application may be configured to display information related to portions of a topology map that may represent underutilized resources and/or resources used in an inefficient manner from a cost perspective. For example, a cloud computing application 1810 may include a set of cloud computing "best practices" or guidelines that indicate information related to efficient use of particular types of cloud computing resources. In response to detecting that one or more specified guideline warning conditions are met (e.g., in response to detecting that a server instance of a particular type is being over utilized), one or more alerts or other displays may be presented to the user.

3.3.3. Analyzing Displayed Topology Maps

In one embodiment, a cloud computing management application 1810 enables users to export data related to a displayed topology map. For example, in response to receiving a selection of one or more topology map elements, data related to the selected map elements may be retrieved and converted to one or more export formats. If the selected map elements correspond to one or more server instances, for example, data selected for export may include performance metrics, cost and/or billing information, or any other stored information related to the selected server instances. In one embodiment, further input may be received specifying particular fields for extraction, combinations of fields, and other data export preferences.

Figure 26:
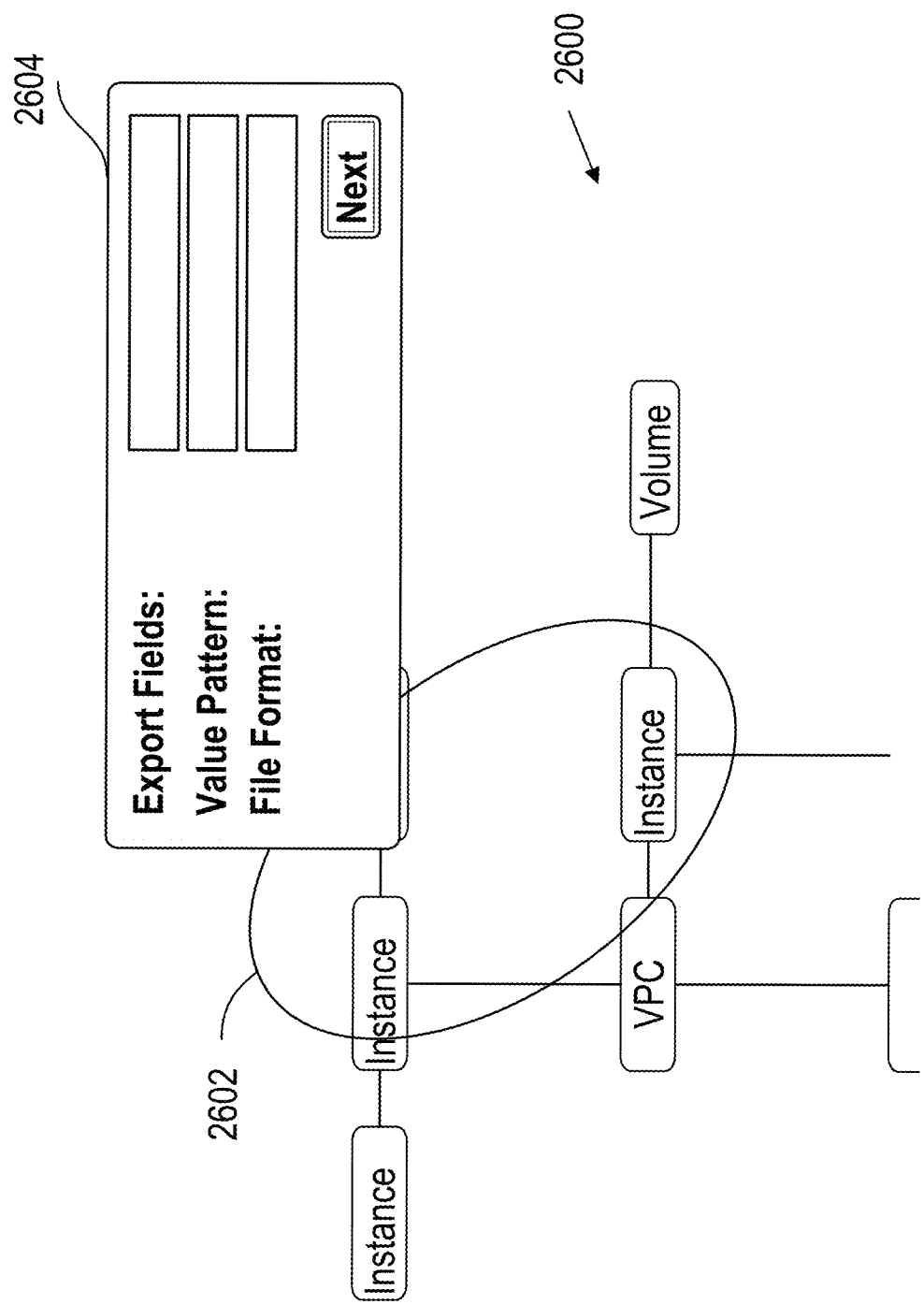
FIG. 26 illustrates a portion of an example interface for selecting one or more topology map elements and providing input to export data related to the selected elements in accordance with the disclosed embodiments.

FIG. 26 illustrates a portion of an example interface 2600 for selecting one or more topology map elements and providing input to export data related to the selected elements. The interface 2600 includes a set of selected nodes and edges 2604 corresponding to a set of server instances and further includes an export panel 2604. In an embodiment, export panel 2604 provides one or more options for exporting data related to the computing resources represented by the selected map elements. A user may use an export panel 2604, for example, to specify particular data fields to export (e.g., resource identifiers, creation dates, cost and/or billing information, etc.), a value pattern to filter or transform the exported data, and a file format for the exported data (e.g., a CSV file, tab delimited file, database file, etc.). A value pattern may be specified, for example, as a regular expression or other type of pattern matching expression used to filter one or more exported data fields. As one example, if a user has selected several server instance nodes and specified a field "instanceType" for export, the user may further specify a value pattern of "instanceType=c4.*large" to filter the exported results to those server instances having an "instanceType" matching the regular expression "c4.*large". In this example, data for selected server instances with instanceTypes of "c4.xlarge", "c4.4xlarge", and "c4.8xlarge" may be exported, while data for other server instances with example instanceTypes of "m4.xlarge" or "c2.xlarge" may not be exported.

Figure 27:
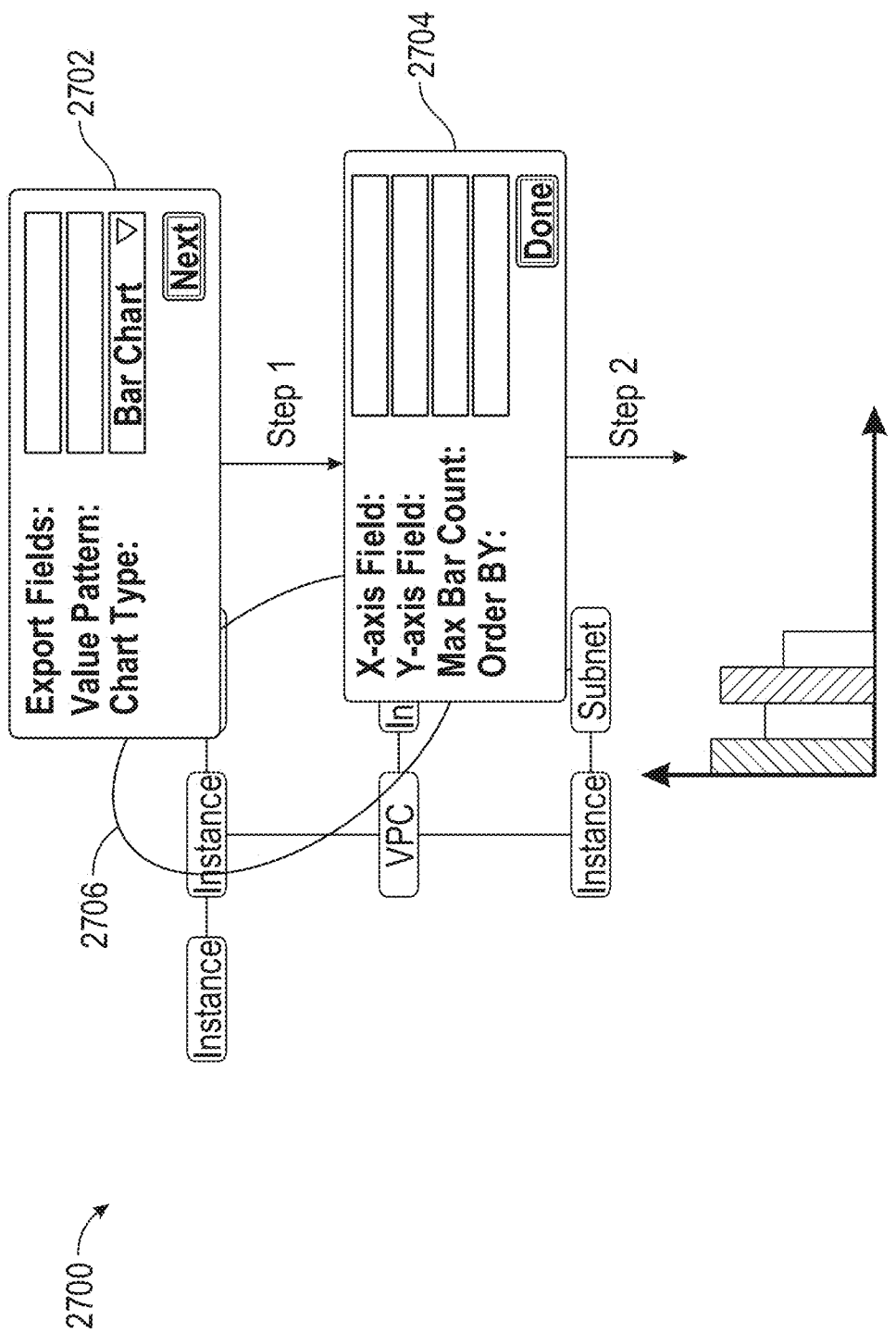
FIG. 27 illustrates a portion of an example interface that enables users to select one or more topology map elements and provide further input to generate another types of data visualizations based on the selected elements in accordance with the disclosed embodiments.

In one embodiment, an interface displaying a topology map may enable users to generate other types of data visualizations based on selected map elements. For example, FIG. 27 illustrates a portion of an example interface 2700 that enables users to select one or more topology map elements and provide further input to generate another types of data visualizations based on the selected elements. For example, FIG. 27 includes data transformation panel 2702 and a visualization settings panel 2704 which enable a user to provide input specifying particular fields to export, a value pattern, a visualization type (e.g., a bar chart, a line chart, a pie chart, etc.) for selected map elements 2706. Depending on a type of visualization selected in transformation panel 2702, for example, a visualization settings panel 2704 may enable users to provide additional information including data to include on each of an X-axis and a Y-axis for a bar chart, chart boundaries, data ordering, etc. In this manner, users may easily select topology map elements of interest and generate different types of visualizations for selected elements to gain different perspectives on the data.

3.3.4. Displaying Time-Based Topology Maps

In one embodiment, a cloud computing management application 1810 enables display of animated topology maps which provide visualizations of how a collection of cloud computing resources and relationships among the resources change over time. Examples of such time-based topology map displays may include, but are not limited to, display of topology maps at specified points in time, animated topology maps displaying an evolution of a collection of resources over a period of time, and comparison topology maps displaying differences between a topology map at two or more particular points in time.

In one embodiment, a cloud computing management application 1810 provides one or more interfaces configured to receive input specifying a particular point in time and to cause display of a topology map representing the state of a collection of cloud computing resources at the specified point in time. For example, referring again to FIG. 20, a topology map interface 2000 may include time-based display controls 2010 that enable a user to specify a particular point in time, for example, by using a time slider or a calendar input component. In response to receiving input specifying a particular point in time, a topology map generation module 1814 may be configured to retrieve collected performance and/or relationship data for the specified point in time and to generate a display of the topology map corresponding to the specified point in time.

In one embodiment, a topology map generation module 1814 enables display of animated topology maps, also referred to herein as "time-lapse" displays, which display a series of topology maps over one or more period of times. A time-lapse display of a topology diagram may, for example, result in a movie-like display that enables users to better understand how a collection of cloud computing resources and relationships among the resources evolve over time.

Figure 28:
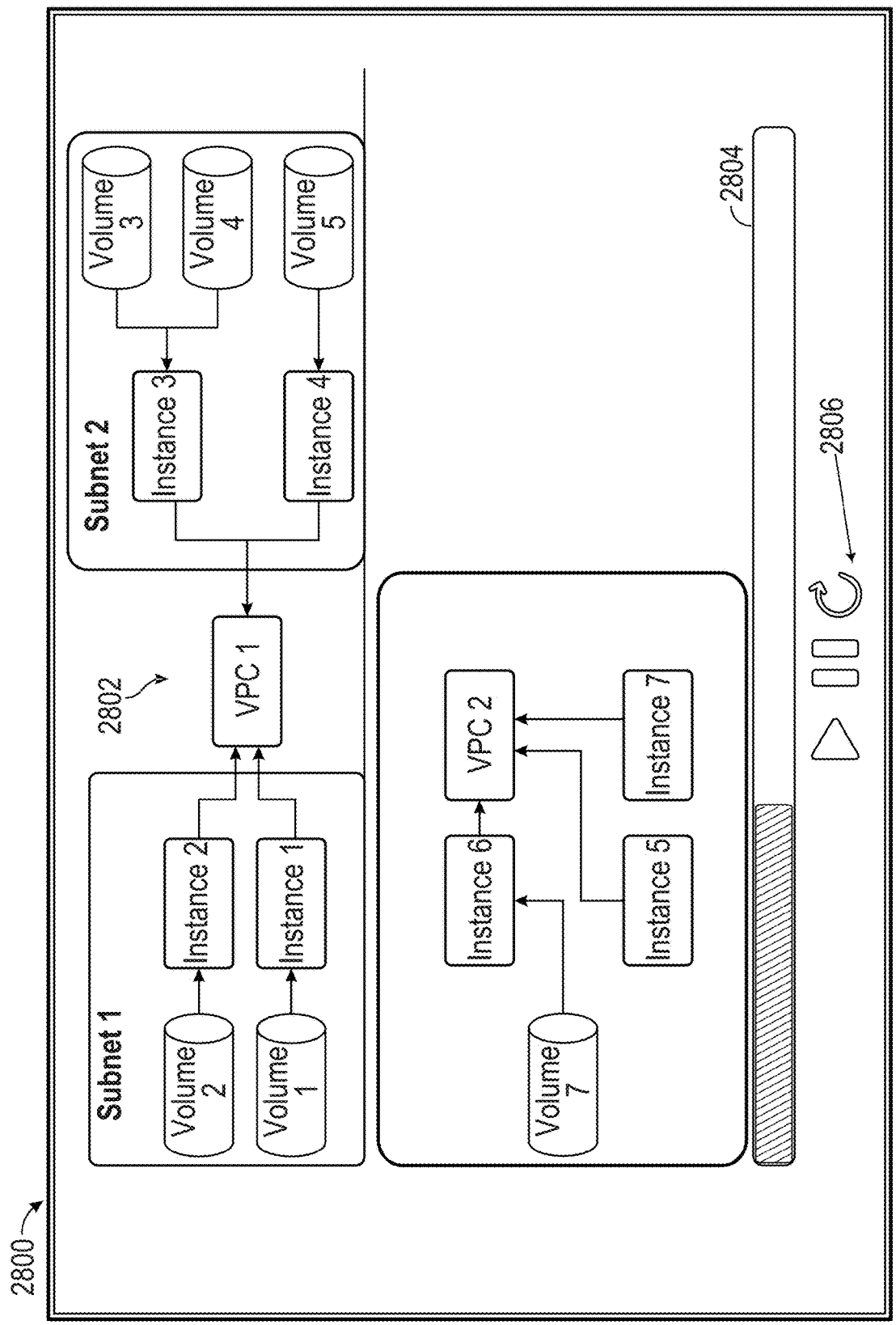
FIG. 28 illustrates a portion of an example interface for displaying a time-lapse of a topology map in accordance with the disclosed embodiments.

FIG. 28 illustrates a portion of an example interface for displaying a time-lapse of a topology map. The interface 2800 of FIG. 28 includes a topology map 2802, a time slider 2804, and time-lapse play controls 2806. The topology map 2802, for example, includes a number of nodes and edges representing various cloud computing resources and relationships among the resources. More specifically, the topology map 2602 displayed in FIG. 28 represents a state of the cloud computing resources at a particular time t.

In one embodiment, a time slider 2804 may be configured allow users to navigate or "scan" the topology map across points in time. For example, the current state of time slider 2804 may be set the display the topology map 2802 at a time a. A user may drag the slider 2804 to the right, causing the displayed topology map 2802 to advance in time to a time b, where the display of the topology map at time b includes display of the state of the resources at that time. For example, if one or more computing resources were added, deleted, or modified, one or more corresponding nodes of the displayed topology map 2802 may be added, deleted, and/or modified to reflect the changes.

In an embodiment, play controls 2806 may enable a user to cause a time-lapse or movie-like display of the topology map 2802 over a period of time. For example, instead of manually advancing the display of the topology map 2802 through time, a user may select the "play" button of play controls 2806 and the display of topology map 2802 may automatically animate in a manner that depicts changes with respect to the displayed resources over a chronological period of time. A user may use other interface elements of play controls 2806 to pause the playback of a topology map time-lapse, rewind the playback, restart the playback etc. As described above in reference to Section 3.2, a topology map generation module 1814 may be configured to pre-compute display information corresponding to some or all of the points of time of the time-lapse display to facilitate smoother playback of the time-lapse.

In one embodiment, during playback of a topology map time-lapse, a user may provide input to mark two different points in time of the playback (e.g., if a time-lapse corresponds to the changes of a topology map over a month-long time period, a user may select two particular points in time during the month). Based on the marked points in time, the user may further provide input to generate a comparison topology map displays that displays differences between the topology map at the marked points in time (e.g., indicating nodes and/or edges that are added, removed, and/or modified).

In an embodiment, during playback of the topology map time-lapse, an interface displaying a topology map time-lapse may display an indication of a time associated with each portion of the playback. For example, as the playback of a time-lapse progresses, an indication of a date associated with each of the displayed "frames" of the time-lapse may be displayed in association with the topology map so that a user can better track when the associated events in the time-lapse actually occurred.

In one embodiment, a cloud computing management application may enable display of an animated topology map (e.g., a time-lapse display) synchronized with other data visualizations. For example, a user may desire to view an animated, time-lapse display of a topology map in synchronization with one or more other visualizations that provide performance metrics, cost and/or billing information, or other information related to the depicted resources across the displayed points in time. Examples of other data visualizations that may be displayed in conjunction with an animated topology map include line charts (e.g., displaying CPU utilization levels, network traffic levels, and/or cost information over time). In this example, a topology mapping module may enable display of a response time line chart to the topology diagram that enables a user to more easily determine how the number of instances affects response time.

Figure 29A:
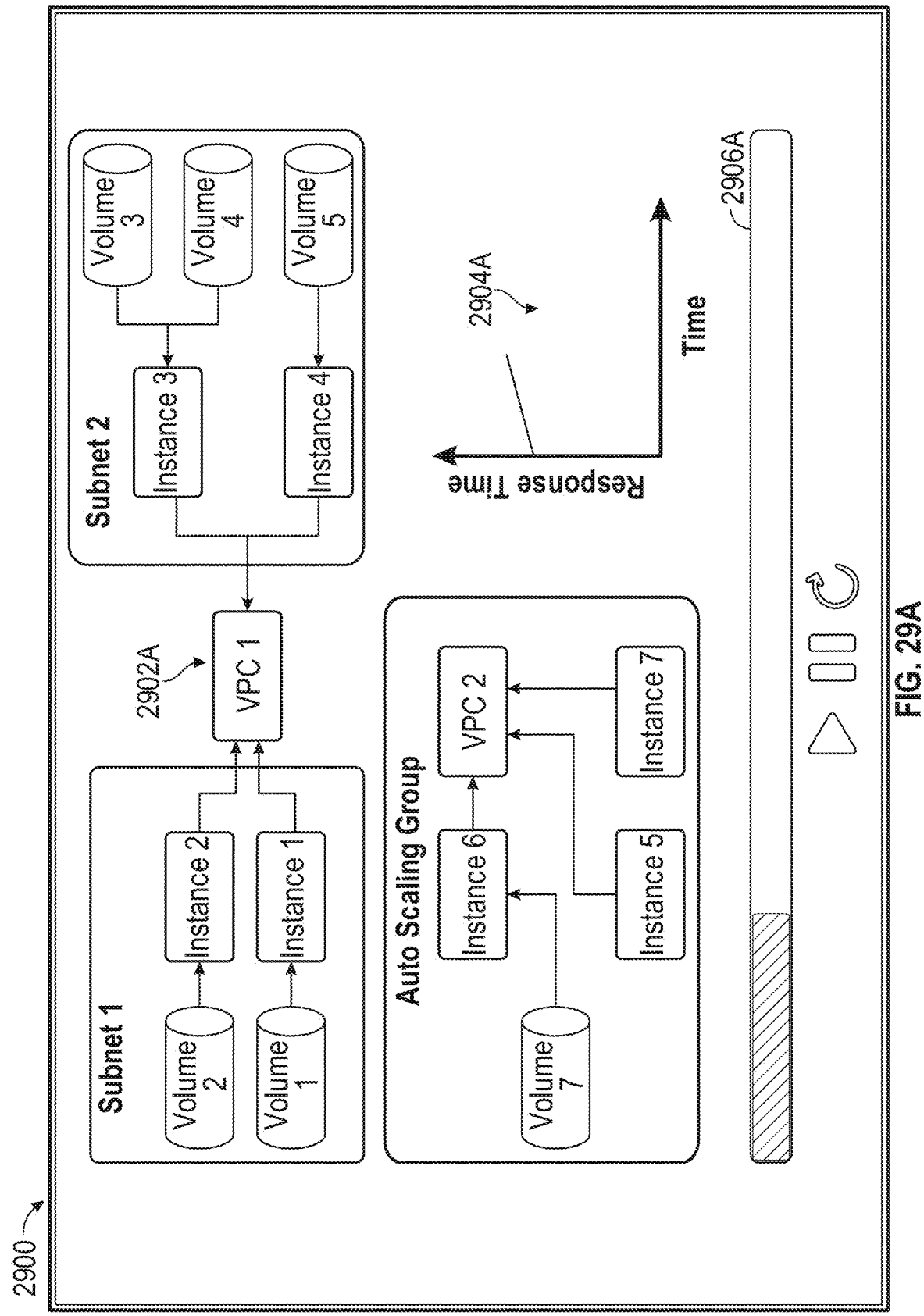
FIGS. 29A-29B illustrate a portion of an example interface displaying a topology map in synchronization with a separate data visualization in accordance with the disclosed embodiments.

FIG. 29A illustrates a portion of an example interface 2900A displaying a topology map 2902A in synchronization with a separate data visualization 2904A. Similar to FIG. 28, a user may use a time slider and/or play controls 2906A to play a time-lapse of the topology map 2902A and/or manually advance the topology map 2902A to particular points in time. In an embodiment, in synchronization with the display of the topology map 2902A at the particular points in time, performance metrics and other information may be displayed in the separate visualization 2904A. In the example of FIG. 29A, the separate visualization 2904A displays a line chart indicating an aggregate response time of the resources depicted in the topology map 2902A. In general, a synchronized data visualization may be any type of data visualization, including line charts, bar charts, pie charts, etc.

Figure 29B:
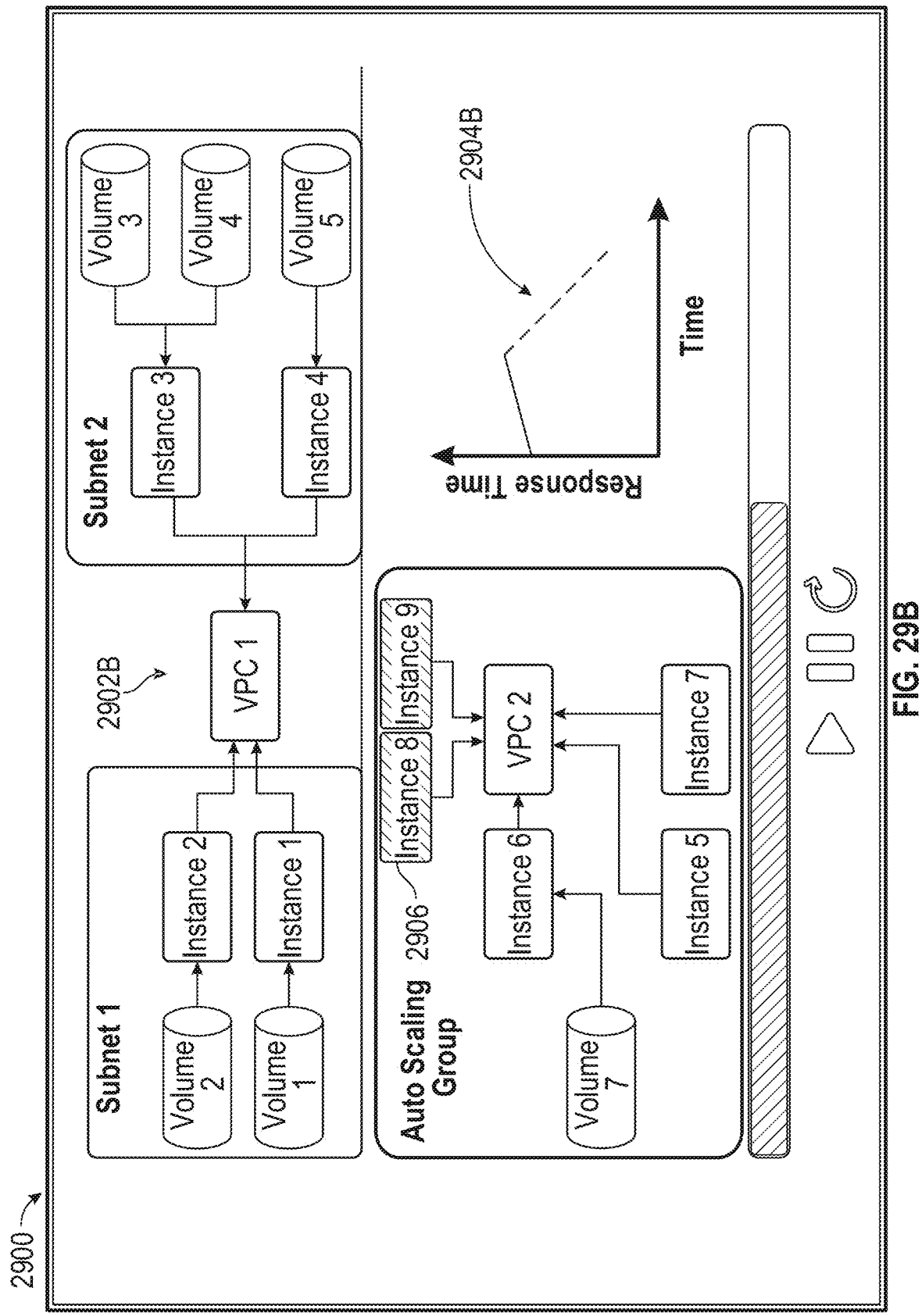

FIG. 29B illustrates display of the same example interface 2900A displaying a topology map 2902B, representing the same collection of resources displayed in topology map 2902A of FIG. 29A but at a different point in time. For example, the display of topology map 2902B may occur a few seconds after a user starts a time-lapse display for the topology map, or in response to a user advancing the topology map display to a particular point in time using the time slider.

In FIG. 29B, for example, two additional nodes 2906 are displayed in the topology map 2902B relative to the topology map 2902A, representing two new server instances that were created in the intervening time period. For example, the new server instances may be a part of an "auto scaling group" of server instances are intended to increase or decrease in number depending on demand. As illustrated by the updated separate visualization 2904B, the addition of the new server instances corresponded with a decrease in the aggregate response time of the collection of resources. The synchronization of additional visualizations with a time-lapse display of a topology map may provide even greater insight into the cause and effects of certain changes within the topology of a collection of cloud computing resources.

In one embodiment, an interface may be configured to display a comparison topology map that graphically depicts a comparison between a topology map at a first point in time and the same topology map at a second point in time. For example, a topology map interface may be configured to receive input specifying two separate points in time for comparison (e.g., corresponding to two separate points of time of interest to a user). In response to receiving the input specifying the separate points in time, the interface may be configured to display a topology map corresponding to the state of a collection of computing resources at the earlier specified point in time, and to display additional information on the topology map representing differences in the topology map at the later specified point in time. For example, one or more nodes and edges may be displayed using particular colors or graphics to indicate that the corresponding computing resources were created, deleted, and/or modified during the time period between the earlier point and time and the later point in time.

Figure 30:
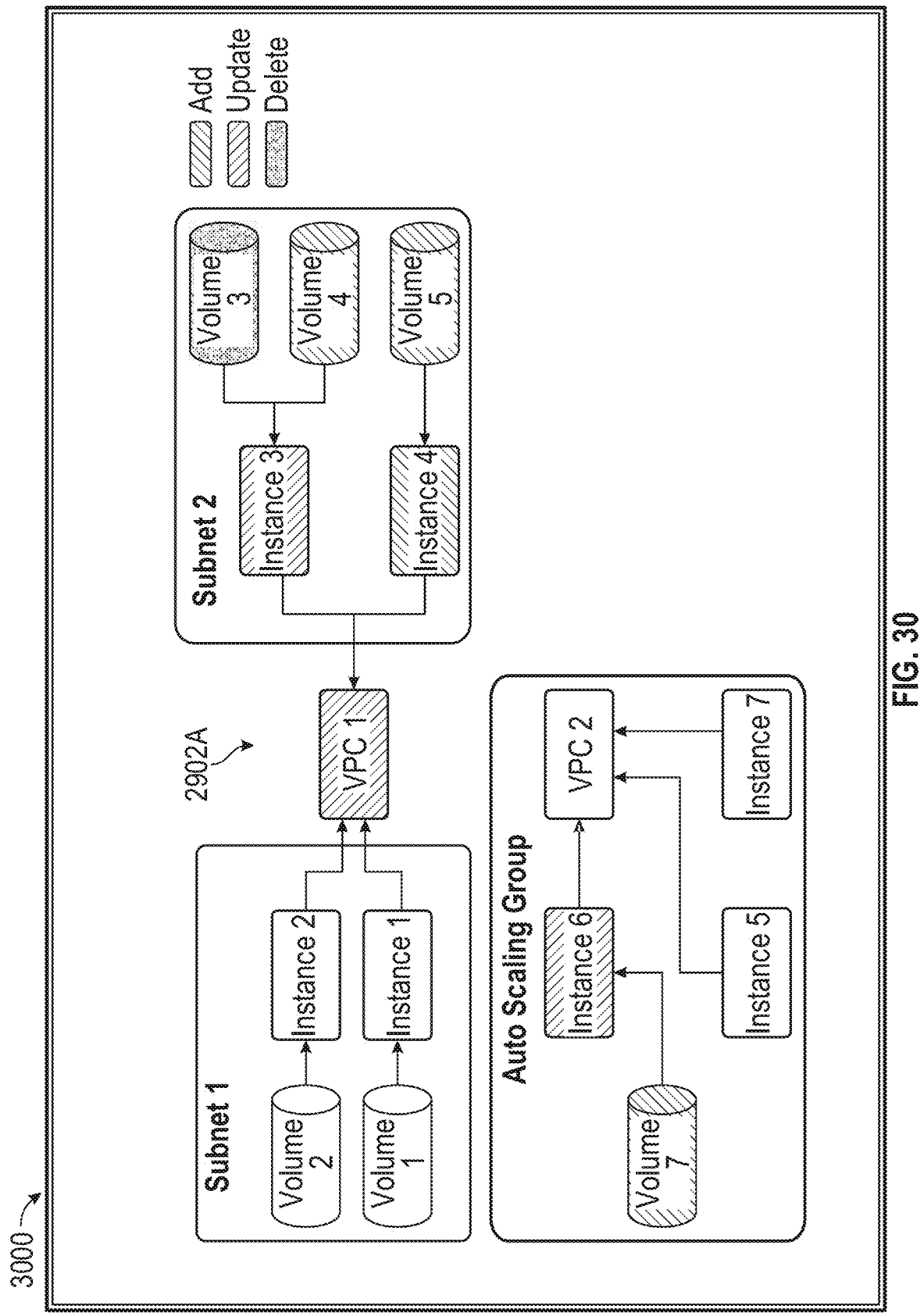
FIG. 30 illustrates a portion of an example interface displaying a topology map indicating differences between states of the topology map at two different points in time in accordance with the disclosed embodiments.

FIG. 30 illustrates a portion of an example interface displaying a topology map indicating differences between states of the topology map at two different points in time. The interface 3000 of FIG. 30, for example, includes a number of nodes and edges representing a collection of cloud computing resources and relationships among the resources, where each of the nodes in the map is displayed using a particular graphical element depending on a state of the node relative to another point in time. For example, nodes representing resources that have been added to the topology map may be displayed using a first color, nodes representing resources that have been deleted from the topology map may be displayed using a second color, and nodes representing resources that have been modified may be displayed using a third color.

4.0. IMPLEMENTATION EXAMPLES

FIG. 31 is a flow diagram 3100 that illustrates generation of a graphical user interface displaying a topology map, according to an embodiment. At block 3102, a cloud computing management application receives performance data related to performance of a plurality of computing resources managed by one or more cloud computing services, and relationship data related to relationships among the plurality of computing resources managed by the one or more cloud computing services. For example, a data collection module 1812 of a cloud computing management application 1810 may receive the performance data and the relationship data based on one or more configured data sources.

At block 3104, the cloud computing management application causes display of a graphical user interface including a topology map generated based on the performance data and the relationship data, the topology map including a plurality of nodes representing the plurality of computing resources, and one or more edges representing the relationships among the plurality of computing resources. For example, referring to FIG. 20, an interface 2000 may display a topology map 2004 including any number of nodes, each representing one or more computing resources, and edges, each representing a relationship among the computing resources.

Figure 32:
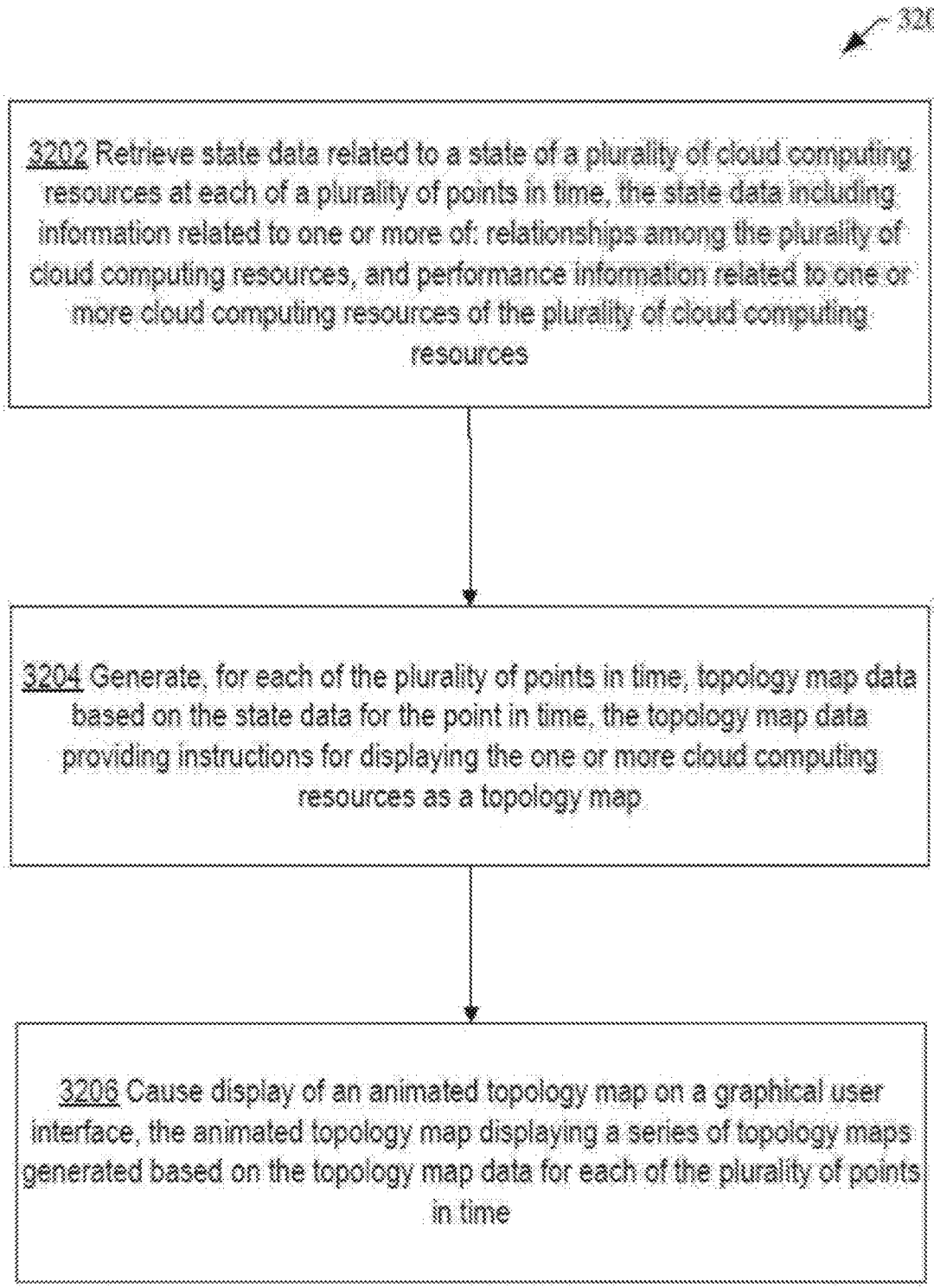
FIG. 32 is a flow diagram that illustrates generation of a graphical user interface displaying an animated topology map in accordance with the disclosed embodiments.

FIG. 32 is a flow diagram 3200 that illustrates generation of a graphical user interface displaying an animated topology map, according to an embodiment. At block 3202, a cloud computing management application retrieves state data related to a state of a plurality of cloud computing resources at each of a plurality of points in time, the state data including information related to one or more of: relationships among the plurality of cloud computing resources, and performance information related to one or more cloud computing resources of the plurality of cloud computing resources. For example, the state data may include data stored by a data collection module 1812 based on performance and/or relationship data received from one or more configured data sources.

At block 3204, the cloud computing management application generates, for each of the plurality of points in time, topology map data based on the state data for the point in time, the topology map data providing instructions for displaying the one or more cloud computing resources as a topology map. For example, a topology map generation module 1814 may generate the topology map data for use by one or more data visualization libraries configured to display topology maps based on the topology map data.

At block 3206, the cloud computing management application causes display of an animated topology map on a graphical user interface, the animated topology map displaying a series of topology maps generated based on the topology map data for each of the plurality of points in time. Referring to FIG. 28, for example, the animated topology map may be displayed on an interface that enables users to play a time-lapse of a topology map.

5.0. EXAMPLE EMBODIMENTS

Examples of some embodiments are represented, without limitation, in the following clauses:

In an embodiment, a method or non-transitory computer readable medium comprises: receiving performance data related to performance of a plurality of computing resources managed by one or more cloud computing services, and relationship data related to relationships among the plurality of computing resources managed by the one or more cloud computing services; causing display of a graphical user interface including a topology map generated based on the performance data and the relationship data, the topology map including a plurality of nodes representing the plurality of computing resources, and one or more edges representing the relationships among the plurality of computing resources.

In an embodiment, a method or non-transitory computer readable medium comprises: wherein at least a portion of the performance data is received from the one or more cloud computing services.

In an embodiment, a method or non-transitory computer readable medium comprises: wherein at least a portion of the relationship data is received from the one or more cloud computing services.

In an embodiment, a method or non-transitory computer readable medium comprises: wherein the topology map is an interactive topology map.

In an embodiment, a method or non-transitory computer readable medium comprises: wherein at least one computing resource of the plurality of computing resources is one of: a virtual private cloud, a server instance, a subnet, a storage volume, a network interface, an access control list (ACL), a route table, and an internet gateway.

In an embodiment, a method or non-transitory computer readable medium comprises: wherein at least one relationship between a first computing resource and a second computing resource is one of: the first computing resource is a member of a subnet represented by the second computing resource, the first computing resource is a member of a virtual private cloud represented by the second computing resource, the first computing resource is a storage volume associated with the second computing resource, and the first computing resource is a member of a security group represented by the second computing resource.

In an embodiment, a method or non-transitory computer readable medium comprises: wherein at least one node of the plurality of nodes is displayed using a particular graphical element based on performance information associated with the computing resource represented by the at least one node.

In an embodiment, a method or non-transitory computer readable medium comprises: wherein at least one edge of the one or more edges is displayed using a particular graphical element based on performance information associated with a network connection between the computing resources represented by the nodes connected by the at least one edge.

In an embodiment, a method or non-transitory computer readable medium comprises: wherein at least one edge of the one or more edges is displayed using a particular graphical element based on relationship information associated with the computing resources represented by the nodes connected by the at least one edge.

In an embodiment, a method or non-transitory computer readable medium comprises: receiving input selecting a particular node of the plurality of nodes and indicating an action to perform, the action related to a particular computing resource represented by the selected particular node.

In an embodiment, a method or non-transitory computer readable medium comprises: receiving input selecting a particular node of the plurality of nodes and indicating an action to perform, the action related to a particular computing resource represented by the selected particular node; sending a request to at least one of the one or more cloud computing services to perform the action related to the particular computing resource.

In an embodiment, a method or non-transitory computer readable medium comprises: receiving input selecting a particular node of the plurality of nodes and indicating an action to perform related to a particular computing resource represented by the selected particular node; sending a request to the cloud computing service to perform the action related to the particular computing resource; wherein the action is one or more of: creating a new computing resource, modifying an existing computing resource, deleting an existing computing resource, creating a trigger, and creating a time-based job.

In an embodiment, a method or non-transitory computer readable medium comprises: receiving input selecting a first particular node and a second particular node of the plurality of nodes and indicating a relationship to create between a first computing resource represented by the selected first particular node and a second computing resource represented by the selected second particular node; sending a request to the cloud computing service to create the indicated relationship between the first computing resource and the second computing resource.

In an embodiment, a method or non-transitory computer readable medium comprises: receiving input selecting at least two nodes of the plurality of nodes; causing display of a menu including one or more selectable actions, each of the one or more selectable actions relevant to the selected at least two nodes.

In an embodiment, a method or non-transitory computer readable medium comprises: receiving input indicating dragging a particular first node of the plurality of nodes from a first location on the graphical user interface to a second location on the graphical user interface, the second location associated with one or more particular second nodes; in response to receiving the input, creating a new relationship between the particular first node and the one or more particular second nodes.

In an embodiment, a method or non-transitory computer readable medium comprises: wherein the one or more cloud computing services includes at least two cloud computing services, wherein each cloud computing service of the at least two cloud computing services is offered by a separate cloud computing service provider.

In an embodiment, a method or non-transitory computer readable medium comprises: wherein the plurality of computing resources managed by the one or more cloud computing services includes at least one first computing resource associated with a first region specified by a particular cloud computing service and at least one second computing resource associated with a second region specified by the particular cloud computing service.

In an embodiment, a method or non-transitory computer readable medium comprises: wherein the plurality of computing resources managed by the one or more cloud computing services includes at least one first computing resource associated with a first user account of a particular cloud computing service and at least one second computing resource associated with a second user account of the particular cloud computing service.

In an embodiment, a method or non-transitory computer readable medium comprises: receiving input specifying a first point in time and a second point in time, the first point in time associated with a first topology map and the second point in time associated with a second topology map; displaying a comparison topology map, the comparison topology map including a graphical display indicating one or more differences between the first topology map and the second topology map.

In an embodiment, a method or non-transitory computer readable medium comprises: storing the performance data in a data intake and query system as a plurality of events.

In an embodiment, a method or non-transitory computer readable medium comprises: receiving input selecting one or more nodes of the plurality of nodes; in response to receiving the input, causing display of one or more events associated with one or more computing resources represented by the selected one or more nodes.

In an embodiment, a method or non-transitory computer readable medium comprises: causing display of a second graphical user interface displaying a plurality of events, wherein at least one of the events is related to one or more computing resources of the plurality of computing resources; receiving input selecting the one or more computing resources related to the at least one of the events; in response to receiving the input, causing display of a graphical user interface including a topology map, the topology map including one or more nodes representing the selected one or more computing resources.

In an embodiment, a method or non-transitory computer readable medium comprises: receiving input selecting one or more nodes of the plurality of nodes; in response to receiving the input, causing display of performance data associated with one or more computing resources represented by the one or more nodes.

In an embodiment, a method or non-transitory computer readable medium comprises: receiving input selecting one or more nodes of the plurality of nodes; in response to receiving the input, causing display of one or more metrics generated based on performance information associated with one or more computing resources represented by the selected one or more nodes.

In an embodiment, a method or non-transitory computer readable medium comprises: receiving input selecting one or more nodes of the plurality of nodes; in response to receiving the input, causing display of cost information associated with one or more computing resources represented by the selected one or more nodes.

In an embodiment, a method or non-transitory computer readable medium comprises: receiving input selecting at least two nodes of the plurality of nodes; in response to receiving the input, causing display of aggregate information associated with at least two computing resources represented by the selected at least two nodes.

In an embodiment, a method or non-transitory computer readable medium comprises: wherein at least one node of the plurality of nodes is displayed using a particular graphical element based on cost data associated with the at least one node.

In an embodiment, a method or non-transitory computer readable medium comprises: wherein the performance data includes one or more of: state data, activity log data, and performance log data.

In an embodiment, a method or non-transitory computer readable medium comprises: retrieving state data related to a state of a plurality of cloud computing resources at each of a plurality of points in time, the state data including information related to one or more of: relationships among the plurality of cloud computing resources, and performance information related to one or more cloud computing resources of the plurality of cloud computing resources; generating, for each of the plurality of points in time, topology map data based on the state data for the point in time, the topology map data providing instructions for displaying the one or more cloud computing resources as a topology map; causing display of an animated topology map on a graphical user interface, the animated topology map displaying a series of topology maps generated based on the topology map data for each of the plurality of points in time.

In an embodiment, a method or non-transitory computer readable medium comprises: causing display of one or more performance metrics related to one or more of the plurality of cloud computing resources for each of the plurality of points in time; wherein causing display of the performance metrics includes synchronizing the display of the performance metrics with the display of the animated topology map.

In an embodiment, a method or non-transitory computer readable medium comprises: wherein the animated topology map includes a plurality of nodes representing the plurality of cloud computing resources, and one or more edges representing relationships among the plurality of cloud computing resources.

In an embodiment, a method or non-transitory computer readable medium comprises: wherein the state data includes both performance data related to performance of a plurality of cloud computing resources managed by one or more cloud computing services, and relationship data related to relationships among the plurality of cloud computing resources managed by the one or more cloud computing services.

In an embodiment, a method or non-transitory computer readable medium comprises: wherein the state data includes both performance data related to performance of a plurality of cloud computing resources managed by one or more cloud computing services, and relationship data related to relationships among the plurality of cloud computing resources managed by the one or more cloud computing services; and wherein at least a portion of the performance data is received from the one or more cloud computing services.

In an embodiment, a method or non-transitory computer readable medium comprises: wherein the state data includes both performance data related to performance of a plurality of cloud computing resources managed by one or more cloud computing services, and relationship data related to relationships among the plurality of cloud computing resources managed by the one or more cloud computing services; and wherein at least a portion of the relationship data is received from the one or more cloud computing services.

In an embodiment, a method or non-transitory computer readable medium comprises: wherein at least one cloud computing resource of the plurality of cloud computing resources is one of: a virtual private cloud, a server instance, a subnet, a storage volume, a network interface, an access control list (ACL), a route table, and an internet gateway.

In an embodiment, a method or non-transitory computer readable medium comprises: wherein at least one relationship between a first computing resource and a second computing resource is one of: the first computing resource is a member of a subnet represented by the second computing resource, the first computing resource is a member of a virtual private cloud represented by the second computing resource, the first computing resource is a storage volume associated with the second computing resource, and the first computing resource is a member of a security group represented by the second computing resource.

In an embodiment, a method or non-transitory computer readable medium comprises: wherein the animated topology map includes a plurality of nodes representing the plurality of cloud computing resources, and one or more edges representing relationships among the plurality of cloud computing resources; wherein at least one node of the plurality of nodes is displayed using a particular graphical element based on performance data associated with the computing resource represented by the at least one node.

In an embodiment, a method or non-transitory computer readable medium comprises: wherein the animated topology map includes a plurality of nodes representing the plurality of cloud computing resources, and one or more edges representing relationships among the plurality of cloud computing resources; wherein at least one edge of the one or more edges is displayed using a particular graphical element based on performance data associated with a network connection between the cloud computing resources represented by the nodes connected by the at least one edge.

In an embodiment, a method or non-transitory computer readable medium comprises: wherein the animated topology map includes a plurality of nodes representing the plurality of cloud computing resources, and one or more edges representing relationships among the plurality of cloud computing resources; wherein at least one edge of the one or more edges is displayed using a particular graphical element based on relationship information associated with the computing resources represented by the nodes connected by the at least one edge.

In an embodiment, a method or non-transitory computer readable medium comprises: wherein the animated topology map includes a plurality of nodes representing the plurality of cloud computing resources; receiving input selecting one or more nodes of the plurality of nodes and indicating an action to perform, the action related to one or more computing resources represented by the selected one or more nodes.

In an embodiment, a method or non-transitory computer readable medium comprises: wherein the animated topology map includes a plurality of nodes representing the plurality of cloud computing resources; receiving input selecting one or more nodes of the plurality of nodes and indicating an action to perform, the action related to one or more cloud computing resources represented by the selected one or more nodes; sending a request to at least one of the one or more cloud computing services to perform the action related to the selected one or more nodes.

In an embodiment, a method or non-transitory computer readable medium comprises: wherein the animated topology map includes a plurality of nodes representing the plurality of cloud computing resources; receiving input selecting one or more nodes of the plurality of nodes and indicating an action to perform, the action related to one or more cloud computing resources represented by the selected one or more nodes; sending a request to at least one of the one or more cloud computing services to perform the action related to the one or more cloud computing resources; wherein the action is one or more of: creating a new computing resource, modifying an existing computing resource, deleting an existing computing resource, creating a trigger, and creating a time-based job.

In an embodiment, a method or non-transitory computer readable medium comprises: wherein the animated topology map includes a plurality of nodes representing the plurality of cloud computing resources; receiving input selecting a first node and a second node of the plurality of nodes and indicating a relationship to create between a first computing resource represented by the selected first node and a second computing resource represented by the selected second node; sending a request to the cloud computing service to create the indicated relationship between the first computing resource and the second computing resource.

In an embodiment, a method or non-transitory computer readable medium comprises: wherein the animated topology map includes a plurality of nodes representing the plurality of cloud computing resources; receiving input selecting at least two nodes of the plurality of nodes; causing display of a menu including one or more selectable actions, each of the one or more selectable actions relevant to the selected at least two nodes.

In an embodiment, a method or non-transitory computer readable medium comprises: wherein the animated topology map includes a plurality of nodes representing the plurality of cloud computing resources; receiving input indicating dragging a first node of the plurality of nodes from a first location on the graphical user interface to a second location on the graphical user interface, the second location associated with one or more second nodes; in response to receiving the input, creating a new relationship between the first node and the one or more second nodes.

In an embodiment, a method or non-transitory computer readable medium comprises: wherein the one or more cloud computing services includes at least two cloud computing services, wherein each cloud computing service of the at least two cloud computing services is offered by a separate cloud computing service provider.

In an embodiment, a method or non-transitory computer readable medium comprises: wherein the plurality of cloud computing resources includes at least one first cloud computing resource associated with a first region specified by a particular cloud computing service and at least one second cloud computing resource associated with a second region specified by the particular cloud computing service.

In an embodiment, a method or non-transitory computer readable medium comprises: wherein the plurality of cloud computing resources includes at least one first computing resource associated with a first user account of a particular cloud computing service and at least one second computing resource associated with a second user account of the particular cloud computing service.

In an embodiment, a method or non-transitory computer readable medium comprises: receiving input specifying a first point in time and a second point in time, the first point in time associated with a first topology map and the second point in time associated with a second topology map; displaying a comparison topology map, the comparison topology map including a graphical display indicating one or more differences between the first topology map and the second topology map.

In an embodiment, a method or non-transitory computer readable medium comprises: storing the performance data in a data intake and query system as a plurality of events.

In an embodiment, a method or non-transitory computer readable medium comprises: wherein the animated topology map includes a plurality of nodes representing the plurality of cloud computing resources; receiving input selecting one or more nodes of the plurality of nodes; in response to receiving the input, causing display of one or more stored events associated with one or more cloud computing resources represented by the selected one or more nodes.

In an embodiment, a method or non-transitory computer readable medium comprises: causing display of a second graphical user interface displaying a plurality of events, at least one of the events related to one or more cloud computing resources of the plurality of computing resources; receiving input selecting the one or more computing resource; in response to receiving the input, causing display of a graphical user interface including a topology map, the topology map including one or more nodes representing the selected one or more cloud computing resources.

In an embodiment, a method or non-transitory computer readable medium comprises: wherein the animated topology map includes a plurality of nodes representing the plurality of cloud computing resources; receiving input selecting one or more nodes of the plurality of nodes; in response to receiving the input, causing display of performance data associated with one or more cloud computing resources represented by the selected one or more nodes.

In an embodiment, a method or non-transitory computer readable medium comprises: wherein the animated topology map includes a plurality of nodes representing the plurality of cloud computing resources; receiving input selecting at least two nodes of the plurality of nodes; in response to receiving the input, causing display of aggregate information associated with at least two cloud computing resources represented by the selected at least two nodes.

In an embodiment, a method or non-transitory computer readable medium comprises: wherein the animated topology map includes a plurality of nodes representing the plurality of cloud computing resources, and one or more edges representing relationships among the plurality of cloud computing resources; and wherein at least one node of the plurality of nodes is displayed using a particular graphical element based on cost data associated with the at least one node.

In an embodiment, a method or non-transitory computer readable medium comprises: wherein the series of topology maps are displayed in a chronological order.

Other examples of these and other embodiments are found throughout this disclosure.

6.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 33:
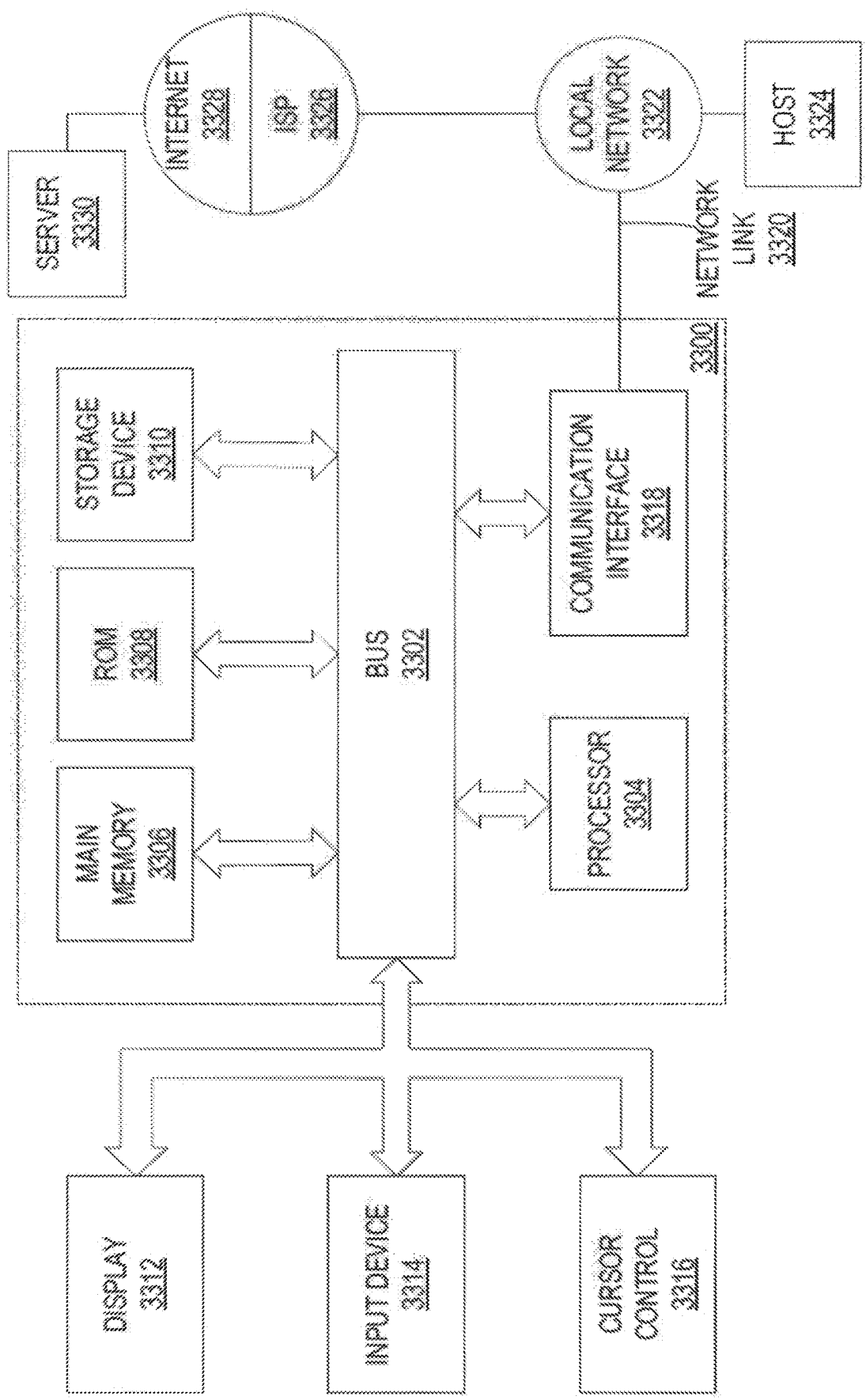
FIG. 33 illustrates a computer system upon which an embodiment may be implemented.

FIG. 33 is a block diagram that illustrates a computer system 3300 utilized in implementing the above-described techniques, according to an embodiment. Computer system 3300 may be, for example, a desktop computing device, laptop computing device, tablet, smartphone, server appliance, computing mainframe, multimedia device, handheld device, networking apparatus, or any other suitable device.

Computer system 3300 includes one or more busses 3302 or other communication mechanism for communicating information, and one or more hardware processors 3304 coupled with busses 3302 for processing information. Hardware processors 3304 may be, for example, general purpose microprocessors. Busses 3302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 3300 also includes a main memory 3306, such as a random access memory (RAM) or other dynamic or volatile storage device, coupled to bus 3302 for storing information and instructions to be executed by processor 3304. Main memory 3306 also may be used for storing temporary variables or other intermediate information during execution of instructions to be executed by processor 3304. Such instructions, when stored in non-transitory storage media accessible to processor 3304, render computer system 3300 a special-purpose machine that is customized to perform the operations specified in the instructions.

Computer system 3300 further includes one or more read only memories (ROM) 3308 or other static storage devices coupled to bus 3302 for storing static information and instructions for processor 3304. One or more storage devices 3310, such as a solid-state drive (SSD), magnetic disk, optical disk, or other suitable non-volatile storage device, is provided and coupled to bus 3302 for storing information and instructions.

Computer system 3300 may be coupled via bus 3302 to one or more displays 3312 for presenting information to a computer user. For instance, computer system 3300 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 3312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 3312.

One or more input devices 3314 are coupled to bus 3302 for communicating information and command selections to processor 3304. One example of an input device 3314 is a keyboard, including alphanumeric and other keys. Another type of user input device 3314 is cursor control 3316, such as a mouse, a trackball, or cursor direction keys for communicating direction information and command selections to processor 3304 and for controlling cursor movement on display 3312. This input device typically has two degrees of freedom in two axes, a first axis (e.g., x) and a second axis (e.g., y), that allows the device to specify positions in a plane. Yet other examples of suitable input devices 3314 include a touch-screen panel affixed to a display 3312, cameras, microphones, accelerometers, motion detectors, and/or other sensors. In an embodiment, a network-based input device 3314 may be utilized. In such an embodiment, user input and/or other information or commands may be relayed via routers and/or switches on a Local Area Network (LAN) or other suitable shared network, or via a peer-to-peer network, from the input device 3314 to a network link 3320 on the computer system 3300.

A computer system 3300 may implement techniques described herein using customized hard-wired logic, one or more ASICs or FPGAs, firmware and/or program logic which in combination with the computer system causes or programs computer system 3300 to be a special-purpose machine. According to one embodiment, the techniques herein are performed by computer system 3300 in response to processor 3304 executing one or more sequences of one or more instructions contained in main memory 3306. Such instructions may be read into main memory 3306 from another storage medium, such as storage device 3310.

Execution of the sequences of instructions contained in main memory 3306 causes processor 3304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 3310. Volatile media includes dynamic memory, such as main memory 3306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 3302. Transmission media can also take the form of acoustic or light waves, such as those generated during radio-wave and infra-red data communications.

Various forms of media may be involved in carrying one or more sequences of one or more instructions to processor 3304 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 3300 can receive the data on the network and demodulate the signal to decode the transmitted instructions. Appropriate circuitry can then place the data on bus 3302. Bus 3302 carries the data to main memory 3306, from which processor 3304 retrieves and executes the instructions. The instructions received by main memory 3306 may optionally be stored on storage device 3310 either before or after execution by processor 3304.

A computer system 3300 may also include, in an embodiment, one or more communication interfaces 3318 coupled to bus 3302. A communication interface 3318 provides a data communication coupling, typically two-way, to a network link 3320 that is connected to a local network 3322. For example, a communication interface 3318 may be an integrated services digital network (ISDN) card, cable modem, satellite modem, or a modem to provide a data communication connection to a corresponding type of telephone line. As another example, the one or more communication interfaces 3318 may include a local area network (LAN) card to provide a data communication connection to a compatible LAN. As yet another example, the one or more communication interfaces 3318 may include a wireless network interface controller, such as a 802.11-based controller, Bluetooth controller, Long Term Evolution (LTE) modem, and/or other types of wireless interfaces. In any such implementation, communication interface 3318 sends and receives electrical, electromagnetic, or optical signals that carry digital data streams representing various types of information.

Network link 3320 typically provides data communication through one or more networks to other data devices. For example, network link 3320 may provide a connection through local network 3322 to a host computer 3324 or to data equipment operated by a Service Provider 3326. Service Provider 3326, which may for example be an Internet Service Provider (ISP), in turn provides data communication services through a wide area network, such as the world wide packet data communication network now commonly referred to as the "Internet" 3328. Local network 3322 and Internet 3328 both use electrical, electromagnetic or optical signals that carry digital data streams. The signals through the various networks and the signals on network link 3320 and through communication interface 3318, which carry the digital data to and from computer system 3300, are example forms of transmission media.

In an embodiment, computer system 3300 can send messages and receive data, including program code and/or other types of instructions, through the network(s), network link 3320, and communication interface 3318. In the Internet example, a server 3330 might transmit a requested code for an application program through Internet 3328, ISP 3326, local network 3322 and communication interface 3318. The received code may be executed by processor 3304 as it is received, and/or stored in storage device 3310, or other non-volatile storage for later execution. As another example, information received via a network link 3320 may be interpreted and/or processed by a software component of the computer system 3300, such as a web browser, application, or server, which in turn issues instructions based thereon to a processor 3304, possibly via an operating system and/or other intermediate layers of software components.

In an embodiment, some or all of the systems described herein may be or comprise server computer systems, including one or more computer systems 3300 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

7.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    retrieving state data related to a state of a plurality of cloud computing resources, the state data including a respective state for each of the plurality of cloud computing resources at each of a plurality of points in time, wherein the cloud computing resources are hosted by one or more cloud computing services, wherein the one or more cloud computing services enable access to the cloud computing resources to users who subscribe to services provided by the cloud computing services, wherein the users access the cloud computing resources over a network, wherein the state data is derivable from event data associated with the plurality of cloud computing resources, and wherein each event of the event data includes raw machine data generated by a respective cloud computing resource;
    generating, using the state data, topology map data for each point in time from the plurality of points in time, the topology map data providing instructions for displaying the respective state of each of the plurality of cloud computing resources as topology maps; and
    causing presentation, via a graphical user interface, of at least a portion of the topology map data, wherein the graphical user interface enables presentation of an animated topology map comprising a series of topology maps ordered according to respective points in time of the plurality of points in time.

2. The method of claim 1, wherein the animated topology map illustrates changes to a respective state of at least one cloud computing resource.

3. The method of claim 1, wherein the animated topology map includes a plurality of nodes representing the plurality of cloud computing resources and one or more edges representing relationships among the plurality of cloud computing resources, and wherein the animated topology map illustrates visual adjustments of nodes or edges.

4. The method of claim 1, wherein the animated topology map includes a plurality of nodes representing the plurality of cloud computing resources and one or more edges representing relationships among the plurality of cloud computing resources, wherein the animated topology map illustrates nodes in a first color which have been added to a topology map in the series of topology maps and illustrates nodes in a second color which been deleted from a topology map in the series of topology maps.

5. The method of claim 1, further comprising:
    receiving information indicating user selection of a first point in time and a second point in time among the plurality of points in time; and
    causing presentation, via the graphical user interface, of a comparison topology map determined based on the first point in time and the second point in time.

6. The method of claim 1, wherein the animated topology map includes a plurality of nodes representing the plurality of cloud computing resources and one or more edges representing relationships among the plurality of cloud computing resources, and wherein the method further comprises:
    receiving information indicating user selection of a first point in time and a second point in time among the plurality of points in time; and
    causing presentation, via the graphical user interface, of a comparison topology map determined based on the first point in time and the second point in time, the comparison topology map comprising visual adjustments of nodes or edges changed between the first point in time and the second point in time.

7. The method of claim 1, further comprising:
    receiving information indicating user selection of a first point in time and a second point in time among the plurality of points in time; and
    determining a first topology map associated with the first point in time, the first topology map indicating a first respective state of each of the plurality of cloud computing resources at the first point in time;
    determining a second topology map associated with the second point in time, the second topology map indicating a second respective state of each of the plurality of cloud computing resources at the second point in time; and
    causing presentation, via the graphical user interface, of a comparison topology man determined based on the first topology map and the second topology map.

8. The method of claim 1, wherein state data comprises performance data related to performance of the plurality of cloud computing resources hosted by the one or more cloud computing services and relationship data related to relationships among the plurality of cloud computing resources.

9. The method of claim 1, wherein state data comprises performance data related to performance of the plurality of cloud computing resources hosted by the one or more cloud computing services, and wherein the graphical user interface:
    presents one or more graphical elements indicative of performance metrics associated with at least one cloud computing resource.

10. The method of claim 1, wherein the animated topology map includes a plurality of nodes representing the plurality of cloud computing resources, wherein state data comprises relationship data related to relationships among the plurality of cloud computing resources, and wherein the graphical user interface:

presents edges between nodes included in the animated topology map, the edges representing relationships determined based on the relationship data.

11. The method of claim 1, wherein the animated topology map includes a plurality of nodes representing the plurality of cloud computing resources, and wherein the method further comprises receiving input selecting one or more nodes of the plurality of nodes and indicating an action to perform, the action related to one or more computing resources represented by the selected one or more nodes.

12. The method of claim 1, wherein the animated topology map includes a plurality of nodes representing the plurality of cloud computing resources, and wherein the method further comprises:
receiving input selecting one or more nodes of the plurality of nodes and indicating an action to perform, the action related to one or more cloud computing resources represented by the selected one or more nodes; and
sending a request to at least one of the one or more cloud computing services to perform the action related to the selected one or more nodes.

13. The method of claim 1, wherein the animated topology map includes a plurality of nodes representing the plurality of cloud computing resources, and wherein the method further comprises:
receiving input selecting one or more nodes of the plurality of nodes and indicating an action to perform, the action related to one or more cloud computing resources represented by the selected one or more nodes; and
sending a request to at least one of the one or more cloud computing services to perform the action related to the one or more cloud computing resources;
wherein the action is one or more of: creating a new computing resource, modifying an existing computing resource, deleting an existing computing resource, creating a trigger, or creating a time-based job.

14. The method of claim 1, wherein the animated topology map includes a plurality of nodes representing the plurality of cloud computing resources, and wherein the method further comprises:
receiving input selecting a first node and a second node of the plurality of nodes and indicating a relationship to create between a first computing resource represented by the selected first node and a second computing resource represented by the selected second node; and
sending a request to at least one of the one or more cloud computing services to create the indicated relationship between the first computing resource and the second computing resource.

15. The method of claim 1, wherein the animated topology map includes a plurality of nodes representing the plurality of cloud computing resources, and wherein the method further comprises:
receiving input selecting at least two nodes of the plurality of nodes; and
causing display of a menu including one or more selectable actions, each of the one or more selectable actions relevant to the selected at least two nodes.

16. The method of claim 1, wherein the graphical user interface is usable to create relationships between cloud computing resources.

17. The method of claim 1, wherein the animated topology map includes a plurality of nodes representing the plurality of cloud computing resources, wherein the graphical user interface is responsive to user input specifying a relationship between a first node and a second node, and wherein a relationship is created between cloud computing resources associated with the first node and the second node.

18. The method of claim 1, wherein the animated topology map includes a plurality of nodes representing the plurality of cloud computing resources, and wherein the method further comprises:
receiving input indicating dragging a first node of the plurality of nodes from a first location on the graphical user interface to a second location on the graphical user interface, the second location associated with one or more second nodes; and
in response to receiving the input, creating a new relationship between the first node and the one or more second nodes.

19. The method of claim 1, wherein the plurality of cloud computing resources are hosted by at least two cloud computing services, wherein each cloud computing service of the at least two cloud computing services is offered by a separate cloud computing service provider.

20. The method of claim 1, wherein the plurality of cloud computing resources include at least one first cloud computing resource associated with a first region specified by a particular cloud computing service and at least one second cloud computing resource associated with a second region specified by the particular cloud computing service.

21. The method of claim 1, wherein the plurality of cloud computing resources include at least one first computing resource associated with a first user account of a particular cloud computing service and at least one second computing resource associated with a second user account of the particular cloud computing service.

22. The method of claim 1, wherein the plurality of cloud computing resources include at least one first computing resource associated with a first user account of a particular cloud computing service and at least one second computing resource associated with a second user account of the particular cloud computing service.

23. The method of claim 1, further comprising:
causing display of one or more events of the event data.

24. The method of claim 1, wherein the graphical user interface is configured to receive selection of a cloud computing resource and to present one or more events of the event data which are associated with the cloud computing resource.

25. The method of claim 1, wherein the graphical user interface is configured to present aggregate information associated with at least two cloud computing resources.

26. The method of claim 1, wherein the graphical user interface is configured to present aggregate information associated with at least two nodes, the aggregate information comprising information common to the at least two cloud computing resources.

27. The method of claim 1, wherein the graphical user interface is configured to present aggregate information associated with at least two nodes, the aggregate information comprising one or more metrics derived from information associated with the at least two nodes.

28. The method of claim 1, wherein the graphical user interface is configured to present aggregate information associated with at least two nodes, the aggregate information comprising one or more metrics derived from information associated with the at least two nodes, and wherein the one or more metrics comprise an average response time, a total cost incurred, or a total number of configuration changes.

29. One or more non-transitory computer-readable storage media, storing instructions which, when executed by one or more processors, cause performance of:
- retrieving state data related to a state of a plurality of cloud computing resources, the state data including a respective state for each of the plurality of cloud computing resources at each of a plurality of points in time, wherein the cloud computing resources are hosted by one or more cloud computing services, wherein the one or more cloud computing services enable access to the cloud computing resources to users who subscribe to services provided by the cloud computing services, wherein the users access the cloud computing resources over a network, wherein the state data is derivable from event data associated with the plurality of cloud computing resources, and wherein each event of the event data includes raw machine data generated by a respective cloud computing resource;
- generating, using the state data, topology map data for each point in time from the plurality of points in time, the topology map data providing instructions for displaying the respective state of each of the plurality of cloud computing resources as topology maps; and
- causing presentation, via a graphical user interface, of at least a portion of the topology map data, wherein the graphical user interface enables presentation of an animated topology map comprising a series of topology maps ordered according to respective points in time of the plurality of points in time.

30. A system comprising one or more computers and computer-readable storage media storing instructions that, when executed by the one or more computers, cause the one or more computers to perform operations comprising:
- retrieving state data related to a state of a plurality of cloud computing resources, the state data including a respective state for each of the plurality of cloud computing resources at each of a plurality of points in time, wherein the cloud computing resources are hosted by one or more cloud computing services, wherein the one or more cloud computing services enable access to the cloud computing resources to users who subscribe to services provided by the cloud computing services, wherein the users access the cloud computing resources over a network, wherein the state data is derivable from event data associated with the plurality of cloud computing resources, and wherein each event of the event data includes raw machine data generated by a respective cloud computing resource;
- generating, using the state data, topology map data for each point in time from the plurality of points in time, the topology map data providing instructions for displaying the respective state of each of the plurality of cloud computing resources as topology maps; and
- causing presentation, via a graphical user interface, of at least a portion of the topology map data, wherein the graphical user interface enables presentation of an animated topology map comprising a series of topology maps ordered according to respective points in time of the plurality of points in time.

* * * * *